(12) United States Patent
Kim et al.

(10) Patent No.: US 11,789,575 B2
(45) Date of Patent: *Oct. 17, 2023

(54) TOUCH DISPLAY DEVICE

(71) Applicant: LG Display Co., Ltd., Seoul (KR)

(72) Inventors: Cheolse Kim, Daegu (KR); Juhan Kim, Gyeonggi-do (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/712,048

(22) Filed: Apr. 1, 2022

(65) Prior Publication Data

US 2022/0221957 A1 Jul. 14, 2022

Related U.S. Application Data

(63) Continuation of application No. 16/561,667, filed on Sep. 5, 2019, now Pat. No. 11,334,203.

(30) Foreign Application Priority Data

Sep. 21, 2018 (KR) .......................... 10-2018-0113729

(51) Int. Cl.
*G06F 3/044* (2006.01)
*G06F 3/041* (2006.01)

(52) U.S. Cl.
CPC ........ *G06F 3/0446* (2019.05); *G06F 3/04162* (2019.05); *G06F 2203/04104* (2013.01)

(58) Field of Classification Search
CPC . G06F 2203/04103; G06F 2203/04104; G06F 3/041–047
See application file for complete search history.

(56) References Cited

U.S. PATENT DOCUMENTS

2008/0246496 A1 10/2008 Hristov et al.
2012/0086654 A1 4/2012 Song
(Continued)

FOREIGN PATENT DOCUMENTS

CN 102445799 A 5/2012
CN 105742330 A 7/2016
(Continued)

OTHER PUBLICATIONS

Office Action dated Dec. 1, 2020, issued in corresponding British Patent Application No. 1913582.1.
(Continued)

*Primary Examiner* — Roberto W Flores
(74) *Attorney, Agent, or Firm* — Morgan, Lewis & Bockius LLP

(57) ABSTRACT

Embodiments of the present disclosure relate to a touch display device and, more particularly, to a touch display device including a touch panel that can reduce the number of signal lines and the number of touch channels and can prevent or reduce a ghost phenomenon in multi-touching. In particular, the touch display device includes a woven type touch panel in which touch electrodes are formed by disposing electrodes to be entangled and electrically connecting the entangled electrodes such that electrically disconnected points exist, thereby being able to reduce the number of signal lines and the number of touch channels and prevent or reduce a ghost phenomenon in multi-touching.

18 Claims, 32 Drawing Sheets

(56) References Cited

U.S. PATENT DOCUMENTS

| | | |
|---|---|---|
| 2012/0313881 A1 | 12/2012 | Ge et al. |
| 2013/0106743 A1 | 5/2013 | Xie et al. |
| 2014/0184559 A1 | 7/2014 | Han et al. |
| 2014/0332256 A1 | 11/2014 | Cok et al. |
| 2015/0116254 A1* | 4/2015 | Solven .................. G06F 3/0443 345/174 |
| 2015/0277655 A1 | 10/2015 | Kim et al. |
| 2016/0070406 A1 | 3/2016 | Han et al. |
| 2016/0085339 A1 | 3/2016 | Yashiro et al. |
| 2017/0102825 A1 | 4/2017 | Kim et al. |
| 2017/0115809 A1* | 4/2017 | Lee ........................ G06F 3/0446 |
| 2017/0185195 A1 | 6/2017 | Kim et al. |
| 2017/0185208 A1 | 6/2017 | Liu et al. |
| 2018/0136755 A1 | 5/2018 | Krasnov et al. |
| 2018/0158876 A1 | 6/2018 | Shi |
| 2018/0203540 A1 | 7/2018 | Maguire et al. |
| 2018/0356927 A1* | 12/2018 | Sasaki .................. G06F 3/0412 |
| 2019/0235678 A1 | 8/2019 | Kim et al. |
| 2019/0369809 A1 | 12/2019 | Liu et al. |
| 2020/0125202 A1* | 4/2020 | Li ......................... G06F 3/0446 |

FOREIGN PATENT DOCUMENTS

| | | |
|---|---|---|
| EP | 2 750 002 A2 | 7/2014 |
| EP | 2 990 916 A1 | 3/2016 |
| EP | 3 130 992 A1 | 2/2017 |
| KR | 10-2018-0136047 A | 12/2018 |
| WO | 2012/118513 A1 | 9/2012 |

OTHER PUBLICATIONS

Office Action dated Mar. 31, 2023, issued by the China National Intellectual Property Administration (CNIPA) in counterpart Chinese Patent Application No. 201910892539.5.

* cited by examiner

FIG.30
TDS
(Case 1)  TDS1  
(Case 2)  TDS2  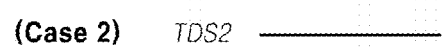
(Case 3)  TDS3  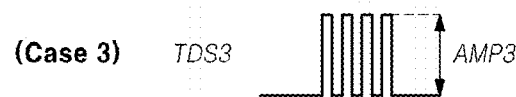

TOUCH DISPLAY DEVICE

CROSS REFERENCE TO RELATED APPLICATION

This application is a Continuation of co-pending U.S. patent application Ser. No. 16/561,667, filed on Sep. 5, 2019, which claims priority from Korean Patent Application No. 10-2018-0113729, filed on Sep. 21, 2018. Each of the above prior U.S. and Korean patent applications is hereby incorporated by reference in its entirety.

BACKGROUND

1. Technical Field

The present disclosure relates to a touch display device.

2. Discussion of the Related Art

A touch display device can provide, in addition to the function of displaying video or images, a touch-based input function that enables a user to easily, intuitionally, and conveniently input information or instructions.

Such a touch display device should be able to recognize whether a user has touched the touch display device, and to accurately sense the touch coordinates in order to provide the touch-based input function. To this end, touch display devices include a touch panel having a touch sensor structure.

The touch panel has a touch sensor structure including a plurality of touch electrodes, a plurality of touch routing lines for connecting the touch electrodes to a touch sensing circuit, etc. A plurality of touch pads (or a plurality of touch channels) to which the touch sensing circuit is electrically connected may exist in the touch panel.

Since such a touch panel has a touch sensing structure that is complicated or requires several layers, a problem may be generated in that the manufacturing process of the touch panel is complicated, or the manufacturing yield of the touch panel is low, or the manufacturing cost increases.

When the size of a touch panel increases, the number of touch electrodes increases and the number of signal lines and the number of touch channels also increase. Accordingly, the problem that complexity and cost for manufacturing the panel increase and complexity and cost for manufacturing circuit parts also increases may become worse.

Touch panels of the related art have a problem in that a ghost phenomenon in which points that have not been actually touched are recognized as touch positions when multiple touches occurs.

SUMMARY

Accordingly, embodiments of the present disclosure are directed to a touch display device that substantially obviates one or more of the problems due to limitations and disadvantages of the related art An aspect of the present disclosure is to provide a touch display device that can reduce the number of signal lines and the number of touch channels and can prevent or reduce a ghost phenomenon in multi-touching.

Another aspect of the present disclosure is to provide a touch display device including a new type of touch panel that can reduce the number of signal lines and the number of touch channels and can prevent or reduce a ghost phenomenon in multi-touching.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, the present disclosure provides a touch display device.

In an aspect, embodiments of the present disclosure may provide a touch display device including a plurality of electrodes and a plurality of signal lines electrically connected to the plurality of electrodes.

The plurality of electrodes may be disposed in a plurality of electrode rows. The number of the electrodes disposed in one electrode row of any two adjacent electrode rows of the plurality of electrode rows may be larger than the number of the electrodes disposed in the other electrode row of the any two adjacent electrode rows of the plurality of electrode rows.

In the plurality of electrode rows, a first electrode in an i-th electrode row and a first electrode in an i+2-th electrode row may be electrically connected to each other by a first signal line, and a k-th electrode in the i-th electrode row and a k-th electrode in an i−2-th electrode row may be electrically connected to each other by a second signal line.

"i" may be an integer larger than 2. "k" may be an integer of 2 or more.

The first electrode in the i-th electrode row, the first electrode in the i+2-th electrode row, the k-th electrode in the i-th electrode row, and the k-th electrode in the i−2-th electrode row may have sizes corresponding to one another.

The size of a first electrode in an i+1-th electrode row positioned between the first electrode in the i-th electrode row and the first electrode in the i+2-th electrode row may be the same as or larger than the sum of the size of the first electrode in the i-th electrode row and the size of the first electrode in the i+2-th electrode row.

The size of a k-th electrode in an i−1-th electrode row positioned between the k-th electrode in the i-th electrode row and the k-th electrode in the i−2-th electrode row may be the same as or larger than the sum of the size of the k-th electrode in the i-th electrode row and the size of the k-th electrode in the i−2-th electrode row.

Two or more electrodes connected by one signal line may be spaced apart from each other by another electrode and may be separately disposed in two or more non-adjacent electrode rows.

The two or more electrodes connected by the one signal line may be operated as one touch electrode in an equivalent potential state in touch driving.

The size of the first electrode in the i+1-th electrode row positioned between the first electrode in the i-th electrode row and the first electrode in the i+2-th electrode row may be the same as or larger than the sum of the size of the first electrode in the i-th electrode row and the size of the k-th electrode in the i-th electrode row.

A k-th electrode in an i−1-th electrode row positioned between the k-th electrode in the i-th electrode row and the k-th electrode in the i−2-th electrode row may be the same in size as the size of the first electrode in the i+1-th electrode row positioned between the first electrode in the i-th electrode row and the first electrode in the i+2-th electrode row.

The k-th electrode in the i−1-th electrode row positioned between the k-th electrode in the i-th electrode row and the k-th electrode in the i−2-th electrode row may be shifted in a row direction by a multiple of an integer of an electrode length from the first electrode in the i+1-th electrode row positioned between the first electrode in the i-th electrode row and the first electrode in the i+2-th electrode row.

The plurality of signal lines may be arranged in a column direction and each signal line may overlap one or more electrodes.

The plurality of electrodes may be all positioned in the same layer and the plurality of signal lines may be positioned in a different layer from the plurality of electrodes.

The first signal line may overlap the first electrode in the i+1-th electrode row positioned between the first electrode in the i-th electrode row and the first electrode in the i+2-th electrode row. The second signal line may overlap the k-th electrode in the i−1-th electrode row positioned between the k-th electrode in the i-th electrode row and the k-th electrode in the i−2-th electrode row.

k may show how many electrodes disposed in the same electrode row change together in connection pattern. For example, k may be 2. As another example, k may be 3.

The number of electrodes electrically connected by the first signal line may be two or more and the number of electrodes electrically connected by the second signal line may be two or more.

One or more electrodes of electrodes electrically connected by the first signal line and one or more of electrodes electrically connected by the second signal line may be disposed in the same electrode row.

The plurality of electrodes may be arranged in n electrode rows and disposed in an active area, and one electrode row of two adjacent electrode rows of the n electrode rows may include more electrodes than the other electrode row of the two adjacent electrode rows of the n electrode rows. Here, n may be an integer larger than 1.

Some electrodes positioned in a first electrode row or a second electrode row in an upper edge area of the active area and some electrodes positioned in an n−1-th electrode row or an n-th electrode row of a lower edge area of the active area, in the plurality of electrodes, may be electrically connected by a third signal line in the active area.

The third signal line may overlap electrodes disposed between the some electrodes positioned in the first electrode row or the second electrode row and the some electrodes positioned in the n−1-th electrode row or the n-th electrode row.

The plurality of electrodes may be arranged in n electrode rows and disposed in an active area, and one electrode row of two adjacent electrode rows of the n electrode rows may include more electrodes than the other electrode row of the two adjacent electrode rows of the n electrode rows. n may be an integer larger than 1.

In the plurality of electrodes, two or more electrodes of electrodes positioned in a first electrode row or a second electrode row in an upper edge area of the active area may be electrically connected by a fourth signal line detouring through an upper outside area of the active area.

In the plurality of electrodes, two or more electrodes of electrodes positioned in an n-th electrode row or an n−1-th electrode row in a lower edge area of the active area may be electrically connected by a fifth signal line detouring through a lower outside area of the active area.

The plurality of electrodes may be disposed in an active area and two or more left outermost electrodes of electrodes positioned in a left edge area of the active area of the plurality of electrodes may be electrically connected by a sixth signal line in the active area. The sixth signal line may overlap electrodes disposed between the two or more left outermost electrodes.

Two or more right outermost electrodes of electrodes positioned in a right edge area of the active area of the plurality of electrodes may be electrically connected by a seventh signal line in the active area. The seventh signal line may overlap electrodes disposed between the two or more right outermost electrodes.

The plurality of electrodes may be disposed in an active area, and two or more left outermost electrodes of electrodes positioned in a left edge area of the active area of the plurality of electrodes may be electrically connected by a sixth signal line detouring through a left outside area of the active area.

Two or more right outermost electrodes of electrodes positioned in a right edge area of the active area of the plurality of electrodes may be electrically connected by a seventh signal line detouring through a right outside area of the active area.

The touch display device may further include a touch sensing circuit that senses two or more electrodes grouped in a touch electrode of the plurality of electrodes.

The touch sensing circuit may supply a touch driving signal to the first electrode in the i-th electrode row and the first electrode in the i+2-th electrode row, and may supply a touch driving signal to the first electrode in the i+1-th electrode row positioned between the first electrode in the i-th electrode row and the first electrode in the i+2-th electrode row.

The touch sensing circuit may sense capacitance (self-capacitance) of the first electrode in the i-th electrode row and the first electrode in the i+2-th electrode row, and may sense capacitance (self-capacitance) of the first electrode in the i+1-th electrode row positioned between the first electrode in the i-th electrode row and the first electrode in the i+2-th electrode row.

When the touch sensing circuit supplies a touch driving signal to two or more electrodes grouped in a touch electrode of the plurality of electrodes, a signal having the same amplitude and phase as the touch driving signal may be applied to a plurality of data lines disposed in a display panel.

When the touch sensing circuit supplies a touch driving signal to two or more electrodes grouped in a touch electrode of the plurality of electrodes, a data signal in which the touch driving signal and a data voltage for image display have been combined may be applied to a plurality of data lines disposed in a display panel.

The touch sensing circuit may sense capacitance (mutual-capacitance) between the first electrode in the i-th electrode row and the first electrode in the i+1-th electrode row, and may sense capacitance between the first electrode in the i+2-th electrode row and the first electrode in the i+1-th electrode row.

In another aspect, embodiments of the present disclosure may provide a touch display device including a plurality of row electrode lines arranged in a row direction and a plurality of column electrode lines arranged in a column direction.

The plurality of row electrode lines each may be disconnected at one or more points. A first row electrode line and a second row electrode line of the plurality of row electrode lines may have different row-directional positions of the disconnect points.

The plurality of column electrode lines each may be disconnected at one or more points. A first column electrode line and a second column electrode line of the plurality of column electrode lines may have different column-directional positions of the disconnect points.

Some of the plurality of row electrode lines and some of the plurality of column electrode lines may cross each other. Some of the plurality of other row electrode lines and some of the plurality of other column electrode lines may not cross each other at the disconnect points.

The plurality of row electrode lines and the plurality of column electrode lines may be disposed in the same layer.

In another aspect, embodiments of the present disclosure may provide a touch display device including: a touch display panel including a first touch electrode group, a second touch electrode group, and a third touch electrode group; and a sensing circuit.

The first touch electrode group may include a 1-1 touch electrode, a 1-2 touch electrode, and a 1-3 touch electrode, and may include a first connection connecting the 1-1 touch electrode and the 1-2 touch electrode; the second touch electrode group may include a 2-1 touch electrode, a 2-2 touch electrode, and a 2-3 touch electrode, and may include a second connection connecting the 2-1 touch electrode and 2-2 touch electrode; and the third touch electrode group may include a 3-1 touch electrode, a 3-2 touch electrode, and a 3-3 touch electrode, and may include a third connection connecting the 3-1 touch electrode and the 3-2 touch electrode. The 1-2 touch electrode of the first touch electrode group may be electrically connected with a sensing circuit through a first sensing line, the 2-2 touch electrode of the second touch electrode group may be electrically connected with the sensing circuit through a second sensing line, and the 3-2 touch electrode of the third touch electrode group may be electrically connected with the sensing circuit through the second sensing line.

The 1-3 touch electrode may be disposed between the second touch electrode group and the third touch electrode group.

The second sensing line may overlap the 1-3 touch electrode, the 3-1 touch electrode, the 3-2 touch electrode, and the 3-3 touch electrode.

The second sensing line may be not electrically connected with the 1-3 touch electrode, the 3-1 touch electrode, the 3-2 touch electrode, and the 3-3 touch electrode.

According to embodiments of the present disclosure, there is an effect in that there is provided a touch display device that can reduce the number of signal wires and the number of touch channels and can prevent or reduce a ghost phenomenon in multi-touching.

Further, according to embodiments of the present disclosure, there is an effect in that there is provided a touch display device including a new type of touch panel that can reduce the number of signal wires and the number of touch channels and can prevent or reduce a ghost phenomenon in multi-touching.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 30 is a diagram showing a touch driving signal TDS for each of three cases of time free driving in a touch display device according to embodiments of the present disclosure;

DETAILED DESCRIPTION

Figure 1:
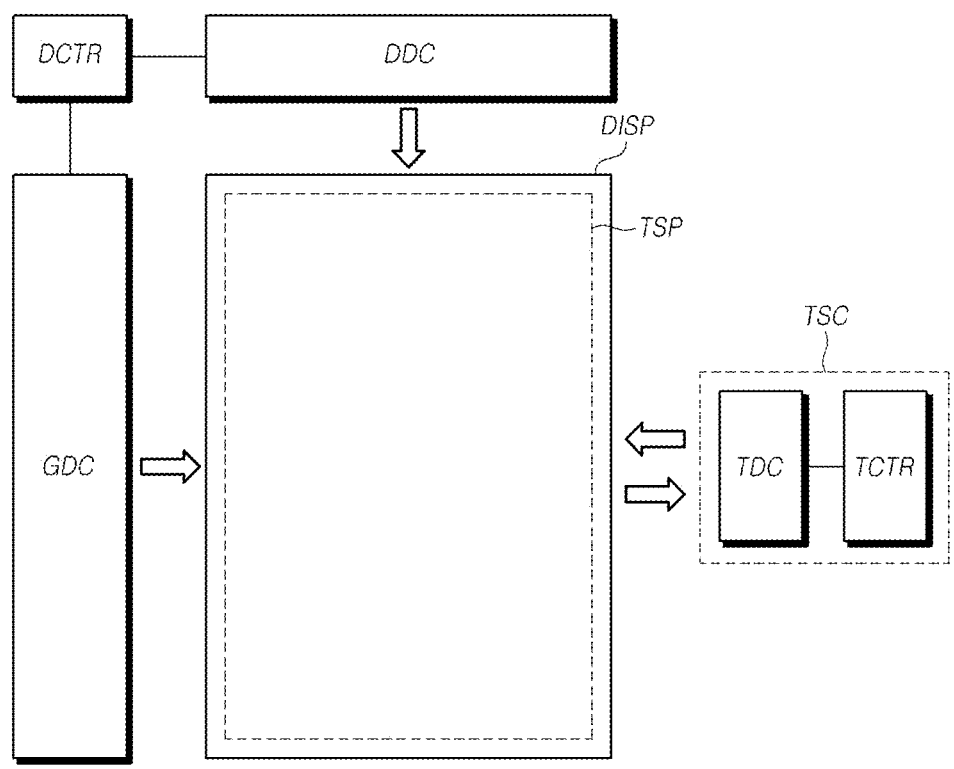
FIG. 1 is a schematic system configuration diagram of a touch display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting", "making up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, . . . are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a schematic system configuration diagram of a touch display device according to embodiments of the present disclosure.

Referring to FIG. 1, a touch display device according to embodiments of the present disclosure can provide all of a function for displaying images and a function for touch sensing.

In order to provide an image display function, a touch display device according to embodiments of the present disclosure may include: a display panel DISP on which a plurality of data lines and a plurality of gate lines are disposed and a plurality of subpixels defined by the plurality of data lines and the plurality of gate lines is arranged; a data driving circuit DDC driving the plurality of data lines; a gate driving circuit GDC driving the plurality of gate lines; a display controller DCTR controlling operation of the data driving circuit DDC and the gate driving circuit GDC, etc.

The data driving circuit DDC, the gate driving circuit GDC, and the display controller DCTR each may be implemented by one or more separate parts. Depending on cases, two or more of the data driving circuit DDC, the gate driving circuit GDC, and the display controller DCTR may be integrally implemented in a single part. For example, the data driving circuit DDC and the display controller DCTR may be implemented in one integrated circuit chip (IC chip).

In order to provide the touch sensing function, the touch display device according to embodiments of the present disclosure may include: a touch panel TSP including a plurality of touch electrodes; and a touch sensing circuit TSC supplying a touch driving signal to the touch panel TSP, detecting a touch sensing signal from the touch panel TSP, and sensing whether there has been a touch by a user or, a touch position (touch coordinates) on the touch panel TSP on the basis of the detected touch sensing signal.

The touch sensing circuit TSC, for example, may include: a touch driving circuit TDC supplying a touch driving signal to the touch panel TSP and detecting a touch sensing signal from the touch panel TSP; and a touch controller TCTR sensing whether there has been a touch by a user and/or a touch position on the touch panel TSP on the basis of the touch sensing signal detected by the touch driving circuit TDC.

The touch driving circuit TDC may include a first circuit part supplying a touch driving signal to the touch panel TSP and a second circuit part detecting a touch sensing signal from the touch panel TSP. The first circuit part and the second circuit part may be integrated in a single part or may be separated.

The touch driving circuit TDC and the touch controller TCTR may be implemented as separate parts or may be integrally implemented in a single part.

The data driving circuit DDC, the gate driving circuit GDC, and the touch driving circuit TDC each may be implemented as one or more integrated circuits and may be implemented in a Chip On Glass (COG) type, a Chip On Film (COF) type, or a Tape Carrier Package (TCP) type in terms of electrical connection with the display panel DISP, and the gate driving circuit GDC may be implemented in a Gate In Panel (GIP) type.

The circuit components DDC, GDC, and DCTR for display driving and the circuit components TDC and TCTR for touch driving and sensing each may be implemented as one or more separate parts. Depending on cases, one or more of the circuit components DDC, GDC, and DCTR for display driving and one or more of the circuit components TDC and TCTR for touch driving and sensing may be functionally integrated or may be implemented as one or more separate parts. For example, the data driving circuit DDC and the touch driving circuit TDC may be integrally implemented in one, two or more integrated circuit chips. When the data driving circuit DDC and the touch driving circuit TDC are integrally implemented in two or more integrated circuit chips, each of the two or more integrated circuit chips may have a data driving function and a touch driving function.

The touch display device according to embodiments of the present disclosure may be various types such as a Liquid Crystal Display (LCD) type and an Organic Light Emitting Diode (OLED) display type. The case when the touch display device is an LCD is exemplified hereafter for the convenience of description. That is, the display panel DISP may be various types such as an OLED panel, and an LCD panel, but it is exemplified that the display panel DISP is an LCD panel hereafter for the convenience of description.

Further, though will be described below, the touch panel TSP may include a plurality of touch electrodes to which a touch driving signal can be applied or from which a touch sensing signal can be detected, a plurality of signal lines for connecting the plurality of touch electrodes to the touch driving circuit TDC, etc.

The touch panel TSP may exist outside the display panel DISP. That is, the touch panel TSP and the display panel DISP may be separately manufactured and then combined. The touch panel TSP is called an external type or an add-on type.

Unlike, the touch panel TSP may be disposed in the display panel DISP. That is, when the display panel DISP is manufactured, the touch sensor structure such as the plurality of touch electrodes constituting the touch panel TSP, and the plurality of signal lines may be formed with electrodes and signal lines for display driving. This touch panel TSP is called a built-in type. The case when the touch panel TSP is a built-in type is exemplified hereafter for the convenience of description.

The size of each of the touch electrodes described herein may correspond to the area size of one subpixel and may correspond to the area size of two or more subpixels.

The touch electrodes each may be a plate type without an opening or a mesh type with one or more openings.

If one touch electrode is a mesh type and has a size corresponding to the area size of two or more subpixels, the touch electrode may have two or more openings and the position and size of each of the two or more openings may correspond to the position and size of a light emission area of the subpixels.

Figure 2:
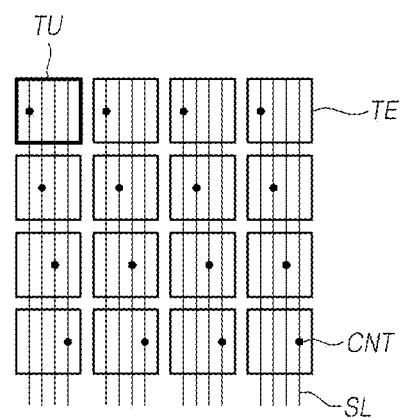
FIG. 2 is a diagram showing a split type touch panel of a touch display device according to embodiments of the present disclosure.

FIG. 2 is a diagram showing a split type touch panel TSP of a touch display device according to embodiments of the present disclosure.

Referring to FIG. 2, the touch panel TSP of a touch display device according to embodiments of the present disclosure may be a split type in which a plurality of touch electrodes TE is separated from each other.

Referring to FIG. 2, when the touch panel is a split type touch panel TSP, each of a plurality of touch electrodes TE may be electrically connected with signal lines SL through one or more contact holes CNT.

The plurality of touch electrodes TE may be positioned in an active area. Depending on cases, some (e.g., outermost touch electrodes) of the plurality of touch electrodes TE may be positioned in an outside area (outer area) of the active area or may extend to the outside area (outer area) of the active area. The active area may be an area in which images are displayed or touch sensing is possible.

As shown in FIG. 2, a plurality of signal lines SL electrically connected to the plurality of touch electrodes TE may be positioned in an active area. Depending on cases, all or some of the plurality of signal lines SL may be positioned outside the active area.

As shown in FIG. 2, when the plurality of signal lines SL electrically connected to the plurality of touch electrodes TE are positioned in the active area, the plurality of signal lines SL may be positioned in a layer different from the plurality of touch electrodes TE, thereby overlapping the plurality of touch electrodes TE.

As shown in FIG. 2, the plurality of signal lines SL all may have the same or similar length and may be disposed from the point connected with the touch sensing circuit TSC to the opposite point. The plurality of signal lines SL may be different only in the position (i.e., the position of the contact hole CNT) where they are respectively electrically connected with the touch electrodes TE.

Alternatively, the plurality of signal lines SL may extend from the points connected with the touch sensing circuit TSC to the points where corresponding contact holes CNT are positioned.

Hereafter, referring to FIG. 2, the plurality of touch electrodes TE may be called touch units TU in the split type touch panel TSP.

Referring to FIG. 2, when it is a split type touch panel TSP, if one touch electrode TE is electrically connected with one signal line SL, there should be a plurality of signal lines SL as many as the number of a plurality of touch electrodes TE. The number of the plurality of signal lines SL correspond to the number of touch channels for signal input/output of the touch driving circuit TDC.

According to the example shown in FIG. 2, sixteen touch electrodes TE are arranged in four rows and four columns in the touch panel TSP. In this case sixteen signal lines SL and sixteen touch channels may exist. That is, the number of touch electrodes of a split type touch panel TSP is determined as the product of the number of the touch electrodes disposed in one touch electrode row and the number of the touch electrodes disposed in one touch electrode column.

That is, in the split type touch panel TSP, the number of touch channels and the number of signal lines are determined as the product of the number of the touch electrodes disposed in one touch electrode row and the number of the touch electrodes disposed in one touch electrode column.

Accordingly, in a split type touch panel TSP, the larger the number of touch electrodes, the larger the number of signal lines and the number of touch channels.

When the size of the touch panel TSP increases or when many touch electrodes are provided to increase precision of touch sensing, the number of the signal lines and the number of the touch channels may excessively increase. Accordingly, panel manufacturing may become complicated, and the touch driving circuit TDC may become complicated and may become expensive.

The split type touch panel TSP shown in FIG. 2 may be a touch sensor for sensing touches on the basis of the self-capacitance of each of the touch electrodes TE or may be a touch sensor for sensing touches on the basis of mutual-capacitance between the touch electrodes TE.

Figure 3:
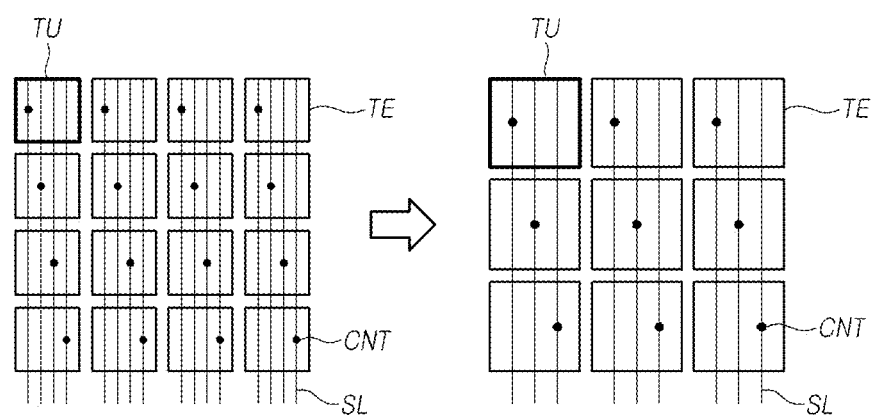
FIG. 3 is a diagram showing increasing a touch electrode size in a split type touch panel to reduce the number of signal lines and the number of touch channels in a touch display device according to embodiments of the present disclosure.

FIG. 3 is a diagram showing increasing a touch electrode size in a split type touch panel TSP to reduce the numbers of signal wires and touch channels in a touch display device according to embodiments of the present disclosure.

As shown in FIG. 3, in a touch display device, it is possible to increase the touch electrode size (touch unit size) in a split type touch panel TSP in order to reduce the number of signal lines and the number of touch channels.

According to the example of FIG. 3, the number of touch electrodes (the number of touch unit) is decreased from 16 (=4*4) to 9 (=3*3), and the number of signal lines and the number of touch channels are also decreased from 16 (=4*4) to 9 (=3*3).

As described above, when a touch electrode size is increased, it is possible to reduce the number of touch electrodes, the number of signal lines, and the number of touch channels, but the touch sensing function may be deteriorated.

For example, when a touch electrode size is increased, two or more touch positions may be sensed even though a user actually has touched one point. This phenomenon is called finger separation or touch separation.

Figure 4:
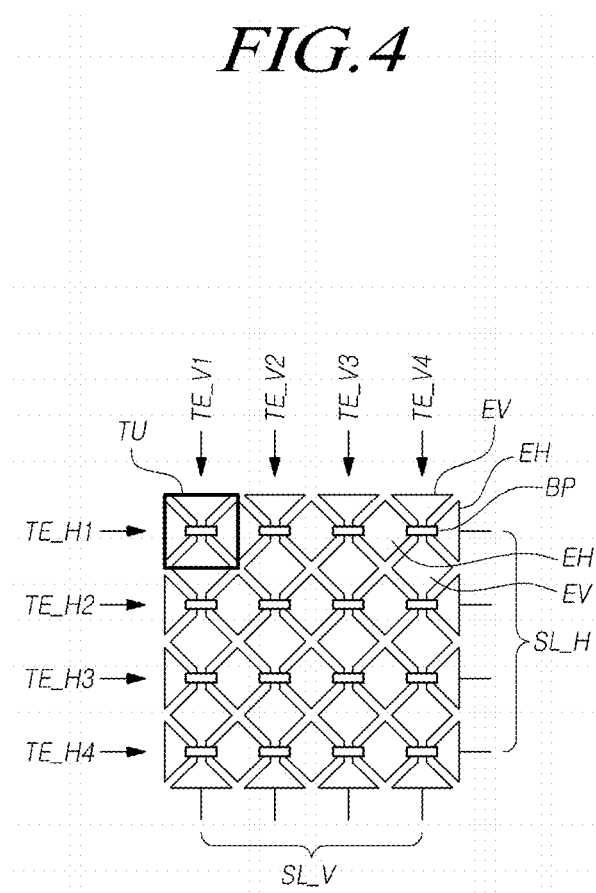
FIG. 4 is a diagram showing a matrix type touch panel of a touch display device according to embodiments of the present disclosure.

FIG. 4 is a diagram showing a matrix type touch panel TSP of a touch display device according to embodiments of the present disclosure.

Referring to FIG. 4, when the touch panel TSP of a touch display device according to embodiments of the present disclosure is a matrix type, a plurality of touch electrodes TE_H1~TE_H4 disposed in the row direction and a plurality of touch electrodes TE_V1~TE_V4 disposed in the column direction may be arranged across each other in the touch panel TSP.

The plurality of touch electrodes TE_H1~TE_H4 disposed in the row direction each may be configured as one electrode.

Unlike, the plurality of touch electrodes TE_H1~TE_H4 disposed in the row direction, as shown in FIG. 4, each may be composed of several separate electrodes EH electrically connected with each other. In this case, the several separate electrodes EH included in each of the plurality of touch electrodes TE_H1~TE_H4 disposed in the row direction may be electrically connected by bridges BP.

Since the several separate electrodes EH included in each of the plurality of touch electrodes TE_H1~TE_H4 disposed in the row direction are electrically connected by the bridges BP, they have electrically equivalent potential. The bridges BP and the several separate electrodes EH are disposed in different layers and may be electrically connected through contact holes.

The plurality of touch electrodes TE_V1~TE_V4 disposed in the column direction each may be composed of several separate electrodes EH electrically connected with each other.

Unlike, as shown in FIG. 4, the plurality of touch electrodes TE_V1~TE_V4 disposed in the column direction each may configured as one electrode EV.

The shape, arrangement, and configuration of the touch electrodes TE_H1~TE_H4 and TE_V1~TE_V4 exemplified in FIG. 4 are only examples for implementing a matrix type touch panel TSP, and they may be implemented in various ways without being limited thereto.

According to the example of FIG. 4, a signal line SL H may be connected to each of the four touch electrodes TE_H1~TE_H4 disposed in the row direction. A signal line SL V may be connected to each of the four touch electrodes TE_V1~TE_V4 disposed in the column direction.

In the matrix type touch panel TSP shown in FIG. 4, the number of the signal lines is the sum of the number of the touch electrodes TE_H1~TE_H4 disposed in the row direction and the number of the touch electrodes TE_V1~TE_V4 disposed in the column direction.

The matrix type touch panel TSP shown in FIG. 4 has the same size as the split type touch panel TSP shown in FIG. 2. Accordingly, the number of touch units in the touch panel of FIG. 4 is 16 (=4*4), the same as that in FIG. 2.

However, in the matrix type touch panel TSP shown in FIG. 4, the number of the signal lines is a total of 8 (=4+4), which is smaller than 16 (=4*4) that is the number of the signal lines in the split type touch panel TSP of FIG. 2.

Similarly, in the matrix type touch panel TSP shown in FIG. 4, the number of the touch channels is a total of 8 (=4+4), which is smaller than 16 (=4*4) that is the number of the touch channels in the split type touch panel TSP of FIG. 2.

Accordingly, it is possible to reduce the number of signal lines and the number of touch panels by arranging the plurality of touch electrodes TE_H1~TE_H4 and TE_V1~TE_V4 included in the touch panel TSP in a matrix type, as in FIG. 4, that is, implementing the touch panel TSP as a matrix type.

The matrix type touch panel TSP shown in FIG. 4 may be a touch sensor for sensing touches on the basis of the self-capacitance of each of the touch electrodes TE_H1~TE_H4 and TE_V1~TE_V4 that cross each other, or may be a touch sensor for sensing touches on the basis of mutual-capacitance between the touch electrodes TE_H1~TE_H4 disposed in the row direction and the touch electrodes TE_V1~TE_V4 disposed in the column direction.

Figure 5:
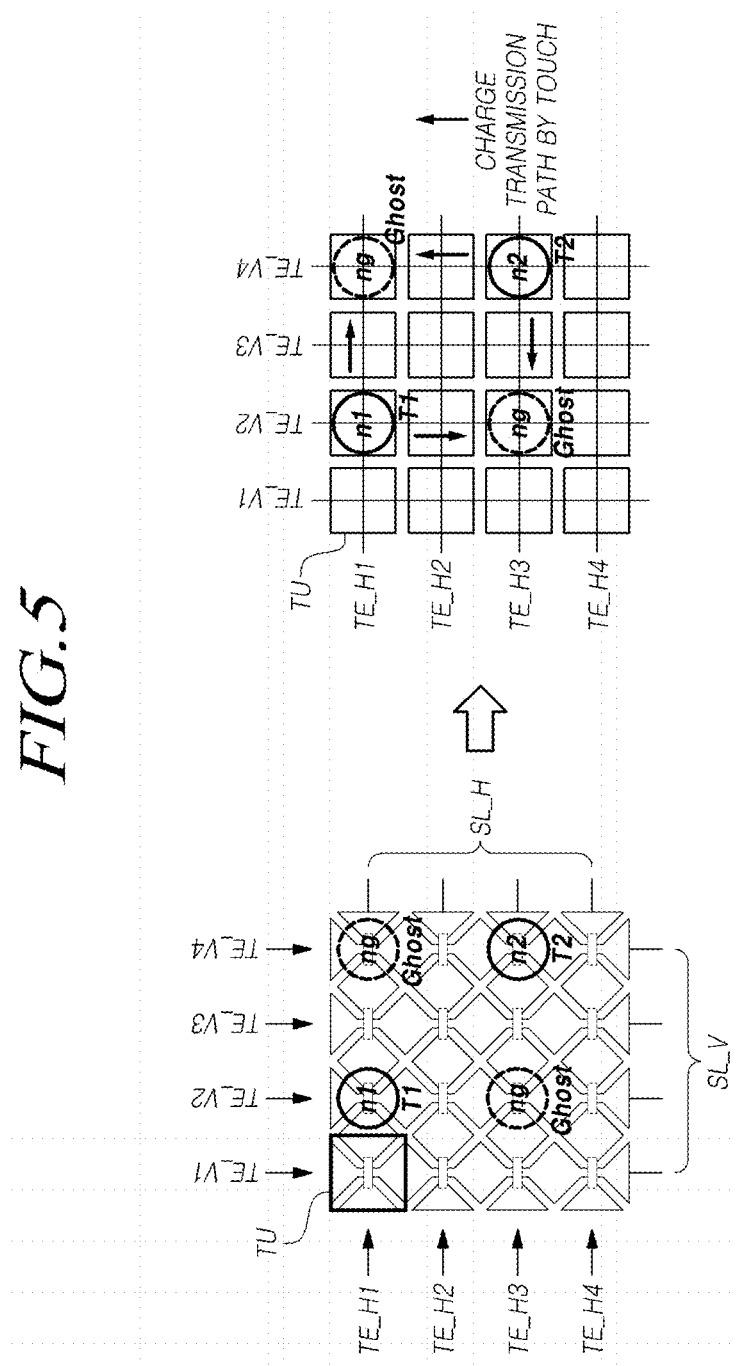
FIG. 5 is a diagram showing a ghost phenomenon that occurs in multi-touching in a matrix type touch panel of a touch display device according to embodiments of the present disclosure.

FIG. 5 is a diagram showing a ghost phenomenon that occurs in multi-touching in a matrix type touch panel TSP of a touch display device according to embodiments of the present disclosure.

Referring to FIG. 5, when the touch panel of a touch display device according to embodiments of the present disclosure is a matrix type touch panel TSP, touch electrodes TE_H1~TE_H4 disposed in the row direction and touch electrodes TE_V1~TE_V4 disposed in the column direction are arranged across each other.

Accordingly, when a user simultaneously touches two or more points n1 and n2 (T1 and T2), the touch sensing circuit TSC may recognize as if the user has touched not only the actually touched points n1 and n2, but also points ng that the user has not actually touched.

That is, in the matrix type touch panel TSP, when multi-touches T1 and T2 occur at two or more points n1 and n2, the touch sensing circuit TSC may mistake the actual touch points n1 and n2 and fake touch points ng all for touch points.

This phenomenon in which the fake touch points ng are mistaken for touch points, as described above, is called a "ghost phenomenon".

The fake touch points ng where the ghost phenomenon occurs are points where the points n1 and n2 with the actual multi-touches T1 and T2 cross each other in the row direction and the column direction.

The ghost phenomenon may occur because touch electrodes that cross each other (TE_H1, TE_H3, TE_V2, and TE_V4 in the example of FIG. 5) function as paths through which charge by multi-touches T1 and T2 at the actual touch points n1 and n2 are transmitted. In FIG. 5, the arrows show transmission of charge that causes a ghost phenomenon.

As described above, in a split type touch panel TSP, since many touch electrodes are provided, there are a defect that the number of signal lines and the number of touch channels are also increased, and this defect can be overcome by increasing the touch electrode size. However, there is still a defect that the touch sensing performance is deteriorated by finger separation etc.

On the other hand, the matrix type touch panel TSP has a defect that although it is possible to reduce the number of signal lines and the number of touch channels, a ghost phenomenon occurs in multi-touching.

Accordingly, embodiments of the present disclosure additionally propose a touch panel TSP having a peculiar electrode arrangement structure and electrode connection structure to reduce the number of signal lines and the number of touch channels and prevent a ghost phenomenon occurs even in multi-touching.

This touch panel TSP is called hereafter a "woven type". The "woven type" may be a meaning that electrodes are complicatedly entangled or a meaning that electrodes are entangled.

Such a woven type touch panel TSP has an electrode arrangement structure and an electrode connection structure that disconnect charge transmission paths based on touches at several points. Accordingly, it is possible to prevent charge generated at actual touch points n1 and n2 from being transmitted to other surrounding points (points that may cause a ghost phenomenon). This woven type is also called a "matrix type with several disconnected points".

FIGS. 6 to 11 are diagrams of woven type touch panels TSP in a touch display device according to embodiments of the present disclosure.

Figure 6:
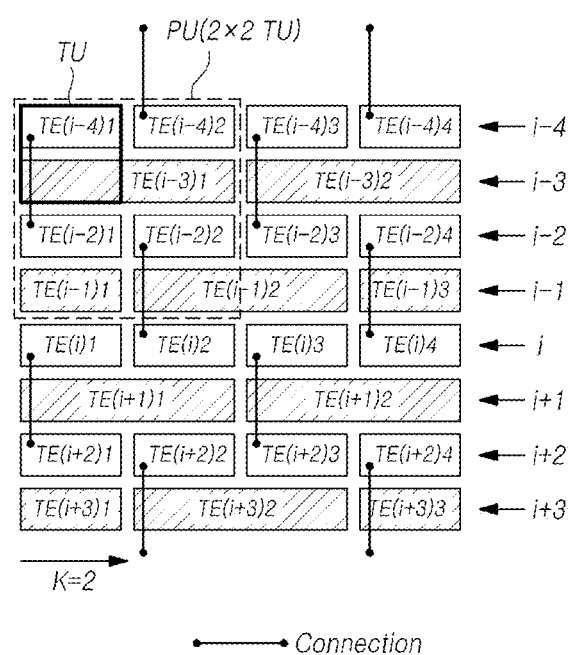
FIGS. 6 to 8 are diagram showing a woven type touch panel having repeated 2*2 TUs in a touch display device according to embodiments of the present disclosure.
Figure 7:
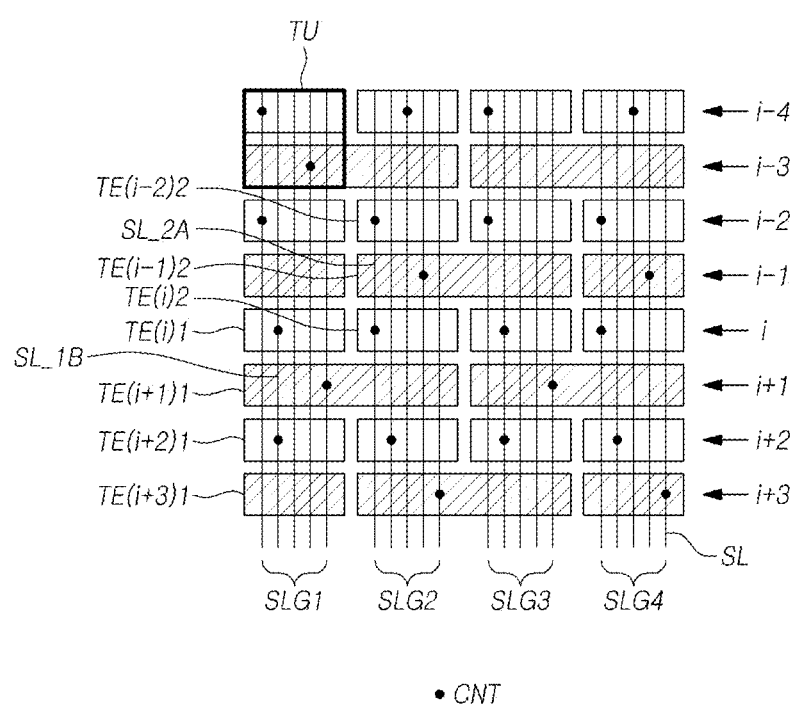
Figure 8:
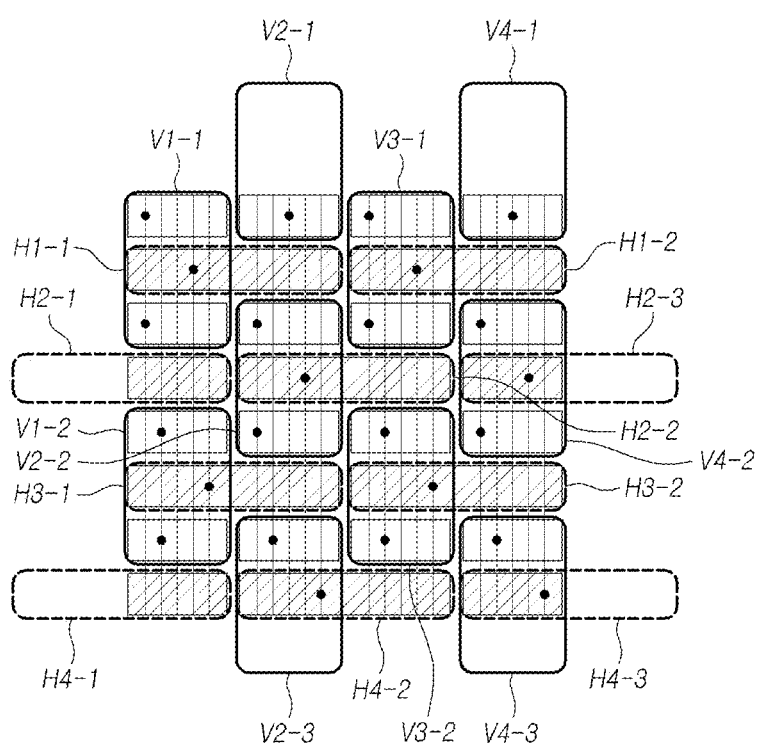

FIGS. 6 to 8 are diagrams showing a woven type touch panel TSP having repeated 2*2 touch units TU in a touch display device according to embodiments of the present disclosure, in which FIG. 6 is a diagram showing an electrode arrangement structure and FIG. 7 is a diagram showing an electrode connection structure in the electrode arrangement structure of FIG. 6. FIG. 8 is a diagram showing the configuration of an actual touch sensor (touch electrodes) according to the electrode connection structure of FIG. 7.

Figure 9:
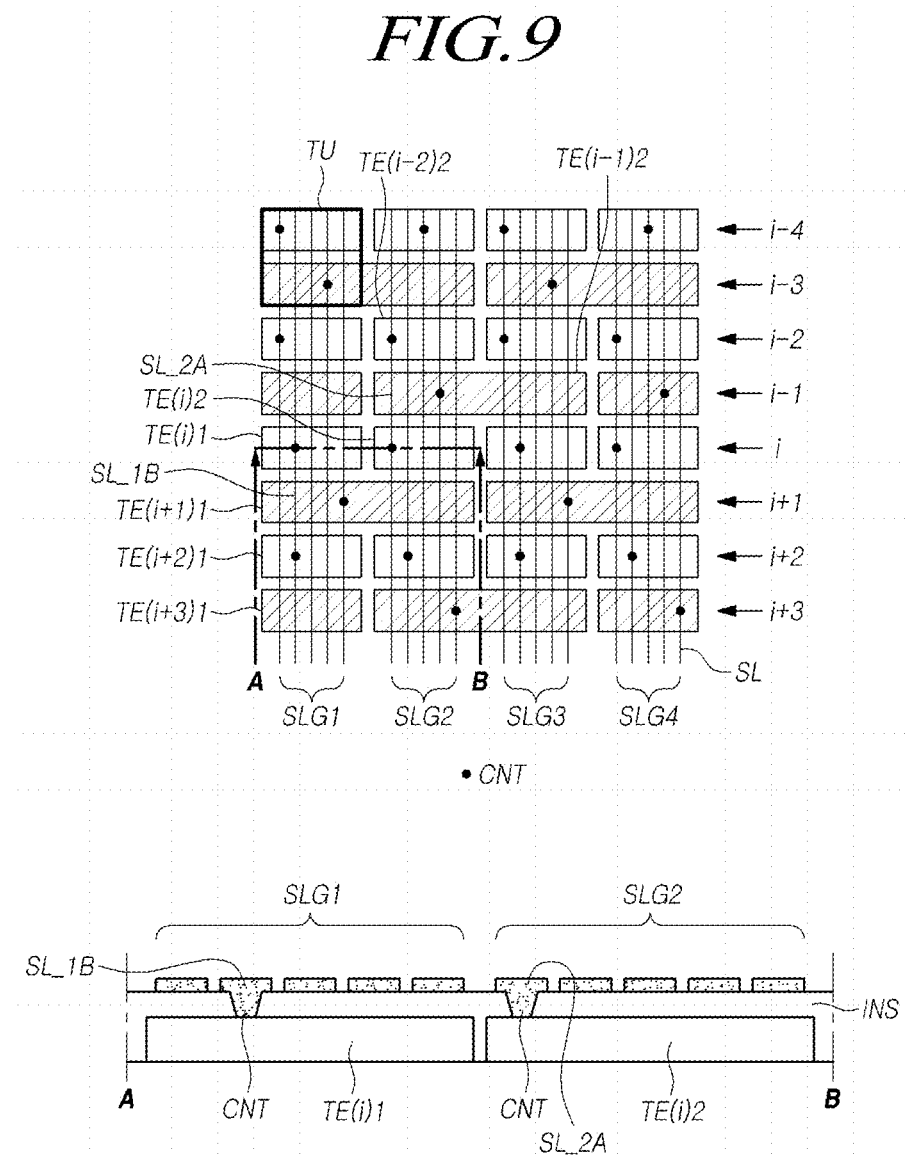
FIGS. 9 and 10 are diagrams illustrating a main cross-sectional structure of a woven type touch panel of a touch display device according to embodiments of the present disclosure.
Figure 10:
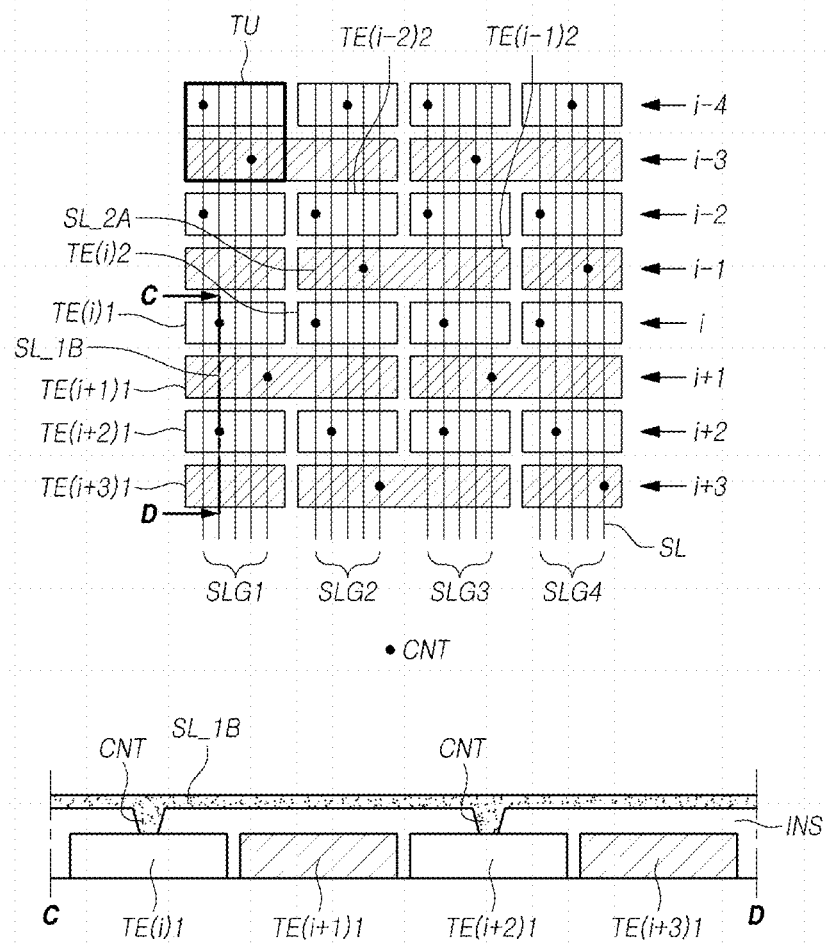
Figure 11:
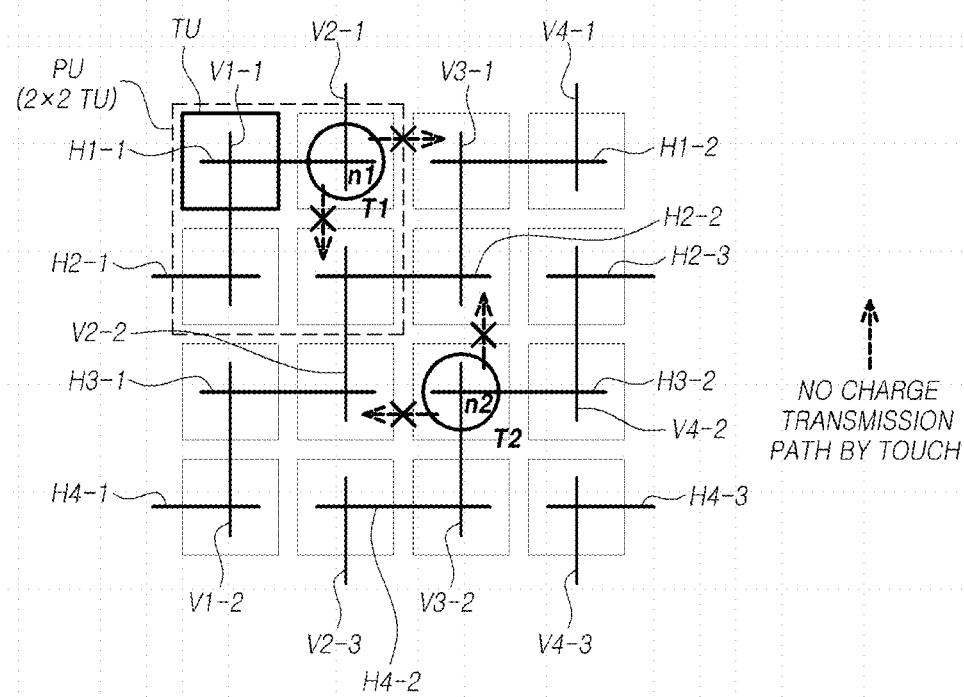
FIG. 11 is a diagram illustrating a ghost phenomenon reduction effect of a woven type touch panel of a touch display device according to embodiments of the present disclosure.

FIGS. 9 and 10 are diagrams illustrating a main cross-sectional structure of a woven type touch panel TSP of a touch display device according to embodiments of the present disclosure and FIG. 11 is a diagram illustrating a ghost phenomenon reduction effect of a woven type touch panel TSP of a touch display device according to embodiments of the present disclosure.

Referring to FIG. 6, a touch panel TSP may include a plurality of electrodes TE(i−4)1~TE(i−4)4, TE(i−3)1~TE(i−3)2, TE(i−2)1~TE(i−2)4, TE(i−1)1~TE(i−1)3, TE(i)1~TE(i)4, TE(i+1)1~TE(i+1)2, TE(i+2)1~TE(i+2)4, and TE(i+3)1 TE(i+3)3. Here, i may be an integer larger than 4.

Referring to FIG. 7, the touch panel TSP may include a plurality of signal lines SL electrically connected with the plurality of electrodes TE(i−4)1~TE(i−4)4, TE(i−3)1~TE(i−3)2, TE(i−2)1~TE(i−2)4, TE(i−1)1~TE(i−1)3, TE(i)1~TE(i)4, TE(i+1)1~TE(i+1)2, TE(i+2)1~TE(i+2)4, and TE(i+3)1 TE(i+3)3 through a plurality of contact holes CNT. The plurality of signal lines SL may be grouped into two or more signal line groups SLG1, SLG2, SLG3, and SLG4.

The plurality of electrodes TE(i−4)1~TE(i−4)4, TE(i−3)1~TE(i−3)2, TE(i−2)1~TE(i−2)4, TE(i−1)1~TE(i−1)3, TE(i)1~TE(i)4, TE(i+1)1~TE(i+1)2, TE(i+2)1~TE(i+2)4, and TE(i+3)1~TE(i+3)3 may be disposed in a plurality of electrode rows i−4, i−3, i−2, i−1, i, i+1, i+2, and i+3.

In the woven type touch panel TSP according to embodiments of the present disclosure, the same number of electrodes are not disposed each of the plurality of electrode rows i−4, i−3, i−2, i−1, i, i+1, i+2, and i+3.

In the woven type touch panel TSP according to embodiments of the present disclosure, more electrodes may be disposed in any one electrode row (e.g., i) of any two adjacent electrode rows (e.g., i+1 and i) than the other electrode row (e.g., i+1) in the plurality of electrode rows i−4, i−3, i−2, i−1, i, i+1, i+2, and i+3.

Accordingly, the sizes of the electrodes (e.g., TE(i+1)1 and TE(i+1)2) in any one electrode row (e.g., i+1) of any two adjacent electrode rows (e.g., i+1 and i) of the plurality of electrode rows i−4, i−3, i−2, i−1, i, i+1, i+2, and i+3 may be the same as or larger than the sizes of the electrodes (e.g., TE(i)1, TE(i)2, TE(i)3, and TE(i)4) in the other one electrode row (e.g., i).

Referring to FIGS. 6 to 8, the first electrode TE(i)1 in the i-th electrode row and the first electrode TE(i+2)1 in the i+2-th electrode row may be electrically connected to each other by a first signal line SL_1B.

Referring to FIGS. 6 to 8, the k-th electrode TE(i)k in the i-th electrode row and the k-th electrode TE(i−2)k in the i−2-th electrode row may be electrically connected to each other by a second signal line SL_2A.

k stated above may show how many electrodes disposed in the same electrode row change together in connection pattern and may be a natural number of 2 or more.

k is 2 in the touch panel TSP exemplified in FIGS. 6 to 11.

Accordingly, in the following description, the k-th electrode TE(i)k in the i-th electrode row is referred to as a second electrode TE(i)2 and the k-th electrode TE(i−2)k in the i−2-th electrode row is referred to as a second electrode TE(i−2)2.

Referring to FIGS. 6 to 8, the numbers of electrodes disposed in the odd number-th electrode rows and the numbers of electrodes disposed in the even number-th electrode rows may be different from each other.

Accordingly, the sizes of the electrodes disposed in the odd number-th electrode rows and the sizes of the electrodes disposed in the even number-th electrode rows may be different from each other.

However, the sizes of the electrodes disposed in the odd number-th electrode rows may be the same. Further, the sizes of the electrodes disposed in the even number-th electrode rows may be the same.

Referring to FIGS. 6 to 8, assuming that the i−4-th electrode row, the i−2-th electrode row, the i-th electrode row, and the i+2-th electrode row are odd number-th electrode rows, and the i−3-th electrode row, the i−1-th electrode row, the i+1-th electrode row, and the i+3-th electrode row are even number-th electrode rows, the numbers of the electrodes disposed in the odd number-th electrode rows may be larger than the numbers of the electrodes disposed in the even number-th electrode rows. Accordingly, the sizes of the electrodes disposed in the odd number-th electrode rows may be smaller than the sizes of the electrodes disposed in the even number-th electrode rows.

Referring to FIGS. 6 to 8, the sizes of the first electrode TE(i)1 in the i-th electrode row, the first electrode TE(i+2)1 in the i+2-th electrode row, the second electrode TE(i)2 in the i-th electrode row, and the second electrode TE(i−2)2 in the i−2-th electrode row may correspond to one another.

Referring to FIGS. 6 to 8, the size of the first electrode TE(i+1)1 in the i+1-th electrode row positioned between the first electrode TE(i)1 in the i-th electrode row and the first electrode TE(i+2)1 in the i+2-th electrode row may be the same as or larger than the sum of the size of the first electrode TE(i)1 in the i-th electrode row and the size of the first electrode TE(i+2)1 in the i+2-th electrode row.

Similarly, referring to FIGS. 6 to 8, the size of the second electrode TE(i−1)2 in the i−1-th electrode row positioned between the second electrode TE(i)2 in the i-th electrode row and the second electrode TE(i−2)2 in the i−2-th electrode row may be the same as or larger than the sum of the size of the second electrode TE(i)2 in the i-th electrode row and the size of the second electrode TE(i−2)2 in the i−2-th electrode row.

Referring to FIGS. 6 to 8, the size of the first electrode TE(i+1)1 in the i+1-th electrode row positioned between the first electrode TE(i)1 in the i-th electrode row and the first electrode TE(i+2)1 in the i+2-th electrode row may be the same as or larger than the sum of the size of the first electrode TE(i)1 and the size of the second electrode TE(i)2 in the i-th electrode row.

Referring to FIGS. 6 to 8, the second electrode TE(i−1)2 in the i−1-th electrode row positioned between the second electrode TE(i)2 in the i-th electrode row and the second electrode TE(i−2)2 in the i−2-th electrode row may be the same in size as the first electrode TE(i+1)1 in the i+1-th electrode row positioned between the first electrode TE(i)1 in the i-th electrode row and the first electrode TE(i+2)1 in the i+2-th electrode row.

Referring to FIGS. 6 to 8, the second electrode TE(i−1)2 in the i−1-th electrode row positioned between the second electrode TE(i)2 in the i-th electrode row and the second electrode TE(i−2)2 in the i−2-th electrode row may be shifted by a multiple of an integer (e.g., two times) of the electrode length in the row direction further than the second electrode TE(i+1)1 in the i+1-th electrode row positioned between the first electrode TE(i)1 in the i-th electrode row and the first electrode TE(i+2)1 in the i+2-th electrode row.

Referring to FIGS. 6 and 7, two or more electrodes TE(i)1 and TE(i+2)1 connected by one first signal line SL_1B may be spaced apart from each other by another electrode TE(i+1)1.

Further, two or more electrodes TE(i)1 and TE(i+2)1 connected by one first signal line SL_1B may be separately disposed in two or more non-adjacent electrode rows (i-th electrode row and i+2-th electrode row).

Further, two or more electrodes TE(i)1 and TE(i+2)1 connected by one first signal line SL_1B are spaced apart from each other by another electrode TE(i+1)1, but may be operated as one touch electrode in the equivalent potential state in touch driving.

Similarly, two or more electrodes TE(i)2 and TE(i−2)2 connected by one second signal line SL_2A may be spaced apart from each other by another electrode TE(i−1)2.

Further, two or more electrodes TE(i)2 and TE(i−2)2 connected by one second signal line SL_2A may be separately disposed in two or more non-adjacent electrode rows (i-th electrode row and i−2-th electrode row).

Further, two or more electrodes TE(i)2 and TE(i−2)2 connected by one second signal line SL_2A are spaced apart from each other by another electrode TE(i−1)2, but may be operated as one touch electrode in the equivalent potential state in touch driving.

As described above, two or more electrodes connected by one signal line are spaced apart from each other by another electrode and disposed in different electrode rows, but are electrically connected to each other, they can operate as one touch electrode.

A plurality of electrode rows included in a touch panel TSP may include odd number-th electrode rows and even number-th electrode rows.

Referring to FIGS. 6 to 8, the electrodes TE(i−4)1~TE(i−4)4, TE(i−2)1~TE(i−2)4, TE(i)1~TE(i)4, and TE(i+2)1~TE(i+2)4 (which are also referred to as vertical electrodes in the following description) disposed in the i−4-th, i−2-th, i-th, and i+2-th electrode rows respectively, which may be odd number-th or even number-th electrode rows of odd number-th electrode rows and even number-th electrode rows are vertically grouped by two or more, in which one signal line may be connected to each group (each touch electrode).

According to the example of FIG. 8, the electrodes TE(i−4)1~TE(i−4)4, TE(i−2)1~TE(i−2)4, TE(i)1~TE(i)4, and TE(i+2)1~TE(i+2)4 disposed in the i−4-th, i−2-th, i-th, and i+2-th electrode rows respectively are grouped by two, thereby forming a plurality of touch electrodes V1-1, V2-1, V3-1, V4-1, V1-2, V2-2, V3-2, V4-2, V2-3, V4-3.

Referring to FIG. 8, considering the touch electrode matrix of only the plurality of touch electrodes V1-1, V2-1, V3-1, V4-1, V1-2, V2-2, V3-2, V4-2, V2-3, V4-3, . . . formed by grouping the vertical electrodes, the first touch electrode columns V1-1 and V1-2 and the third touch electrode columns V3-1 and V3-2 are arranged in the same way, and the second touch electrode columns V2-1, V2-2, and V2-3 and the fourth electrode columns V4-1, V4-2, and V4-3 are arranged in the same way.

However, the second touch electrode columns V2-1, V2-2, and V2-3 and the fourth electrode columns V4-1, V4-2, and V4-3 are shifted by a multiple of an integer (e.g., two times) of the height of a vertical electrode (e.g., TE(i)1), as compared with the first touch electrode columns V1-1 and V1-2 and the third touch electrode columns V3-1 and V3-2.

The plurality of touch electrodes V1-1, V2-1, V3-1, V4-1, V1-2, V2-2, V3-2, V4-2, V2-3, V4-3, . . . are similar to the vertical touch electrodes TE_V1, TE_V2, TE_V3, and TE_V4 in the matrix type touch panel TSP of FIG. 4.

Referring to FIGS. 6 to 8, the electrodes TE(i−3)1 TE(i−3)2, TE(i−1)1~TE(i−1)3, TE(i+1)1~TE(i+1)2, and TE(i+3)1~TE(i+3)3 (which are also referred to as horizontal electrodes in the following description) disposed in the i−3-th, i−1-th, i+1-th, and i+3-th electrode rows, which may be even number-th or odd number-th electrode rows of odd number-th electrode rows and even number-th electrode rows may be individually connected with signal lines without being grouped.

According to the example of FIG. 8, the electrodes TE(i−3)1~TE(i−3)2, TE(i−1)1~TE(i−1)3, TE(i+1)1~TE(i+1)2, and TE(i+3)1~TE(i+3)3 disposed in the i−3-th, i−1-th, i+1-th, and i+3-th electrode rows respectively form touch electrodes H1-1, H1-2, H2-1, H2-2, H2-3, H3-1, H3-2, H4-1, H4-2, H4-3.

Referring to FIG. 8, considering the touch electrode matrix of only the plurality of touch electrodes H1-1, H1-2, H2-1, H2-2, H2-3, H3-1, H3-2, H4-1, H4-2, H4-3, . . . composed of the horizontal electrodes, the first touch electrode rows H1-1 and H1-2 and the third touch electrode rows H3-1 and H3-2 are arranged in the same way, and the second touch electrode rows H2-1, H2-2, and H2-3 and the fourth touch electrode rows H4-1, H4-2, and H4-3 are arranged in the same way.

However, the second touch electrode rows H2-1, H2-2, and H2-3 and the fourth touch electrode rows H4-1, H4-2, and H4-3 are shifted by about ½ of the length of a horizontal electrode (e.g., TE(i+1)1), as compared with the first touch electrode rows H1-1 and H1-2 and the third touch electrode rows H3-1 and H3-2.

The individual touch electrodes H1-1, H1-2, H2-1, H2-2, H2-3, H3-1, H3-2, H4-1, H4-2, H4-3, . . . are similar to the horizontal touch electrodes TE_H1, TE_H2, TE_H3, and TE_H4 in the matrix type touch panel TSP of FIG. 4.

Referring to FIGS. 6 to 10, a plurality of signal lines SL each is disposed in the column direction and each may overlap one or more electrodes.

Referring to FIGS. 6 to 10, a plurality of electrodes TE(i−4)1~TE(i−4)4, TE(i−3)1~TE(i−3)2, TE(i−2)1~TE(i−2)4, TE(i−1)1~TE(i−1)3, TE(i)1~TE(i)4, TE(i+1)1~TE(i+1)2, TE(i+2)1~TE(i+2)4, and TE(i+3)1~TE(i+3)3 all may be disposed in the same layer.

Referring to FIGS. 6 to 10, a plurality of signal lines SL may be disposed in a different layer from the plurality of electrodes TE(i−4)1~TE(i−4)4, TE(i−3)1~TE(i−3)2, TE(i−2)1~TE(i−2)4, TE(i−1)1~TE(i−1)3, TE(i)1~TE(i)4, TE(i+1)1~TE(i+1)2, TE(i+2)1~TE(i+2)4, and TE(i+3)1~TE(i+3)3 with an insulating layer INS therebetween.

FIG. 9 is a cross-sectional view (A-B) of an area where the first electrode TE(i)1 and the second electrode TE(i)2 in the i-th electrode row are formed. FIG. 10 is a cross-sectional view (C-D) of an area where a first signal line SL_1B overlapping the first electrode TE(i)1 in the i-th electrode row, the first electrode TE(i+1)1 in the i+1-th electrode row, the first electrode TE(i+2)1 in the i+2-th electrode row, and the first electrode TE(i+3)1 in the i+3-th electrode row, and electrically connecting the first electrode TE(i)1 in the i-th electrode row and the first electrode TE(i+2)1 in the i+2-th electrode row is formed.

Referring to FIG. 9 the first electrode TE(i)1 and the second electrode TE(i)2 in the i-th electrode row are positioned in an electrode metal layer. Similarly, referring to FIG. 10, the first electrode TE(i)1 in the i-th electrode row, the first electrode TE(i+1)1 in the i+1-th electrode row, the first electrode TE(i+2)1 in the i+2-th electrode row, and the first electrode TE(i+3)1 in the i+3-th electrode row are positioned in an electrode metal layer. The electrode metal, for example, may be one of a source/drain substance, a gate substance, and an ITO substance.

Referring to FIGS. 9 and 10, an insulating layer INS may be positioned on the electrode metal layer.

Referring to FIGS. 9 and 10, a signal line metal layer in which signal lines SL are disposed may be positioned on the insulating layer INS. The signal line metal, for example, may be one of a source/drain substance, a gate substance, and an ITO substance.

Referring to FIG. 9, a first signal line group SLG1 including a plurality of signal lines (including SL_1B) may be positioned on the insulating layer INS to overlap the first electrode TE(i)1 in the i-th electrode row. The first electrode TE(i)1 in the i-th electrode row should be electrically connected with a first signal line SL_1B of the plurality of signal lines in the first signal line group SLG1, so the first electrode TE(i)1 in the i-th electrode row and the first signal line SL_1B can be connected through a contact hole CNT of the insulating layer INS.

Referring to FIG. 9, a second signal line group SLG2 including a plurality of signal lines (including SL_2A) may be positioned on the insulating layer INS to overlap the second electrode TE(i)2 in the i-th electrode row. The second electrode TE(i)2 in the i-th electrode row should be electrically connected with a second signal line SL_2A of the plurality of signal lines in the second signal line group SLG2, so the second electrode TE(i)2 in the i-th electrode row and the second signal line SL_2A can be connected through a contact hole CNT of the insulating layer INS.

Referring to FIG. 10, the first signal line SL_1B is electrically separated from, but may overlap the first electrode TE(i+1)1 in the i+1-th electrode row positioned between the first electrode TE(i)1 in the i-th electrode row and the first electrode TE(i+2)1 in the i+2-th electrode row.

That is, referring to FIG. 10, the first signal line SL_1B may overlap the electrodes TE(i)1 and TE(i+2)1 that are supposed to be electrically connected, and may overlap also the electrodes TE(i+1)1, TE(i+3)1, . . . in electrode rows other than the electrodes TE(i)1 and TE(i+2)1.

Similarly, the second signal line SL_2A is electrically separated from, but may overlap the second electrode TE(i−1)2 in the i−1-th electrode row positioned between the second electrode TE(i)2 in the i-th electrode row and the second electrode TE(i−2)2 in the i−2-th electrode row.

In the woven type touch panel TSP, the number of electrodes electrically connected by each signal line SL is two or more.

According to the example of FIGS. 6 to 8, the number of electrodes electrically connected by each signal line SL is two or more. That is, the number of electrodes electrically connected by the first signal line SL_1B is two and the number of electrodes electrically connected by the second signal line SL_2A is two.

One or more electrodes (e.g., TE(i)1) of the electrodes (e.g., TE(i)1 and TE(i+2)1) electrically connected by the first signal line SL_1B and one or more electrodes (e.g., TE(i)2) of the electrodes (e.g., TE(i)2 and TE(i−2)$_2$) electrically connected by the second signal line SL_2A may be disposed in the same electrode row (e.g., the i-th electrode row).

Referring to FIGS. 8 to 11, in the structure described above, assuming that the area obtained by combining the portion, which corresponds to the length of a vertical electrode, of one horizontal electrode (e.g., TE(i−3)1) and one vertical electrode (e.g., TE(i−4)1) is one touch unit TU, the area corresponding to a touch unit of two rows by two columns (2*2 TU, i.e., four TUs) is defined as one pattern unit PU. A touch panel TSP is formed by repeatedly patterning the pattern unit PU.

FIG. 11 is a diagram in which touch electrodes V1-1, V2-1, V3-1, V4-1, V1-2, V2-2, V3-2, V4-2, V2-3, V4-3, . . . formed by grouping vertical electrodes are indicated by vertical lines and touch electrodes H1-1, H1-2, H2-1, H2-2, H2-3, H3-1, H3-2, H4-1, H4-2, H4-3, . . . corresponding to horizontal electrodes are indicated by horizontal lines in FIG. 8.

Referring to FIG. 11, when multi-touches T1 and T2 occur at two or more points n1 and n2, the possibility that the touch sensing circuit TSC mistakes points other than the actual touch points n1 and n2 for touch points may be removed or reduced. That is, according to a woven type touch panel TSP, a ghost phenomenon may be prevented or reduced.

In a woven type touch panel TSP, since the paths through which charge by multi-touches T1 and T2 at actual touch points n1 and n2 is transmitted have been disconnected, charge transmission that causes a ghost phenomenon is prevented. Accordingly, a ghost phenomenon can be prevented.

When a first touch T1 has occurred at the point n1 and a second touch T2 has simultaneously occurred at the point n2 (a point different from the point n1), charge by the first touch T1 is not transmitted to the surrounding because two horizontal touch electrodes H1-1 and H1-2 have been disconnected and two vertical touch electrodes V2-1 and V2-2 have been disconnected. Further, charge by the second touch T2 is not transmitted to the surrounding because two vertical touch electrodes V3-2 and V3-1 have been disconnected and two horizontal touch electrodes H3-2 and H3-1 have been disconnected. Accordingly, a ghost phenomenon can be prevented.

Figure 12:
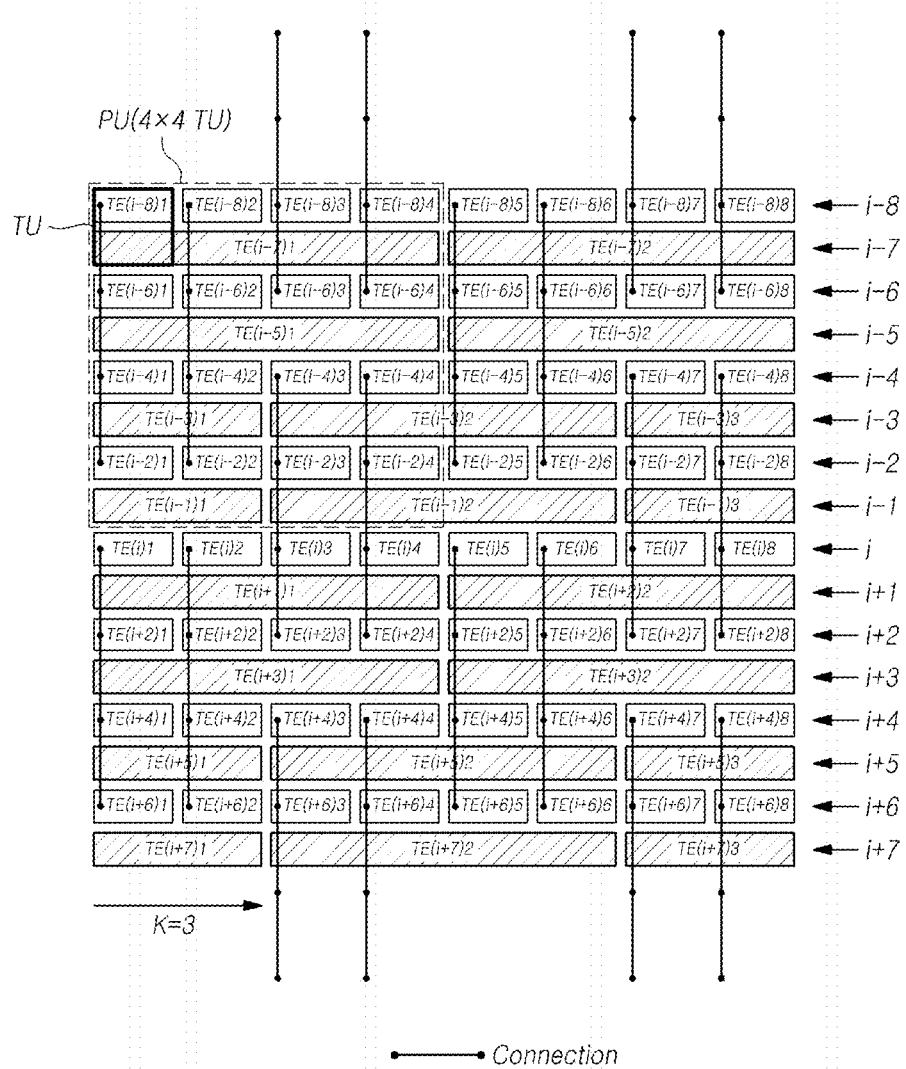
FIGS. 12 to 14 are diagram showing a woven type touch panel having repeated 4*4 TUs in a touch display device according to embodiments of the present disclosure.
Figure 13:
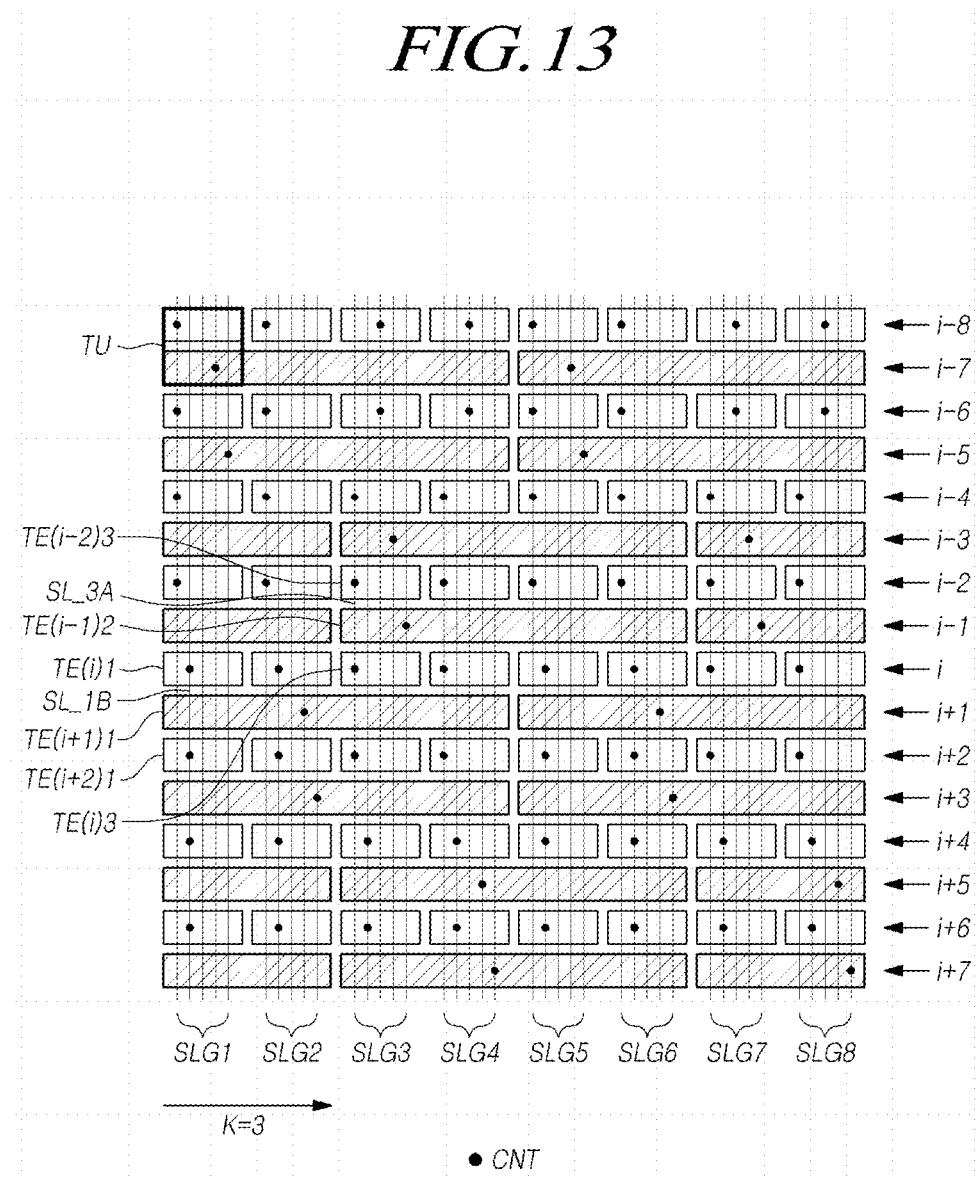
Figure 14:
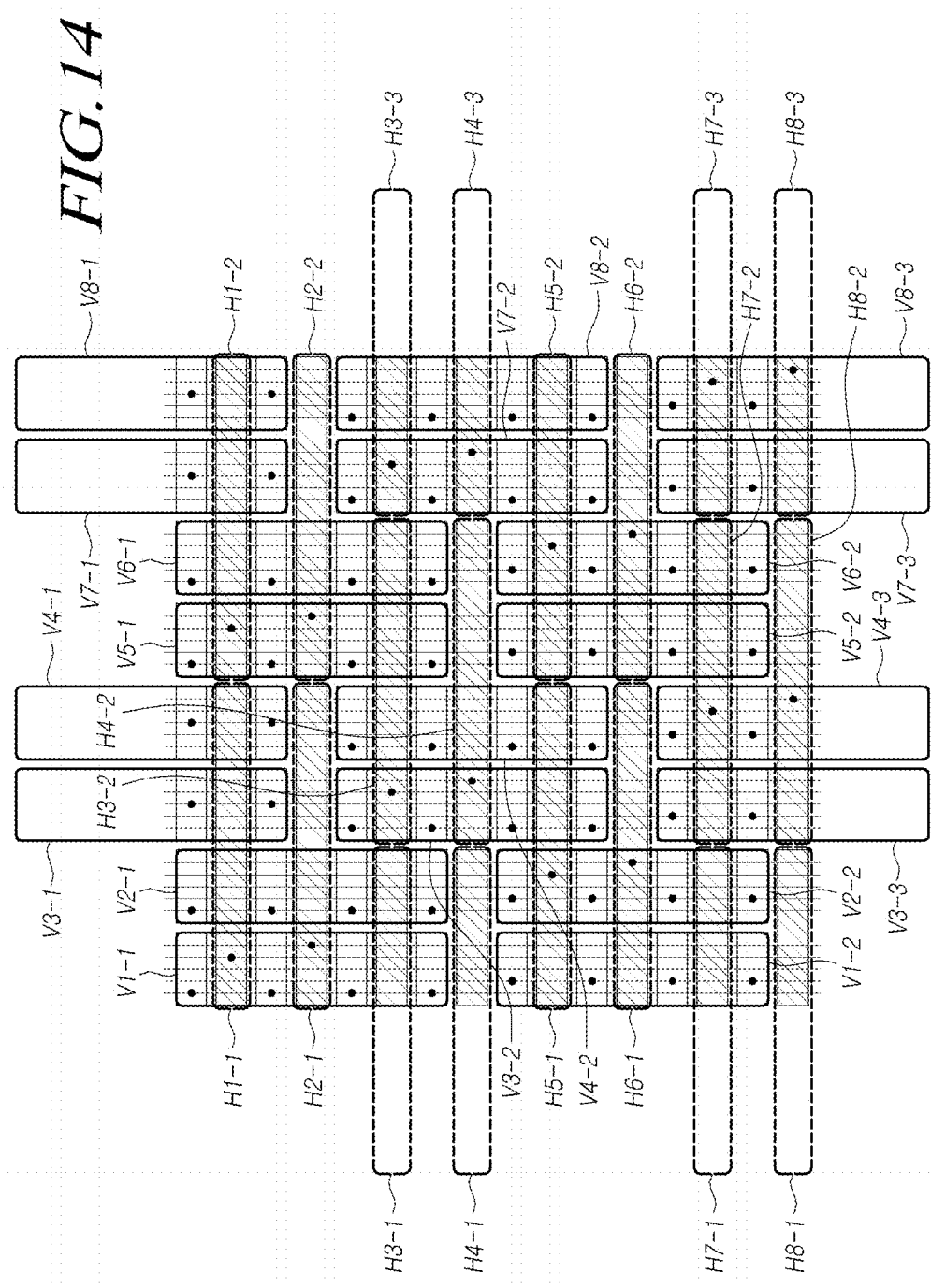
Figure 15:
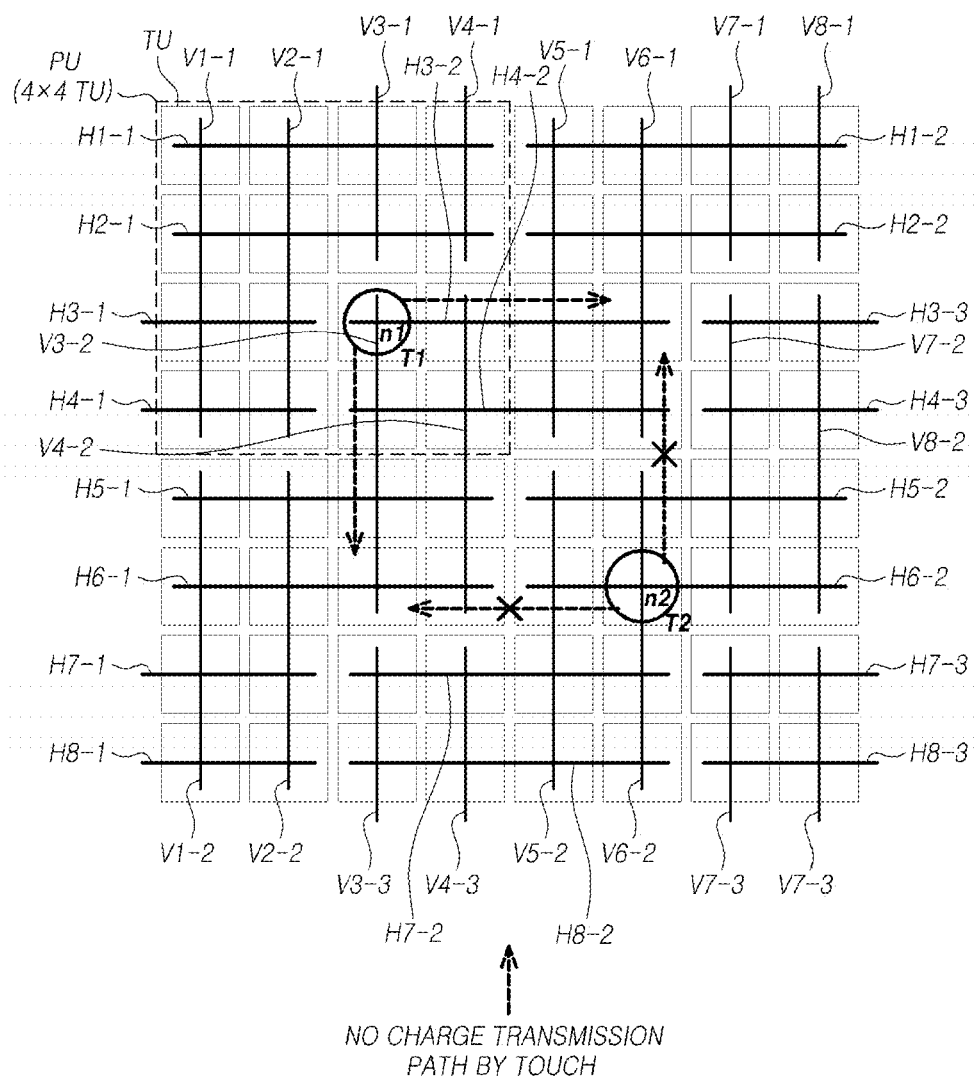
FIG. 15 is a diagram illustrating an effect of reducing a ghost phenomenon in the woven type touch panel of FIGS. 12 to 14.

FIGS. 12 to 15 are diagrams showing a woven type touch panel TSP having repeated 4*4 touch units TU in a touch display device according to embodiments of the present disclosure, in which FIG. 12 is a diagram showing an electrode arrangement structure, FIG. 13 is an electrode connection structure in the electrode arrangement structure of FIG. 12, and FIG. 14 is a diagram showing the actual configuration of a touch sensor (touch electrodes) according to the electrode connection structure of FIG. 13. FIG. 15 is a diagram illustrating a ghost phenomenon reduction effect of a woven type touch panel TSP of a touch display device according to embodiments of the present disclosure.

The touch panel TSP of FIGS. 12 to 15 is the same as in the fundamental structure as the touch panel TSP of FIGS. 6 to 11. However, there is a difference in that the size of the pattern units PU of the touch panel TSP of FIGS. 6 to 11 is 2*2 TU, but the size of the pattern units PU of the touch panel TSP of FIGS. 12 to 15 is 4*4 TU. Further, there is another difference in that k is 2 in the touch panel TSP of FIGS. 6 to 11 but k is 3 in the touch panel TSP of FIGS. 12 to 15.

Since the size of the pattern units PU of the touch panel TSP of FIGS. 12 to 15 is 4*4 TU, the number of the electrodes disposed in one electrode row of two adjacent electrode rows is ¼ of the number of the electrodes disposed in the other electrode row. Accordingly, the length of the electrodes in one electrode row of two adjacent electrode rows is about four times the length of the electrodes in the other electrode row.

Referring to FIGS. 12 to 15, the length of each of the electrodes (horizontal electrodes) disposed in the i−7-th, i−5-th, i−3-th, i−1-th, i+1-th, i+3-th, i+5-th, and i+7-th electrode rows is four-time larger than the length of each of the electrodes (vertical electrodes) disposed in the i−8-th, i−6-th, i−4-th, i−2-th, i-th, i+2-th, i+4-th, and i+6-th electrode rows.

According to the example of FIGS. 12 to 15, the touch panel TSP may have sixteen electrode rows i−8, i−7, . . . , i−1, i i+1, . . . , and i+7.

Vertical electrodes are as follows. Eight electrodes TE(i−8)1~TE(i−8)8 are disposed in the i−8-th electrode row. Eight electrodes TE(i−6)1~TE(i−6)8 are disposed in the i−6-th electrode row. Eight electrodes TE(i−4)1~TE(i−4)8 are disposed in the i−4-th electrode row. Eight electrodes TE(i−2)1~TE(i−2)8 are disposed in the i−2-th electrode row. Eight electrodes TE(i)1~TE(i)8 are disposed in the i-th electrode row. Eight electrodes TE(i+2)1~TE(i+2)8 are disposed in the i+2-th electrode row. Eight electrodes TE(i+4)1~TE(i+4)8 are disposed in the i+4-th electrode row. Eight electrodes TE(i+6)1~TE(i+6)8 are disposed in the i+6-th electrode row.

Horizontal electrodes are as follows. Two electrodes TE(i−7)1~TE(i−7)2 are disposed in the i−7-th electrode row. Two electrodes TE(i−5)1~TE(i−5)2 are disposed in the i−5-th electrode row. Three electrodes TE(i−3)1~TE(i−3)3 are disposed in the i−3-th electrode row. Three electrodes TE(i−1)1~TE(i−1)3 are disposed in the i−1-th electrode row. Two electrodes TE(i+1)1~TE(i+1)2 are disposed in the i+1-th electrode row. Two electrodes TE(i+3)1~TE(i+3)2 are disposed in the i+3-th electrode row. Three electrodes TE(i+5)1 TE(i+5)3 are disposed in the i+5-th electrode row. Three electrodes TE(i+7)1~TE(i+7)3 are disposed in the i+7-th electrode row.

Referring to FIG. 13, the touch panel TSP may include a plurality of signal lines SL electrically connected with the electrodes disposed in the sixteen electrode rows i−8, i−7, . . . , i−1, i, i+1, . . . , and i+7 through a plurality of contact holes CNT. The plurality of signal lines SL may be grouped into eight signal line groups SLG1~SLG8.

In the woven type touch panel TSP according to embodiments of the present disclosure, the same number of electrodes are not disposed in each of the sixteen electrode rows i−8, i−7, . . . , i−1, i, i+1, . . . , and i+7.

In the woven type touch panel TSP according to embodiments of the present disclosure, more electrodes may be disposed in any one electrode row (e.g., i) of any two adjacent electrode rows (e.g., i+1 and i) than the other electrode row (e.g., i+1) in the sixteen electrode rows i−8, i−7, . . . , i−1, i, i+1, . . . , and i+7.

Accordingly, the size of the electrodes (e.g., TE(i+1)1 and TE(i+1)2) in any one electrode row (e.g., i+1) of any two adjacent electrode rows (e.g., i+1 and i) of the sixteen electrode rows i−8, i−7, . . . , i−1, i, i+1, . . . , and i+7 may be the same as or larger than the size of the electrodes (e.g., TE(i)1~TE(i)8) in the other one electrode row (e.g., i).

Referring to FIGS. 12 to 15, the first electrode TE(i)1 in the i-th electrode row and the first electrode TE(i+2)1 in the i+2-th electrode row may be electrically connected to each other by a first signal line SL_1B.

Referring to FIGS. 12 to 15, the k-th electrode TE(i)k in the i-th electrode row and the k-th electrode TE(i−2)k in the i−2-th electrode row may be electrically connected to each other by a second signal line SL_3A.

The term 'k' stated above may be a natural number of 2 or more and may show how many electrodes disposed in the same electrode row change together in connection pattern.

k is 3 in the touch panel TSP exemplified in FIGS. 12 to 15.

Accordingly, in the following description, the k-th electrode TE(i)k in the i-th electrode row is referred to as a third electrode TE(i)3 and the k-th electrode TE(i−2)k in the i−2-th electrode row is referred to as a third electrode TE(i−2)3.

Referring to FIGS. 12 to 15, the numbers of electrodes disposed in the odd number-th electrode rows and the numbers of electrodes disposed in the even number-th electrode rows may be different from each other.

The size of the electrodes disposed in the odd number-th electrode rows and the size of the electrodes disposed in the even number-th electrode rows may be different from each other.

However, the sizes of the electrodes disposed in the odd number-th electrode rows may be the same. Further, the sizes of the electrodes disposed in the even number-th electrode rows may be the same.

Referring to FIGS. 12 to 15, assuming that the i−8-th, i−6-th, i−4-th, i−2-th, i-th, i+2-th, i+4-th, and i+6-th electrode rows are odd number-th electrode rows and the i−7-th, i−5-th, i−3-th, i−1-th, i+1-th, i+3-th, i+5-th, and i+7-th electrode rows are even number-th electrode rows, the numbers of the electrodes disposed in the odd number-th electrode rows may be larger than the numbers of the electrodes disposed in the even number-th electrode rows. Accordingly, the sizes of the electrodes disposed in the odd number-th electrode rows may be smaller than the sizes of the electrodes disposed in the even number-th electrode rows.

Referring to FIGS. 12 to 15, the sizes of the first electrode TE(i)1 in the i-th electrode row, and the first electrode TE(i+2)1 in the i+2-th electrode row, the third electrode TE(i)3 in the i-th electrode row, and the third electrode TE(i−2)3 in the i−2-th electrode row may correspond to each other.

Referring to FIGS. 12 to 15, the size of the first electrode TE(i+1)1 in the i+1-th electrode row positioned between the first electrode TE(i)1 in the i-th electrode row and the first electrode TE(i+2)1 in the i+2-th electrode row may be the same as or larger than the sum of the size of the first electrode TE(i)1 in the i-th electrode row and the size of the first electrode TE(i+2)1 in the i+2-th electrode row.

Similarly, referring to FIGS. 12 to 15, the size of the second electrode TE(i−1)2 in the i−1-th electrode row positioned between the third electrode TE(i)3 in the i-th electrode row and the third electrode TE(i−2)3 in the i−2-th electrode row may be the same as or larger than the sum of the size of the third electrode TE(i)3 in the i-th electrode row and the size of the third electrode TE(i−2)3 in the i−2-th electrode row.

Referring to FIGS. 12 to 15, the size of the first electrode TE(i+1)1 in the i+1-th electrode row positioned between the first electrode TE(i)1 in the i-th electrode row and the first electrode TE(i+2)1 in the i+2-th electrode row may be the same as or larger than the sum of the size of the first electrode TE(i)1 and the size of the third electrode TE(i)3 in the i-th electrode row.

Referring to FIGS. 12 to 15, the second electrode TE(i−1)2 in the i−1-th electrode row positioned between the third electrode TE(i)3 in the i-th electrode row and the third electrode TE(i−2)3 in the i−2-th electrode row may be the same in size as the first electrode TE(i+1)1 in the i+1-th electrode row positioned between the first electrode TE(i)1 in the i-th electrode row and the first electrode TE(i+2)1 in the i+2-th electrode row.

Referring to FIGS. 12 to 15, the second electrode TE(i−1)2 in the i−1-th electrode row positioned between the third electrode TE(i)3 in the i-th electrode row and the third electrode TE(i−2)3 in the i−2-th electrode row may be shifted by a multiple of an integer (e.g., four times) of the electrode length in the row direction further than the first electrode TE(i+1)1 in the i+1-th electrode row positioned between the first electrode TE(i)1 in the i-th electrode row and the first electrode TE(i+2)1 in the i+2-th electrode row.

Referring to FIGS. 12 and 13, two or more electrodes TE(i)1 and TE(i+2)1 connected by one first signal line SL_1B may be spaced apart from each other by another electrode TE(i+1)1. Further, two or more electrodes TE(i)1 and TE(i+2)1 connected by one first signal line SL_1B may be separately disposed in two or more non-adjacent electrode rows (i-th electrode row and i+2-th electrode row). Further, two or more electrodes TE(i)1 and TE(i+2)1 connected by one first signal line SL_1B are spaced apart from each other by another electrode TE(i+1)1, but may be operated as one touch electrode in the equivalent potential state in touch driving.

Similarly, two or more electrodes TE(i)3 and TE(i−2)3 connected by one second signal line SL_3A may be spaced apart from each other by another electrode TE(i−1)2. Further, two or more electrodes TE(i)3 and TE(i−2)3 connected by one second signal line SL_3A may be separately disposed in two or more non-adjacent electrode rows (i-th electrode row and i−2-th electrode row). Further, two or more electrodes TE(i)3 and TE(i−2)3 connected by one second signal line SL_3A are spaced apart from each other by another electrode TE(i−1)2, but may be operated as one touch electrode in the equivalent potential state in touch driving.

As described above, two or more electrodes connected by one signal line are spaced apart from each other by another electrode and disposed in different electrode rows, but are electrically connected to each other, they can operate as one touch electrode.

A plurality of electrode rows included in a touch panel TSP may include odd number-th electrode rows and even number-th electrode rows.

Referring to FIGS. 12 to 15, the electrodes (vertical electrode) disposed in the i−8-th, i−6-th, i−4-th, i−2-th, i-th, i+2-th, i+4-th, and i+6-th electrode rows that may be odd number-th or even number-th electrode rows of odd number-th electrode rows and even number-th electrode rows are vertically grouped by four, and one signal lines may be connected to each group (each touch electrode).

According to the example of FIG. 14, the electrodes disposed in the i−8-th, i−6-th, i−4-th, i−2-th, i-th, i+2-th, i+4-th, and i+6-th electrode rows are grouped by four, thereby forming a plurality of touch electrodes V1-1, V2-1, . . . , V8-1, V1-2, V2-2, . . . , V8-2, V1-1, V2-1, . . . , V8-1, V3-3, V4-3, V7-3, V8-3, . . . .

The plurality of touch electrodes V1-1, V2-1, . . . , V8-1, V1-2, V2-2, . . . , V8-2, V1-1, V2-1, . . . , V8-1, V3-3, V4-3, V7-3, V8-3, . . . are similar to the vertical touch electrodes TE_V1, TE_V2, TE_V3, and TE_V4 in the matrix type touch panel TSP of FIG. 4.

Referring to FIGS. 12 to 15, the electrodes (horizontal electrode) disposed in the i−7-th, i−5-th, i−3-th, i−1-th, i+1-th, i+3-th, i+5-th, and i+7-th electrode rows that may be even number-th or odd number-th electrode rows of odd number-th electrode rows and even number-th electrode rows may be individually connected with signal lines without being grouped.

According to the example of FIG. 14, the electrodes disposed in the i−7-th, i−5-th, i−3-th, i−1-th, i+1-th, i+3-th, i+5-th, and i+7-th electrode rows individually form touch electrodes H1-1, H1-2, H2-1, H2-2, H3-1, H3-2, H3-3, H4-1, H4-2, H4-3, H5-1, H5-2, H6-1, H6-2, H7-1, H7-2, H7-3, H8-1, H8-2, H8-3, . . . .

The individual touch electrodes H1-1, H1-2, H2-1, H2-2, H3-1, H3-2, H3-3, H4-1, H4-2, H4-3, H5-1, H5-2, H6-1, H6-2, H7-1, H7-2, H7-3, H8-1, H8-2, H8-3, . . . are similar to the horizontal touch electrodes TE_H1, TE_H2, TE_H3, TE_H4 in the matrix type touch panel TSP of FIG. 4.

Referring to FIGS. 12 to 15, a plurality of signal lines SL each is disposed in the column direction and each may overlap one or more electrodes.

Referring to FIGS. 12 to 15, a plurality of electrodes may be all positioned in the same layer.

Referring to FIGS. 12 to 15, a plurality of signal lines SL may be positioned in a different layer from a plurality of electrode with an insulating layer INS therebetween.

Referring to FIGS. 12 to 15, in the structure described above, assuming that the area obtained by combining a ¼ point of one horizontal electrode (e.g., TE(i−7)1) and one vertical electrode (e.g., TE(i−8)1) is one touch unit TU, the area corresponding to a touch unit of four rows by four columns (4*4 TU, i.e., sixteen TUs) is defined as one pattern unit PU. A touch panel TSP is formed by repeatedly patterning the pattern unit PU.

FIG. 15 is a diagram in which touch electrodes V1-1, V2-1, . . . , V8-1, V1-2, V2-2, . . . , V8-2, V1-1, V2-1, . . . , V8-1, V3-3, V4-3, V7-3, V8-3, . . . obtained by grouping vertical electrodes are indicated by vertical lines, and touch electrodes corresponding to horizontal electrodes H1-1, H1-2, H2-1, H2-2, H3-1, H3-2, H3-3, H4-1, H4-2, H4-3, H5-1, H5-2, H6-1, H6-2, H7-1, H7-2, H7-3, H8-1, H8-2, H8-3, . . . are indicated by horizontal lines in FIG. 14.

Referring to FIG. 15, when multi-touches T1 and T2 occur at two or more points n1 and n2, the possibility that the touch sensing circuit TSC mistakes points other than the actual touch points n1 and n2 for touch points may be removed or reduced. That is, according to a woven type touch panel TSP, a ghost phenomenon may be prevented or reduced.

In a woven type touch panel TSP, since the paths through which charge by multi-touches T1 and T2 at actual touch points n1 and n2 is transmitted have been disconnected, charge transmission that causes a ghost phenomenon is prevented. Accordingly, a ghost phenomenon can be prevented.

When a first touch T1 occurs at the point n1 and a second touch T2 simultaneously occurs at the point n2 (a point different from the point n1), charge by the second touch T2 is not transmitted to the surrounding because two horizontal touch electrodes H6-1 and H6-2 have been disconnected and two vertical touch electrodes V6-2 and V6-1 have been disconnected. Accordingly, a ghost phenomenon can be prevented.

Figure 16:
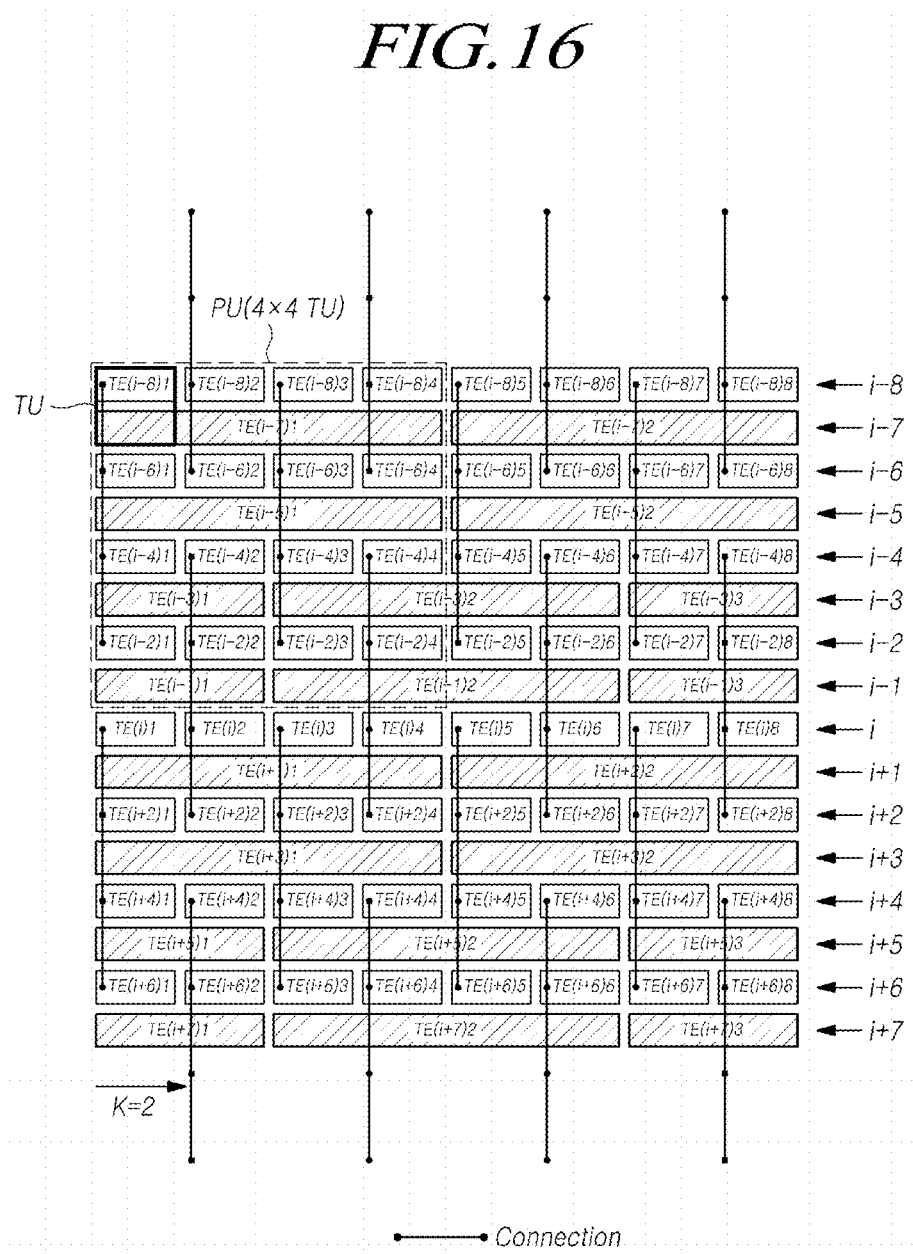
FIGS. 16 to 18 are other diagram showing a woven type touch panel having repeated 4*4 TUs in a touch display device according to embodiments of the present disclosure.
Figure 17:
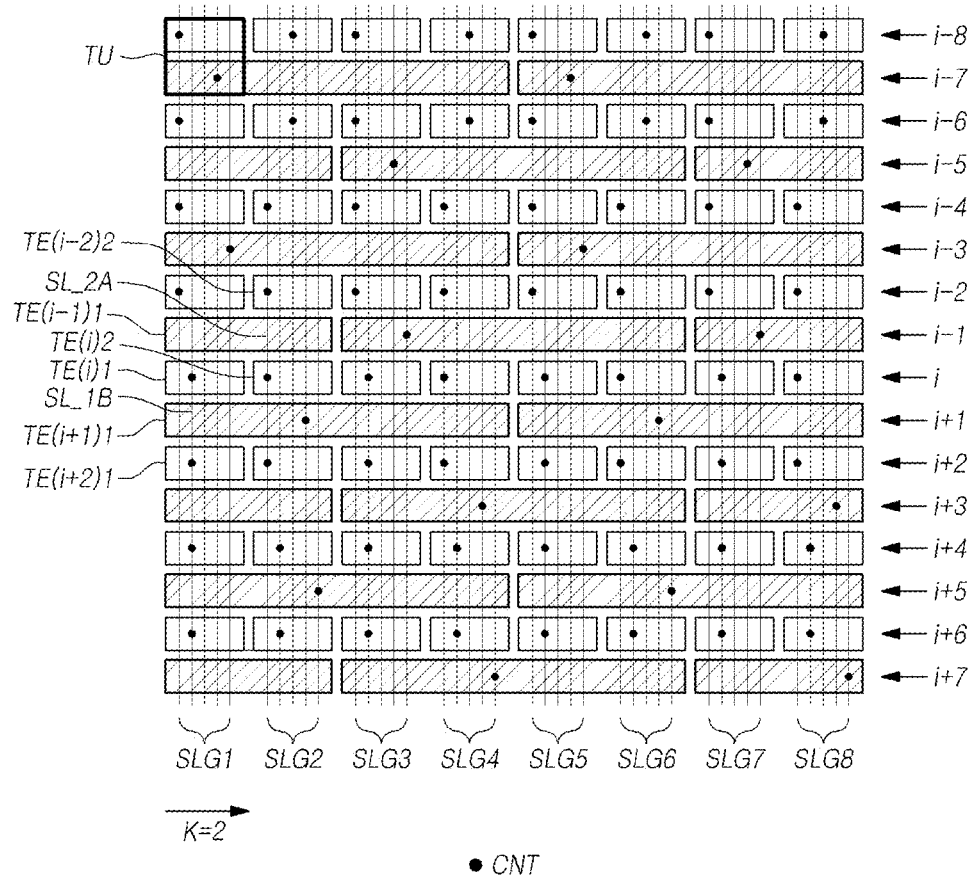
Figure 18:
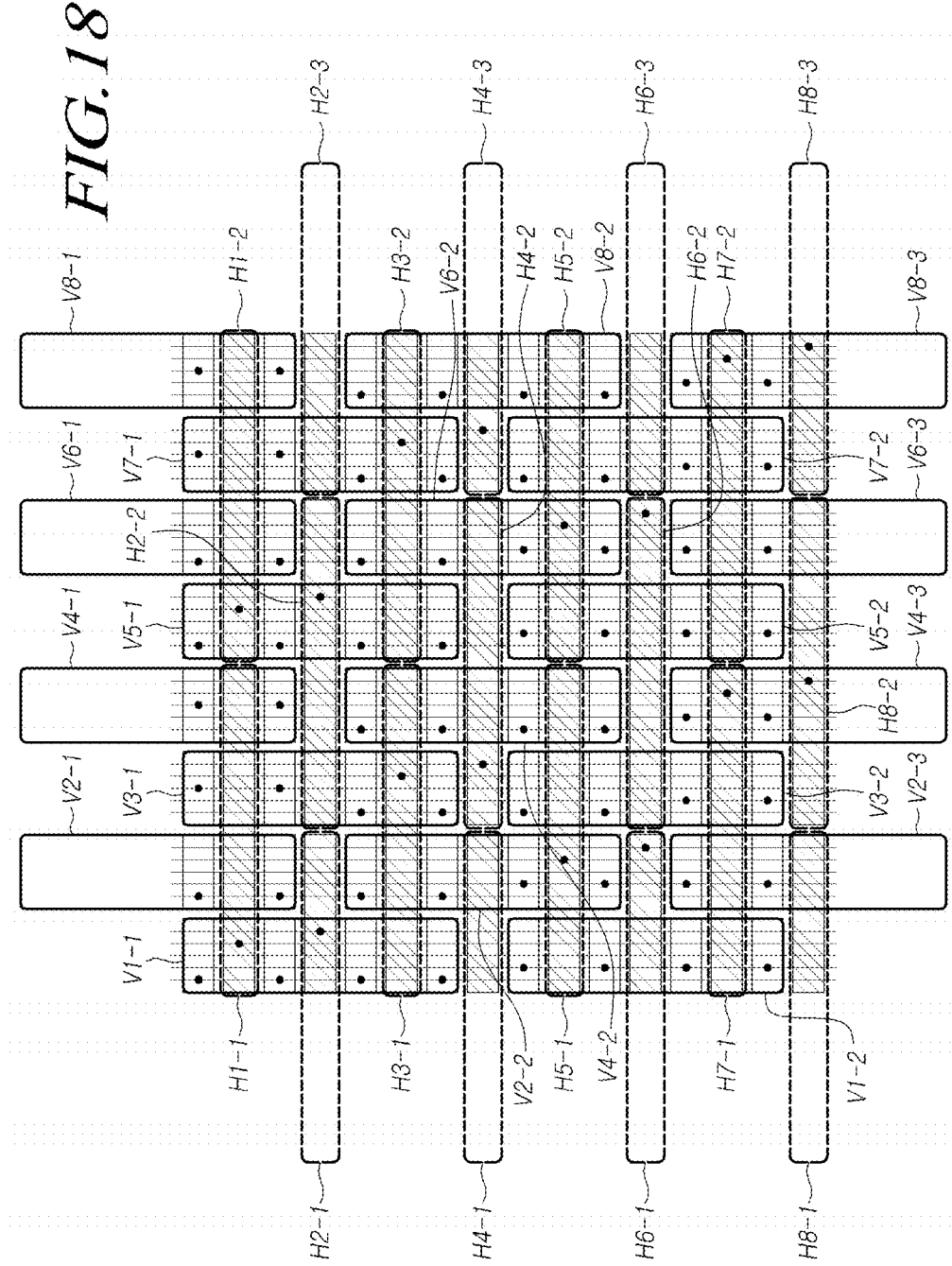
Figure 19:
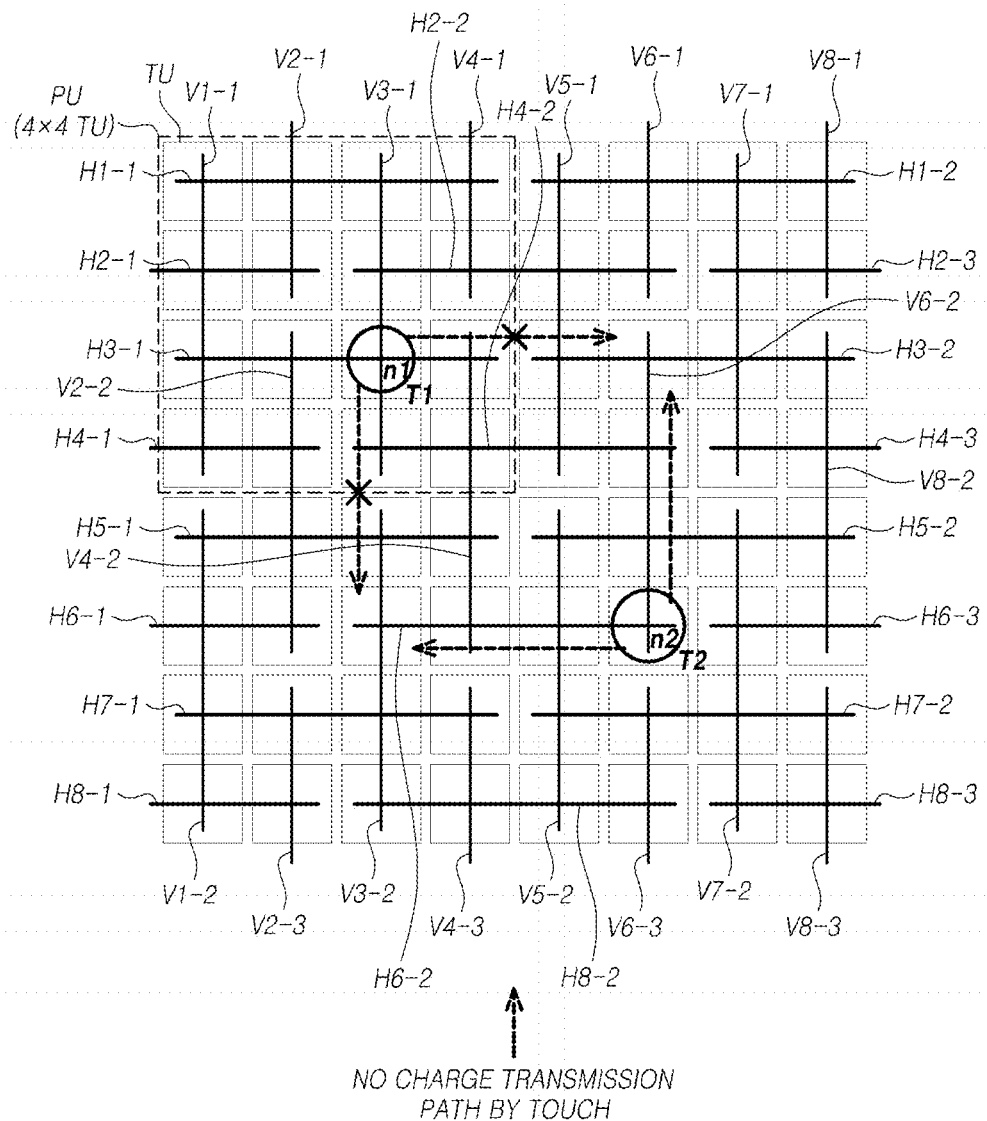
FIG. 19 is a diagram illustrating an effect of reducing a ghost phenomenon in the woven type touch panel of FIGS. 16 to 18.

FIGS. 16 to 18 are diagrams showing a woven type touch panel TSP having repeated 4*4 touch units TU in a touch display device according to embodiments of the present disclosure, in which FIG. 16 is a diagram showing an electrode arrangement structure, FIG. 17 is an electrode connection structure in the electrode arrangement structure of FIG. 16, and FIG. 18 is a diagram showing the actual configuration of a touch sensor (touch electrodes) according to the electrode connection structure of FIG. 17. FIG. 19 is a diagram illustrating a ghost phenomenon reduction effect of a woven type touch panel TSP of a touch display device according to embodiments of the present disclosure.

The touch panel TSP of FIGS. 16 to 19 is the same as in the fundamental structure as the touch panel TSP of FIGS. 12 to 15. Further, there is another different in that k is 3 in the touch panel TSP of FIGS. 12 to 15 but k is 2 in the touch panel TSP of FIGS. 16 to 19.

Since the size of the pattern units PU of the touch panel TSP of FIGS. 16 to 19 is 4*4 TU, the number of the electrodes disposed in one electrode row of two adjacent electrode rows is ¼ of the number of the electrodes disposed in the other electrode row. Accordingly, the length of the electrodes in one electrode row of two adjacent electrode rows is about four times the length of the electrodes in the other electrode row.

Referring to FIGS. 16 to 19, the length of each of the electrodes (horizontal electrodes) disposed in the i−7-th, i−5-th, i−3-th, i−1-th, i+1-th, i+3-th, i+5-th, and i+7-th electrode rows is four-time larger than the length of each of the electrodes (vertical electrodes) disposed in the i−8-th, i−6-th, i−4-th, i−2-th, i-th, i+2-th, i+4-th, and i+6-th electrode rows.

According to the example of FIGS. 16 to 19, the touch panel TSP may have sixteen electrode rows i−8, i−7, . . . , i−1, i, i+1, . . . , i+7.

Vertical electrodes are as follows. Eight electrodes TE(i−8)1~TE(i−8)8 are disposed in the i−8-th electrode row. Eight electrodes TE(i−6)1~TE(i−6)8 are disposed in the i−6-th electrode row. Eight electrodes TE(i−4)1~TE(i−4)8 are disposed in the i−4-th electrode row. Eight electrodes TE(i−2)1~TE(i−2)8 are disposed in the i−2-th electrode row. Eight electrodes TE(i)1~TE(i)8 are disposed in the i-th electrode row. Eight electrodes TE(i+2)1~TE(i+2)8 are disposed in the i+2-th electrode row. Eight electrodes TE(i+4)1~TE(i+4)8 are disposed in the i+4-th electrode row. Eight electrodes TE(i+6)1~TE(i+6)8 are disposed in the i+6-th electrode row.

Horizontal electrodes are as follows. Two electrodes TE(i−7)1~TE(i−7)2 are disposed in the i−7-th electrode row. Two electrodes TE(i−5)1~TE(i−5)2 are disposed in the i−5-th electrode row. Three electrodes TE(i−3)1~TE(i−3)3 are disposed in the i−3-th electrode row. Three electrodes TE(i−1)1~TE(i−1)3 are disposed in the i−1-th electrode row. Two electrodes TE(i+1)1~TE(i+1)2 are disposed in the i+1-th electrode row. Two electrodes TE(i+3)1~TE(i+3)2 are disposed in the i+3-th electrode row. Three electrodes TE(i+5)1~TE(i+5)3 are disposed in the i+5-th electrode row. Three electrodes TE(i+7)1~TE(i+7)3 are disposed in the i+7-th electrode row.

Referring to FIG. 17, the touch panel TSP may include a plurality of signal lines SL electrically connected with the electrodes disposed in the sixteen electrode rows i−8, i−7, . . . , i−1, i, i+1, . . . , i+7 through a plurality of contact holes CNT. The plurality of signal lines SL may be grouped into eight signal line groups SLG1~SLG8.

In the woven type touch panel TSP according to embodiments of the present disclosure, the same number of electrodes are not disposed in each of the sixteen electrode rows i−8, i−7, . . . , i−1, i, i+1, . . . , i+7.

In the woven type touch panel TSP according to embodiments of the present disclosure, more electrodes may be disposed in any one electrode row (e.g., i) of any two adjacent electrode rows (e.g., i+1 and i) than the other electrode row (e.g., i+1) in the sixteen electrode rows i−8, i−7, . . . , i−1, i, i+1, . . . , i+7.

Accordingly, the size of the electrodes (e.g., TE(i+1)1 and TE(i+1)2) in any one electrode row (e.g., i+1) of any two adjacent electrode rows (e.g., i+1 and i) of the sixteen electrode rows (i−8, i−7, . . . , i−1, i, i+1, . . . , i+7) may be the same as or larger than the size of the electrodes (e.g., TE(i)1~TE(i)8) in the other one electrode row (e.g., i).

Referring to FIGS. 16 to 19, the first electrode TE(i)1 in the i-th electrode row and the first electrode TE(i+2)1 in the i+2-th electrode row may be electrically connected to each other by a first signal line SL_1B.

Referring to FIGS. 16 to 19, the k-th electrode TE(i)k in the i-th electrode row and the k-th electrode TE(i−2)k in the i−2-th electrode row may be electrically connected to each other by a second signal line SL_2A.

The term 'k' stated above may be a natural number of 2 or more and may show how many electrodes disposed in the same electrode row change together in connection pattern.

k is 2 in the touch panel TSP exemplified in FIGS. 16 to 19.

Accordingly, in the following description, the k-th electrode TE(i)k in the i-th electrode row is referred to as a second electrode TE(i)2 and the k-th electrode TE(i−2)k in the i−2-th electrode row is referred to as a second electrode TE(i−2)2.

Referring to FIGS. 16 to 19, the numbers of electrodes disposed in the odd number-th electrode rows and the numbers of electrodes disposed in the even number-th electrode rows may be different from each other.

The size of the electrodes disposed in the odd number-th electrode rows and the size of the electrodes disposed in the even number-th electrode rows may be different from each other.

However, the sizes of the electrodes disposed in the odd number-th electrode rows may be the same. Further, the sizes of the electrodes disposed in the even number-th electrode rows may be the same.

Referring to FIGS. 16 to 19, assuming that the i−8-th, i−6-th, i−4-th, i−2-th, i-th, i+2-th, i+4-th, and i+6-th electrode rows are odd number-th electrode rows and the i−7-th, i−5-th, i−3-th, i−1-th, i+1-th, i+3-th, i+5-th, and i+7-th electrode rows are even number-th electrode rows, the numbers of the electrodes disposed in the odd number-th electrode rows may be larger than the numbers of the electrodes disposed in the even number-th electrode rows. Accordingly, the sizes of the electrodes disposed in the odd number-th electrode rows may be smaller than the sizes of the electrodes disposed in the even number-th electrode rows.

Referring to FIGS. 16 to 19, the sizes of the first electrode TE(i)1 in the i-th electrode row, and the first electrode TE(i+2)1 in the i+2-th electrode row, the second electrode TE(i)2 in the i-th electrode row, and the second electrode TE(i−2)2 in the i−2-th electrode row may correspond to each other.

Referring to FIGS. 16 to 19, the size of the first electrode TE(i+1)1 in the i+1-th electrode row positioned between the first electrode TE(i)1 in the i-th electrode row and the first electrode TE(i+2)1 in the i+2-th electrode row may be the same as or larger than the sum of the size of the first electrode TE(i)1 in the i-th electrode row and the size of the first electrode TE(i+2)1 in the i+2-th electrode row.

Similarly, referring to FIGS. 16 to 19, the size of the second electrode TE(i−1)2 in the i−1-th electrode row positioned between the second electrode TE(i)2 in the i-th electrode row and the second electrode TE(i−2)2 in the i−2-th electrode row may be the same as or larger than the sum of the size of the second electrode TE(i)2 in the i-th electrode row and the size of the second electrode TE(i−2)2 in the i−2-th electrode row.

Referring to FIGS. 16 to 19, the size of the first electrode TE(i+1)1 in the i+1-th electrode row positioned between the first electrode TE(i)1 in the i-th electrode row and the first electrode TE(i+2)1 in the i+2-th electrode row may be the same as or larger than the sum of the size of the first electrode TE(i)1 and the size of the second electrode TE(i)2 in the i-th electrode row.

Referring to FIGS. 16 to 19, the second electrode TE(i−1)2 in the i−1-th electrode row positioned between the second electrode TE(i)2 in the i-th electrode row and the second electrode TE(i−2)2 in the i−2-th electrode row may be the same in size as the first electrode TE(i+1)1 in the i+1-th electrode row positioned between the first electrode TE(i)1 in the i-th electrode row and the first electrode TE(i+2)1 in the i+2-th electrode row.

Referring to FIGS. 16 to 19, the second electrode TE(i−1)2 in the i−1-th electrode row positioned between the second electrode TE(i)2 in the i-th electrode row and the second electrode TE(i−2)2 in the i−2-th electrode row may be shifted by a multiple of an integer (e.g., four times) of the electrode length in the row direction further than the first electrode TE(i+1)1 in the i+1-th electrode row positioned between the first electrode TE(i)1 in the i-th electrode row and the first electrode TE(i+2)1 in the i+2-th electrode row.

Referring to FIGS. 16 and 17, two or more electrodes TE(i)1 and TE(i+2)1 connected by one first signal line SL_1B may be spaced apart from each other by another electrode TE(i+1)1. Further, two or more electrodes TE(i)1 and TE(i+2)1 connected by one first signal line SL_1B may be separately disposed in two or more non-adjacent electrode rows (i-th electrode row and i+2-th electrode row). Further, two or more electrodes TE(i)1 and TE(i+2)1 connected by one first signal line SL_1B are spaced apart from each other by another electrode TE(i+1)1, but may be operated as one touch electrode in the equivalent potential state in touch driving.

Similarly, two or more electrodes TE(i)2 and TE(i−2)2 connected by one second signal line SL_2A may be spaced apart from each other by another electrode TE(i−1)2. Further, two or more electrodes TE(i)2 and TE(i−2)2 connected by one second signal line SL_2A may be separately disposed in two or more non-adjacent electrode rows (i-th electrode row and i−2-th electrode row). Further, two or more electrodes TE(i)2 and TE(i−2)2 connected by one second signal line SL_2A are spaced apart from each other by another electrode TE(i−1)2, but may be operated as one touch electrode in the equivalent potential state in touch driving.

As described above, two or more electrodes connected by one signal line are spaced apart from each other by another electrode and disposed in different electrode rows, but are electrically connected to each other, they can operate as one touch electrode.

A plurality of electrode rows included in a touch panel TSP may include odd number-th electrode rows and even number-th electrode rows.

Referring to FIGS. 16 to 19, the electrodes (vertical electrode) disposed in the i−8-th, i−6-th, i−4-th, i−2-th, i-th, i+2-th, i+4-th, and i+6-th electrode rows that may be odd number-th or even number-th electrode rows of odd number-th electrode rows and even number-th electrode rows are vertically grouped by four, and one signal lines may be connected to each group (each touch electrode).

According to the example of FIG. 18, the electrodes disposed in the i−8-th, i−6-th, i−4-th, i−2-th, i-th, i+2-th, i+4-th, and i+6-th electrode rows are grouped by four, thereby forming a plurality of touch electrodes V1-1, V2-1, . . . , V8-1, V1-2, V2-2, . . . , V8-2, V1-1, V2-1, . . . , V8-1, V3-3, V4-3, V7-3, V8-3, . . . .

The plurality of touch electrodes V1-1, V2-1, . . . , V8-1, V1-2, V2-2, . . . , V8-2, V1-1, V2-1, . . . , V8-1, V3-3, V4-3, V7-3, V8-3, . . . are similar to the vertical touch electrodes TE_V1, TE_V2, TE_V3, and TE_V4 in the matrix type touch panel TSP of FIG. 4.

Referring to FIGS. 16 to 19, the electrodes (horizontal electrode) disposed in the i−7-th, i−5-th, i−3-th, i−1-th, i+1-th, i+3-th, i+5-th, and i+7-th electrode rows that may be even number-th or odd number-th electrode rows of odd number-th electrode rows and even number-th electrode rows may be individually connected with signal lines without being grouped.

According to the example of FIG. 14, the electrodes disposed in the i−7-th, i−5-th, i−3-th, i−1-th, i+1-th, i+3-th, i+5-th, and i+7-th electrode rows individually form touch electrodes H1-1, H1-2, H2-1, H2-2, H3-1, H3-2, H3-3, H4-1, H4-2, H4-3, H5-1, H5-2, H6-1, H6-2, H7-1, H7-2, H7-3, H8-1, H8-2, H8-3, . . . .

The individual touch electrodes H1-1, H1-2, H2-1, H2-2, H3-1, H3-2, H3-3, H4-1, H4-2, H4-3, H5-1, H5-2, H6-1, H6-2, H7-1, H7-2, H7-3, H8-1, H8-2, H8-3, . . . are similar to the horizontal touch electrodes TE_H1, TE_H2, TE_H3, TE_H4 in the matrix type touch panel TSP of FIG. 4.

Referring to FIGS. 16 to 19, a plurality of signal lines SL each is disposed in the column direction and each may overlap one or more electrodes.

Referring to FIGS. 16 to 19, a plurality of electrodes may be all positioned in the same layer.

Referring to FIGS. 16 to 19, a plurality of signal lines SL may be positioned in a different layer from a plurality of electrode with an insulating layer INS therebetween.

Referring to FIGS. 16 to 19, in the structure described above, assuming that the area obtained by combining a ¼ point of one horizontal electrode (e.g., TE(i−7)1) and one vertical electrode (e.g., TE(i−8)1) is one touch unit TU, the area corresponding to a touch unit of four rows by four columns (4*4 TU, i.e., sixteen TUs) is defined as one pattern unit PU. A touch panel TSP is formed by repeatedly patterning the pattern unit PU.

FIG. 19 is a diagram in which touch electrodes V1-1, V2-1, . . . , V8-1, V1-2, V2-2, . . . , V8-2, V1-1, V2-1, . . . , V8-1, V3-3, V4-3, V7-3, V8-3, . . . obtained by grouping vertical electrodes are indicated by vertical lines, and touch electrodes corresponding to horizontal electrodes H1-1, H1-2, H2-1, H2-2, H3-1, H3-2, H3-3, H4-1, H4-2, H4-3, H5-1, H5-2, H6-1, H6-2, H7-1, H7-2, H7-3, H8-1, H8-2, H8-3, . . . are indicated by horizontal lines in FIG. 18.

Referring to FIG. 19, when multi-touches T1 and T2 occur at two or more points n1 and n2, the possibility that the touch sensing circuit TSC mistakes points other than the actual touch points n1 and n2 for touch points may be removed or reduced. That is, according to a woven type touch panel TSP, a ghost phenomenon may be prevented or reduced.

In a woven type touch panel TSP, since the paths through which charge by multi-touches T1 and T2 at actual touch points n1 and n2 is transmitted have been disconnected, charge transmission that causes a ghost phenomenon is prevented. Accordingly, a ghost phenomenon can be prevented.

When a first touch T1 occurs at the point n1 and a second touch T2 simultaneously occurs at the point n2 (a point different from the point n1), charge by the first touch T1 is not transmitted to the surrounding because two horizontal touch electrodes H3-1 and H3-2 have been disconnected and two vertical touch electrodes V3-1 and V3-2 have been disconnected. Accordingly, a ghost phenomenon can be prevented.

According to the woven type touch panel TSP of FIGS. 12 to 15 and the woven type touch panel TSP of FIGS. 16 to 19, as described above, a ghost phenomenon can be prevented or reduced even in multi-touching.

Further, in the woven type touch panel TSP of FIGS. 12 to 19, sixty four touch units TU exist. That is, sixty four touch coordinate points exist.

However, assuming that the sizes of the touch electrodes are all the same, the number of the touch electrodes can be reduced to thirty two (H1-1, H2-1, . . . , H8-1, H1-2, H2-2, . . . , H8-2, V1-1, V2-1, . . . , V8-1, V1-2, V2-2, . . . , V8-2). Accordingly, the number of the signal lines and the number of touch channels can also be largely reduced to thirty two.

Figure 20:
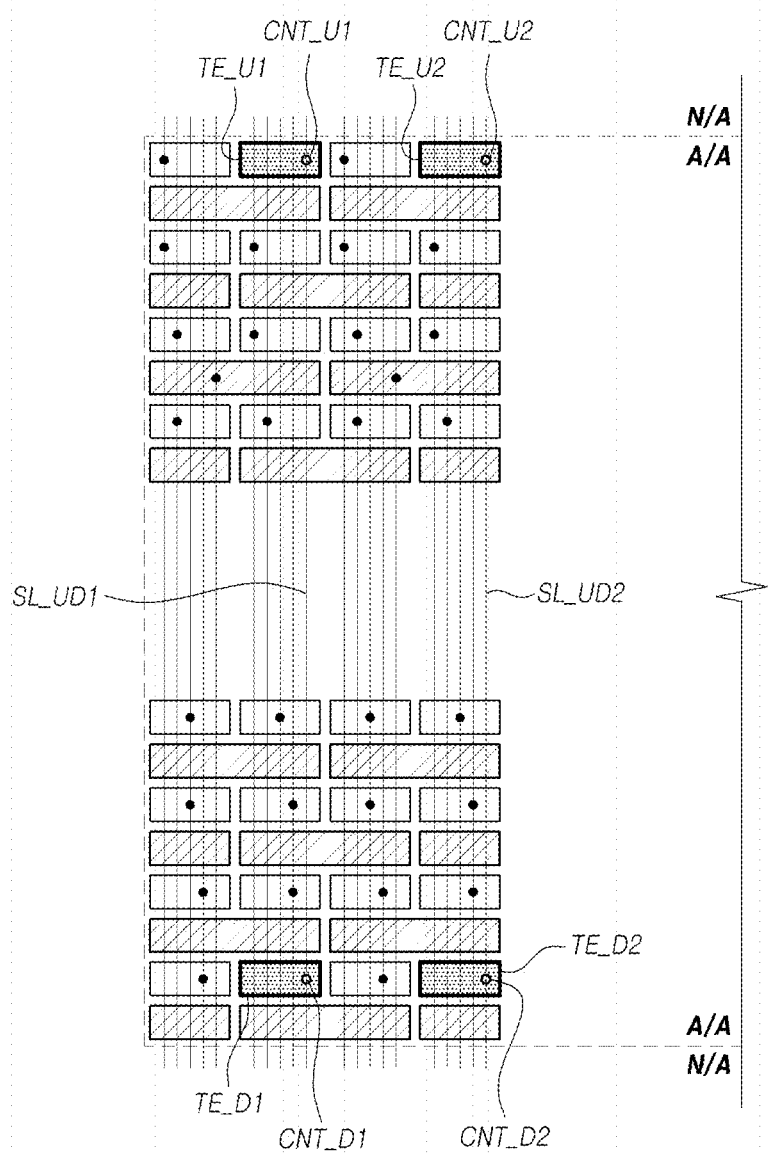
FIGS. 20 and 21 are diagrams showing a connection structure of outermost electrodes in an upper edge area and a lower edge area of an active area in a woven type touch panel having repeated 2*2 TUs of a touch display device according to embodiments of the present disclosure.
Figure 21:
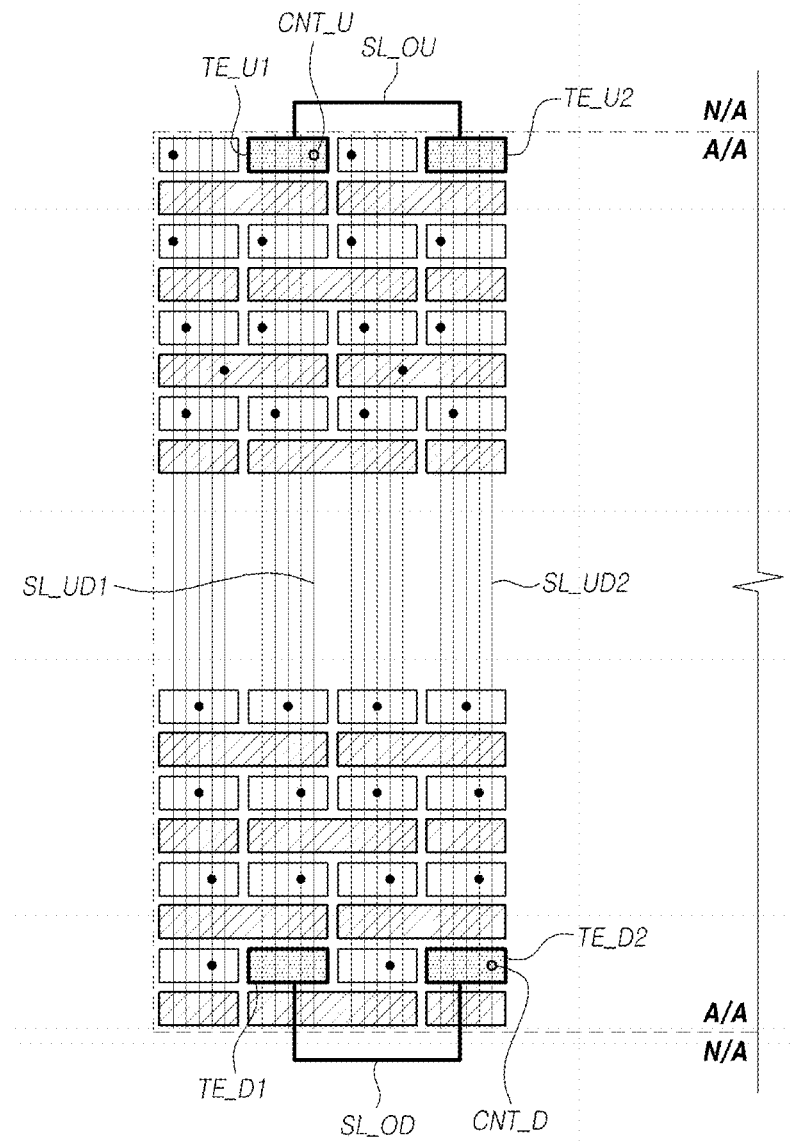

FIGS. 20 and 21 are diagrams showing a connection structure between some electrodes in an upper edge area and a lower edge area of an active area A/A in a woven type touch panel TSP having repeated 2*2 TUs of a touch display device according to embodiments of the present disclosure.

Referring to FIGS. 20 and 21, a plurality of electrodes are arranged in n (n=8 in FIG. 6 and n=16 in FIGS. 12 and 16) electrode rows and disposed in an active area A/A, in which, in the n electrode rows, any one electrode row of adjacent two electrode rows may include more electrodes than the other one electrode row.

In the plurality of electrodes, some electrodes TE_U1 and TE_U2 positioned in the first electrode row (or second electrode row) of the upper edge area of the active area A/A do not have electrodes, which connected into groups together, around them. Some electrodes TE_D1 and TE_D2 positioned in the n−1-th electrode row (or n-th electrode row) of the lower edge area of the active area A/A do not have electrodes, which connected into groups together, around them.

Accordingly, in a way, as shown in FIG. 20, in the plurality of electrodes, some electrodes TE_U1 and TE_U2 positioned in the first electrode row (or second electrode row) of the upper edge area of the active area A/A and some electrodes TE_D1 and TE_D2 positioned in the n−1-th electrode row (or n-th electrode row) of the lower edge area of the active area A/A may be electrically connected with each other by third signal lines SL_UD1 and SL_UD2 in the active area A/A through contact holes CNT_U1, CNT_U2, CNT_D1, and CNT_D2.

The upper contact hole CNT_U1 of the third signal line SL_UD1 is connected with the electrode TE_U1 and the lower contact hole CNT_D1 of the third signal line SL_UD1 is connected with the electrode TE_D1. The upper contact hole CNT_U2 of the third signal line SL_UD2 is connected with the electrode TE_U2 and the lower contact hole CNT_D2 of the third signal line SL_UD2 is connected with the electrode TE_D2.

The third signal lines SL_UD1 and SL_UD2 in the active area A/A may overlap the electrodes disposed between some electrodes TE_U1 and TE_U2 positioned in the first electrode row (or second electrode row) and some electrodes TE_D1 and TE_D2 positioned in the n−1-th electrode row (n-th electrode row).

In another way, as shown in FIG. 21, two or more electrodes TE_U1 and TE_U2 of the electrodes positioned in the first electrode rows (or second electrode rows) of the upper edge area of the active area A/A of the plurality of electrodes may be electrically connected by a fourth signal line SL_OU detouring through an upper outside area N/A of the active area A/A.

The signal line SL_UD1 connected with the touch sensing circuit TSC is connected to only one TE_U1 of two or more electrodes TE_U1 and TE_U2 through a contact hole CNT_U. The two or more electrodes TE_U1 and TE_U2 are electrically connected by the fourth signal line SL_OU detouring through the upper outside area N/A of the active area A/A.

Similarly, two or more electrodes TE_D1 and TE_D2 of the electrodes positioned in the n−1-th electrode rows (or n-th electrode rows) of the lower edge area of the active area A/A of the plurality of electrodes may be electrically connected by a fifth signal line SL_OD detouring through a lower outside area N/A of the active area A/A.

The signal line SL_UD2 connected with the touch sensing circuit TSC is connected to only one TE_D2 of two or more electrodes TE_D1 and TE_D2 through a contact hole CNT_U. The two or more electrodes TE_D1 and TE_D2 are electrically connected by the fifth signal line SL_OD detouring through the lower outside area N/A of the active area A/A.

Figure 22:
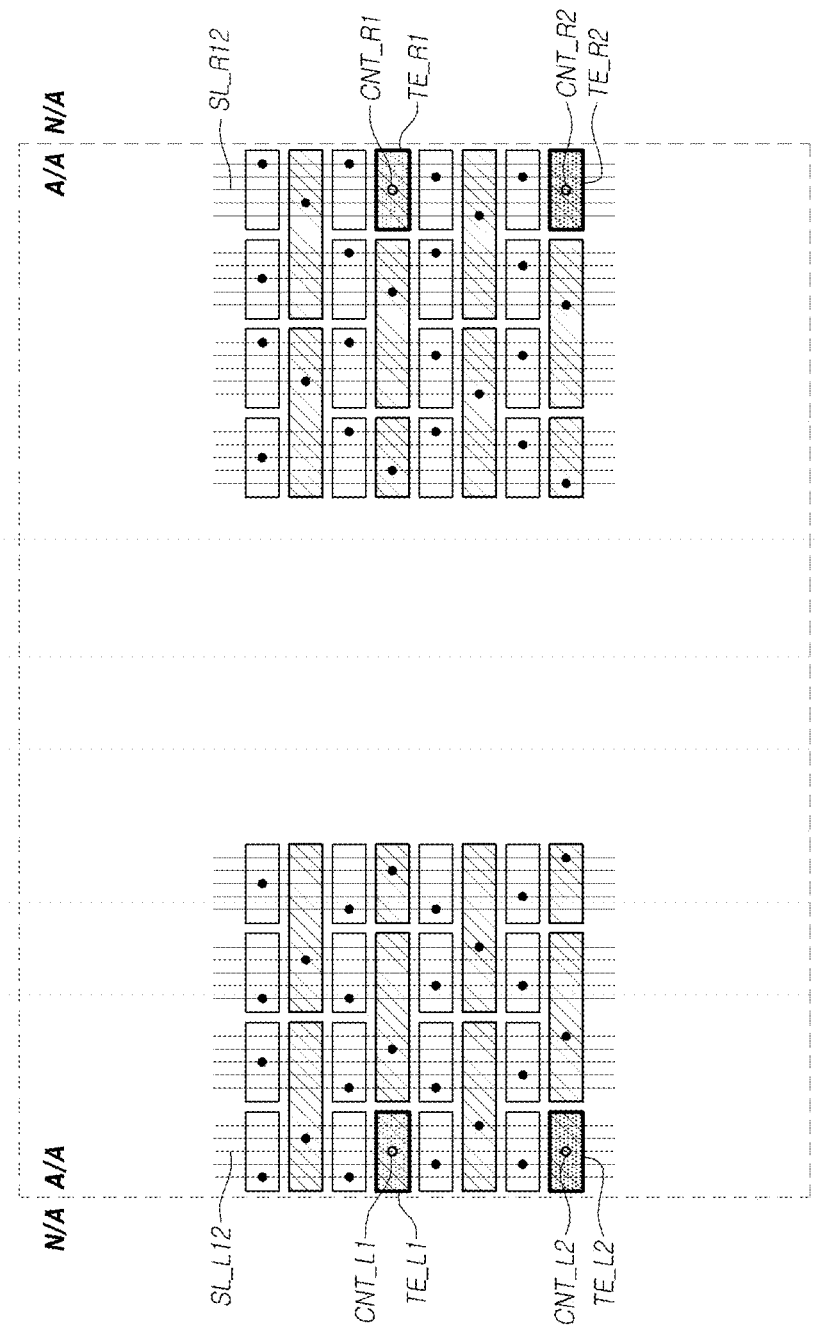
FIGS. 22 and 23 are diagrams showing a connection structure of outermost electrodes in a left edge area and a right edge area of an active area in a woven type touch panel having repeated 2*2 TUs of a touch display device according to embodiments of the present disclosure.
Figure 23:
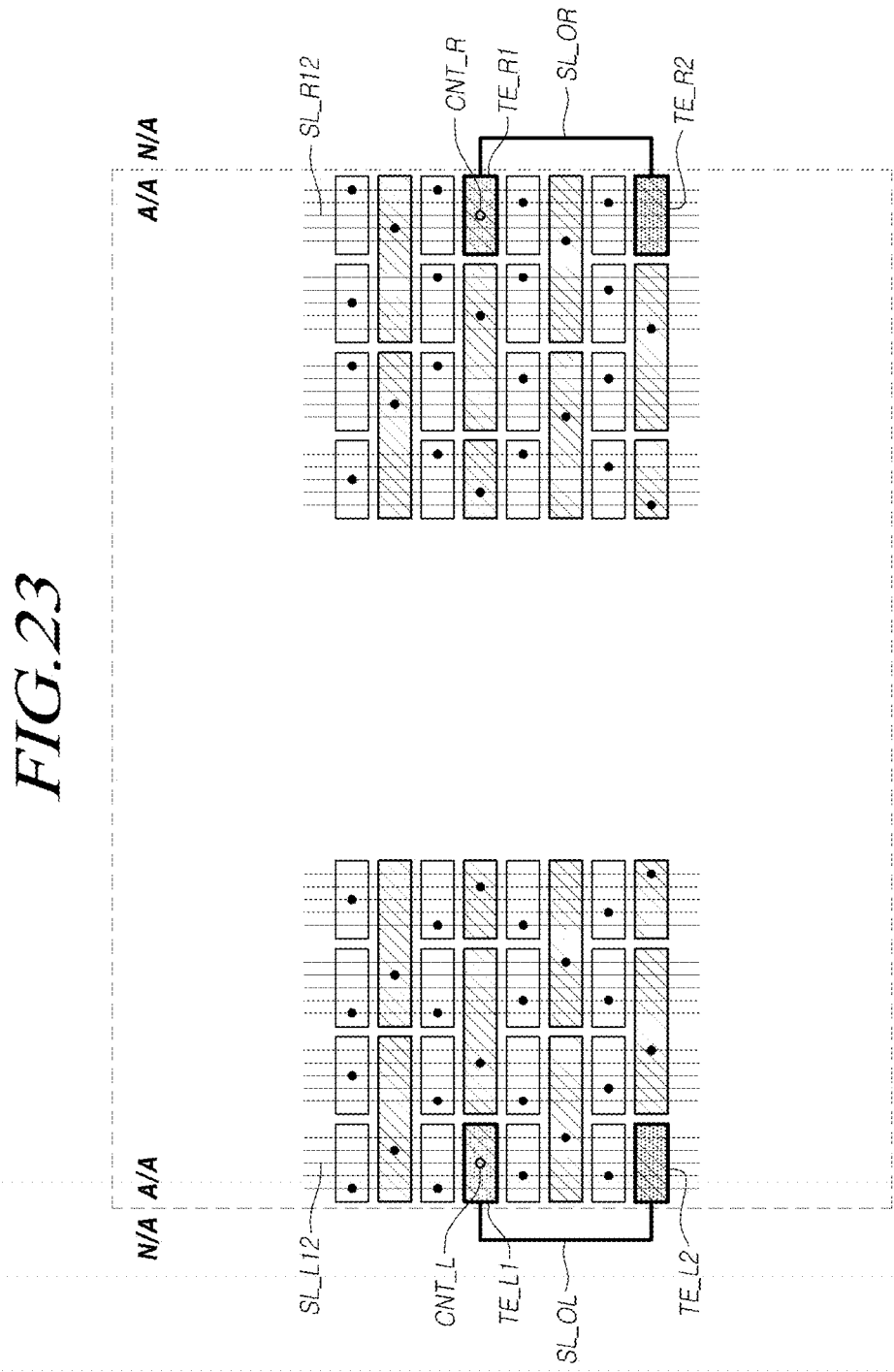

FIGS. 22 and 23 are diagrams showing a connection structure between outermost electrodes in a left edge region and a right edge region of an active area A/A in a woven type touch panel TSP having repeated 2*2 TUs of a touch display device according to embodiments of the present disclosure.

Referring to FIGS. 22 and 23, a plurality of electrodes may be disposed in the active area A/A. Two or more left outer most electrodes TE_L1 and TE_L2 of the electrodes positioned in the left edge area of the active area A/A of the plurality of electrodes do not have electrodes, which are connected into groups together, around them. Further, two or more right outer most electrodes TE_R1 and TE_R2 of the electrodes positioned in the right edge area of the active area A/A of the plurality of electrodes do not have electrodes, which are connected into groups together, around them.

According, in a way, as shown in FIG. 22, two or more left outer most electrodes TE_L1 and TE_L2 of the electrodes positioned in the left edge area of the active area A/A of the plurality of electrodes can be electrically connected by a sixth signal line SL_L12 in the active area A/A though contact holes CNT_L1 and CNT_L2. According, in a way, as shown in FIG. 22, two or more right outer most electrodes TE_R1 and TE_R2 of the electrodes positioned in the right edge area of the active area A/A of the plurality of electrodes can be electrically connected by a seventh signal line SL_R12 in the active area A/A though contact holes CNT_R1 and CNT_R2.

The sixth signal line SL_L12 may overlap the electrodes disposed between the two or more left outermost electrodes TE_L1 and TE_L2. The seventh signal line SL_R12 may overlap the electrodes disposed between the two or more right outermost electrodes TE_R1 and TE_R2.

In another way, as shown in FIG. 23, two or more left outer most electrodes TE_L1 and TE_L2 of the electrodes positioned in the left edge area of the active area A/A of the plurality of electrodes can be electrically connected by a sixth signal line SL_OL detouring through an outer area N/A of the active area A/A.

The signal line SL_L12 connected with the touch sensing circuit TSC is connected to only one TE_L1 of two or more electrodes TE_L1 and TE_L2 through a contact hole CNT_L. The two or more electrodes TE_L1 and TE_L2 are electrically connected by the sixth signal line SL_OL detouring through the left outside area N/A of the active area A/A.

Two or more right outer most electrodes TE_R1 and TE_R2 of the electrodes positioned in the right edge area of the active area A/A of the plurality of electrodes can be electrically connected by a seventh signal line SL_OR detouring an outer area N/A of the active area A/A.

The signal line SL_R12 connected with the touch sensing circuit TSC is connected to only one TE_R1 of two or more electrodes TE_R1 and TE_R2 through a contact hole CNT_R. The two or more electrodes TE_R1 and TE_R2 are electrically connected by the seventh signal line SL_OR detouring through the right outside area N/A of the active area A/A.

A method of driving and sensing the woven type touch panels TSP described with reference to FIGS. 6 to 23 is described hereafter. However, for the convenience of description, the case when the 2*2 touch units TU of FIGS. 6 to 11 constitute one pattern unit PU is exemplified.

Figure 24:
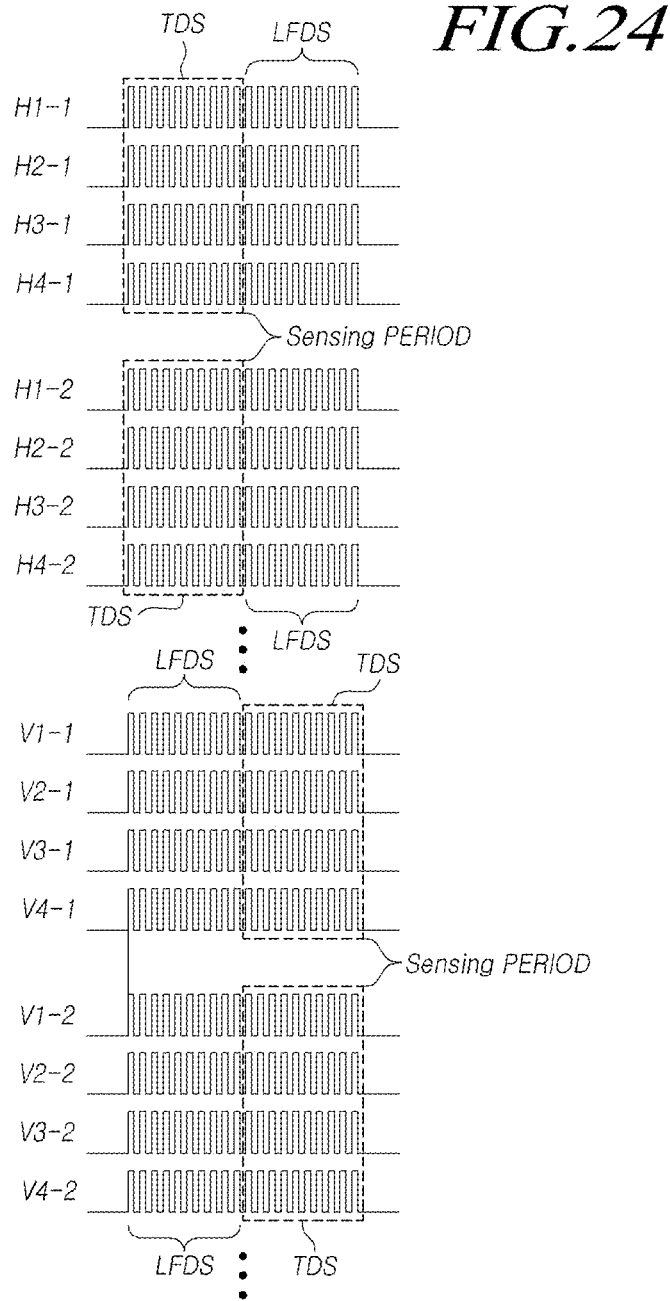
FIGS. 24 and 25 are diagrams illustrating a driving method of a touch display device according to embodiments of the present disclosure.
Figure 25:
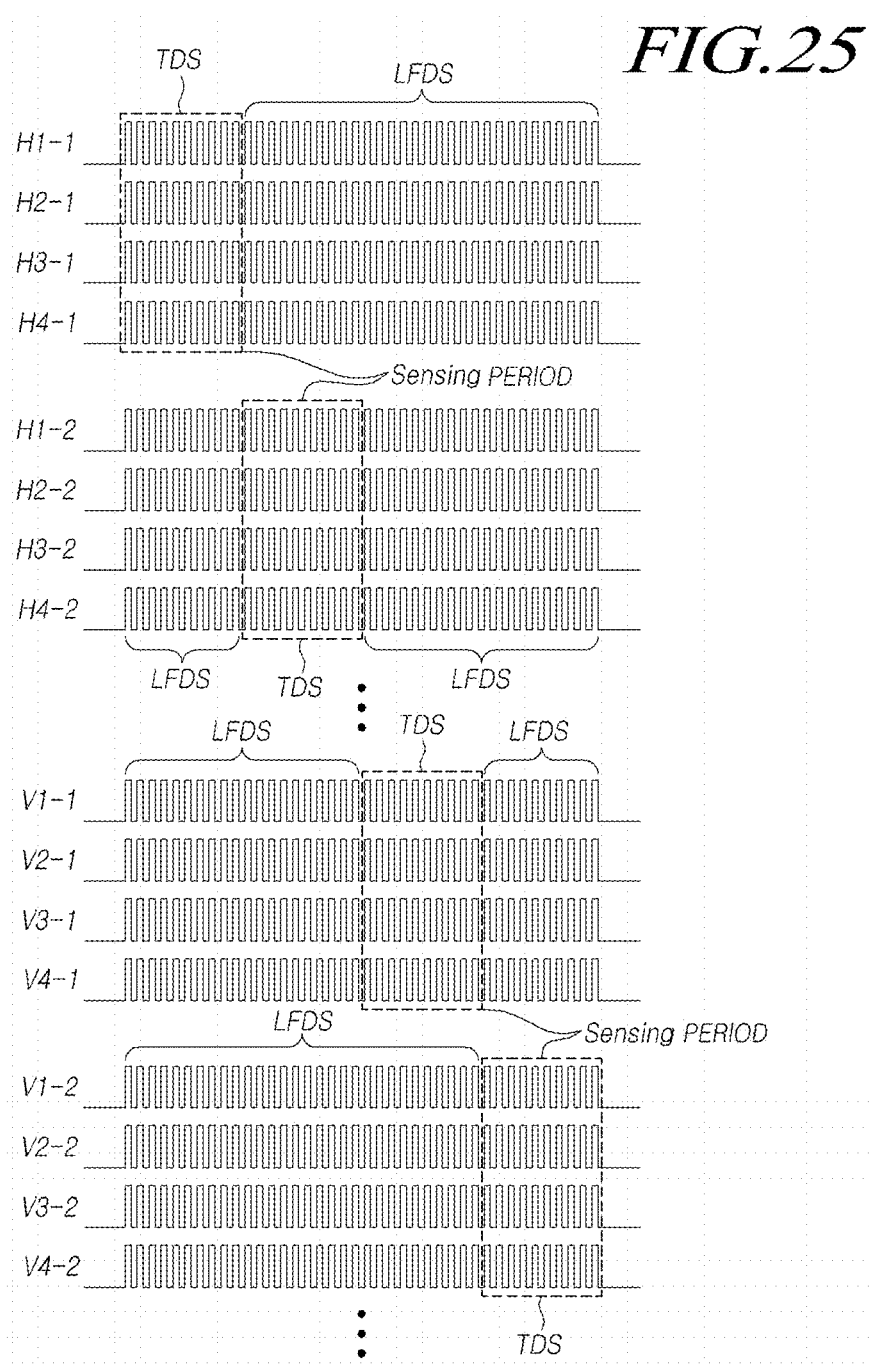

FIGS. 24 and 25 are diagrams illustrating a driving method of a touch display device according to embodiments of the present disclosure. However, the driving method refers to the structure of FIG. 8 for the convenience of description.

Referring to FIGS. 24 and 25, the electrodes disposed in the i−4-th, i−2-th, i-th, and i+2-th electrode rows of a plurality of electrodes are grouped by two, thereby forming a plurality of touch electrodes V1-1, V2-1, V3-1, V4-1, V1-2, V2-2, V3-2, V4-2, V2-3, V4-3, . . . . The electrodes disposed in the i−3-th electrode row, i−1-th electrode row, i+1-th electrode row, and i+3-th electrode row of the plurality of electrodes respectively form touch electrodes H1-1, H1-2, H2-1, H2-2, H2-3, H3-1, H3-2, H4-1, H4-2, H4-3, . . . .

Accordingly, referring to FIGS. 24 and 25, the touch sensing circuit TSC of a touch display device according to embodiments of the present disclosure can sense one or more touch electrodes. Accordingly, the touch sensing circuit TSC can sense two or more electrodes grouped in a touch electrode of a plurality of electrodes.

The touch display device according to embodiments of the present disclosure may sense touches on the basis of self-capacitance or may sense touches on the basis of mutual-capacitance.

When the touch display device according to embodiments of the present disclosure senses touches on the basis of self-capacitance, the touch sensing circuit TSC can detect a touch sensing signal by supplying a touch driving signal TSD to the first electrode TE(i)1 in the i-th electrode row and the first electrode TE(i+2)1 in the i+2-th electrode row. The touch sensing circuit TSC can detect a touch sensing signal by supplying a touch driving signal TDS to the first electrode TE(i+1)1 in the i+1-th electrode row positioned between the first electrode TE(i)1 in the i-th electrode row and the first electrode TE(i+2)1 in the i+2-th electrode row.

The touch driving signal TDS described herein, which is a signal having a variable voltage level, may be a signal including sever pulses. The touch driving signal TDS has a predetermined frequency and can swing with a predetermined amplitude.

When the touch display device according to embodiments of the present disclosure senses touches on the basis of mutual-capacitance, it can sense capacitance between the first electrode TE(i)1 in the i-th electrode row and the first electrode TE(i+1)1 in the i+1-th electrode row and can sense capacitance between the first electrode TE(i+2)1 in the i+2-th electrode row and the first electrode TE(i+1)1 in the i+1-th electrode row.

To this end, the touch sensing circuit TSC can supply a touch driving signal to the first electrode TE(i)1 in the i-th electrode row and the first electrode TE(i+2)1 in the i+2-th electrode row and can detect a touch sensing signal from the first electrode TE(i+1)1 in the i+1-th electrode row positioned between the first electrode TE(i)1 in the i-th electrode row and the first electrode TE(i+2)1 in the i+2-th electrode row.

Alternatively, the touch sensing circuit TSC can supply a touch driving signal to the first electrode TE(i+1)1 in the i+1-th electrode row positioned between the first electrode TE(i)1 in the i-th electrode row and the first electrode TE(i+2)1 in the i+2-th electrode row and can detect a touch sensing signal from the first electrode TE(i)1 in the i-th electrode row and the first electrode TE(i+2)1 in the i+2-th electrode row.

The touch sensing circuit TSC can supply a touch driving signal TDS to the first electrode TE(i)1 in the i-th electrode row and the first electrode TE(i+2)1 in the i+2-th electrode row through the first signal line SL_1B and can supply a touch driving signal TDS to the k-th (k=2) electrode TE(i)k in the i-th electrode line and the k-th (k=2) electrode TE(i−2)k in the i−2-th electrode line through the second signal line SL_2A.

As shown in FIG. 24, the touch electrodes H1-1, H2-1, H3-1, H4-1, H1-2, H2-2, H3-2, H4-2, . . . in which the electrodes disposed in the i−3-th electrode row, the i−1-th electrode row, the i+1-th electrode row, and the i+3-th electrode row are respectively formed can be simultaneously sensed by simultaneously receiving a touch driving signal TDS. The electrodes disposed in the i−4-th, i−2-th, i-th, and i+2-th electrode lines are grouped, whereby a load free driving signal LFDS for preventing parasitic capacitance can be applied to all of a plurality of touch electrodes V1-1, V2-1, V3-1, V4-1, V1-2, V2-2, V3-2, V4-2, . . . . The load free driving signal LFDS may correspond to the touch driving signal TDS in frequency and amplitude, and may be a signal that is the same as the touch driving signal TDS.

As shown in FIG. 24, the electrodes disposed in the i−4-th, i−2-th, i-th, and i+2-th electrode lines are grouped, whereby the plurality of touch electrodes V1-1, V2-1, V3-1, V4-1, V1-2, V2-2, V3-2, V4-2, . . . can be simultaneously sensed by simultaneously receiving a touch driving signal TDS. A load free driving signal LFDS for preventing parasitic capacitance may be simultaneously applied to all the touch electrodes H1-1, H2-1, H3-1, H4-1, H1-2, H2-2, H3-2, H4-2, . . . in which the electrodes disposed in the i−3-th electrode line, the i−1-th electrode line, the i+1-th electrode line, and the i+3-th electrode line are respectively formed. The load free driving signal LFDS may correspond to the touch driving signal TDS in frequency and amplitude, and may be a signal that is the same as the touch driving signal TDS.

As shown in FIG. 25, the touch electrodes H1-1, H2-1, H3-1, H4-1, H1-2, H2-2, H3-2, H4-2, . . . in which the electrodes disposed in the i−3-th electrode line, the i−1-th electrode line, the i+1-th electrode line, and the i+3-th electrode line are respectively formed can be grouped, thereby being able to be sequentially driven and sensed. For example, the touch electrodes H1-1, H2-1, H3-1, and H4-1 may be simultaneously sensed by firstly simultaneously receiving a touch driving signal. Next, the touch electrodes H1-2, H2-2, H3-2, and H4-2 may be simultaneously sensed by simultaneously receiving a touch driving signal TDS. A load free driving signal LFDS for preventing parasitic capacitance may be applied to all the other electrodes to which a touch driving signal TDS has not been applied.

As shown in FIG. 25, the electrodes disposed in the i−4-th, i−2-th, i-th, and i+2-th electrode lines are grouped, whereby the plurality of touch electrodes V1-1, V2-1, V3-1, V4-1, V1-2, V2-2, V3-2, V4-2, . . . can be grouped, thereby being able to be sequentially driven and sensed. For example, the touch electrodes V1-1, V2-1, V3-1, and V4-1 may be simultaneously sensed by firstly simultaneously receiving a touch driving signal. Next, the touch electrodes V1-2, V2-2, V3-2, and V4-2 may be simultaneously sensed by simultaneously receiving a touch driving signal TDS. A load free driving signal LFDS for preventing parasitic capacitance may be applied to all the other electrodes to which a touch driving signal TDS has not been applied.

On the other hand, a touch display device according to embodiments of the present disclosure may perform display driving for image display during a display period and may perform touch driving for touch sensing during a touch period different from the display period.

During the display period, a plurality of electrodes may be floated or has received predetermined voltage, or a voltage set for improving display performance may be applied.

A plurality of electrode may function as a common electrode to which a common voltage required for display driving is applied. In this case, a common voltage can be applied to the plurality of electrodes for the display period.

The touch sensing circuit TSC can supply a touch driving signal TDS to two or more electrodes grouped in a touch electrode of the plurality of electrodes during the touch period.

During the touch period, when a touch driving signal TDS is supplied to two or more electrodes grouped as a touch electrode of the plurality of electrodes to prevent unnecessary parasitic capacitance between a data line and touch electrode, a data signal (not a data signal for image display) having the same amplitude and phase as the touch driving signal TDS may be applied to a plurality of data lines disposed in the display panel DISP.

A touch display panel according to embodiments of the present disclosure may independently perform display driving for image display and touch driving for touch sensing. Alternatively, the touch display device may simultaneously perform display driving for image display and touch driving for touch sensing.

The plurality of electrodes are touch electrodes for touch driving, but may also be common electrodes to which a common voltage required for display driving is applied.

Accordingly, in order that display driving and touch driving can be simultaneously performed, when the touch sensing circuit TSC supplies a touch driving signal TDS to two or more electrodes to be grouped in a touch electrode of the plurality of electrodes, the data signal that is applied to the plurality of data lines disposed in the display panel may be a signal obtained by combining the data voltage for image display and the touch driving signal TDS. Further, the gate signal that is applied to the plurality of gate lines disposed in the display panel may be a signal obtained by combining gate voltages VGH and VGL for driving gate lines and a touch driving signal TDS.

Various driving operations of a touch display device according to embodiments of the present disclosure are described hereafter. The various driving operations may include display driving for image display, touch driving (finger touch driving) for sensing touches by fingers etc., and touch driving (pen touch driving) for sensing touches by a pen etc.

In the following description, it is assumed that, in a woven type touch panel TSP, for example, as shown in FIGS. 7 and 8, a plurality of touch electrodes V1-1, V2-1, V3-1, V4-1, V1-2, V2-2, V3-2, V4-2, V2-3, V4-3, . . . are formed by grouping by two the electrodes TE(i−4)1~TE(i−4)4, TE(i−2)1~TE(i−2)4, TE(i)1~TE(i)4, and TE(i+2)1~TE(i+2)4 disposed in the 1−4-th, 1−2-th, i-th, and i+2-th electrode rows, and the electrodes TE(i−3)1~TE(i−3)2, TE(i−1)1~TE(i−1)3, TE(i+1)1~TE(i+1)2, TE(i+3)1~TE(i+3)3 disposed in the i−3-th electrode row, i−1-th electrode row, i+1-th electrode row, and i+3-th electrode row respectively drive a plurality of touch electrodes V1-1, V2-1, V3-1, V4-1, V1-2, V2-2, V3-2, V4-2, V2-3, V4-3, . . . , and H1-1, H1-2, H2-1, H2-2, H2-3, H3-1, H3-2, H4-1, H4-2, H4-3, . . . when a plurality of touch electrodes H1-1, H1-2, H2-1, H2-2, H2-3, H3-1, H3-2, H4-1, H4-2, H4-3, . . . is formed.

In the following description, for the convenience of description, the plurality of touch electrodes V1-1, V2-1, V3-1, V4-1, V1-2, V2-2, V3-2, V4-2, V2-3, V4-3, . . . , and H1-1, H1-2, H2-1, H2-2, H2-3, H3-1, H3-2, H4-1, H4-2, H4-3, . . . are briefly referred as a plurality of touch electrodes TE.

Figure 26:
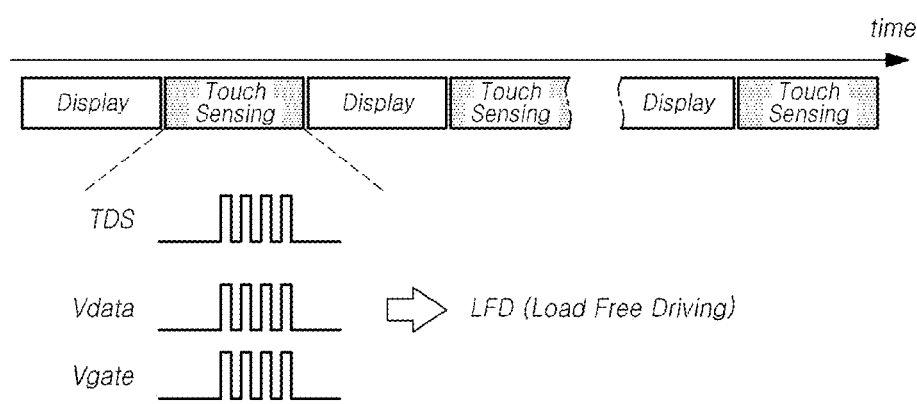
FIG. 26 is a diagram illustrating a time division driving method of a touch display device according to embodiments of the present disclosure.

FIG. 26 is a diagram illustrating a Time Division Driving (TDD) method of a touch display device according to embodiments of the present disclosure.

Referring to FIG. 26, a touch display device according to embodiments of the present disclosure can alternately perform displaying and touch sensing. The method of alternately progressing display driving for display and touch driving for touch sensing, as described above, is called time division driving method.

According to the time division driving method, a display period for display and a touch sensing period for touch sensing are alternately shown. During the display period, the touch display device can perform display driving. During the touch sensing period, the touch display device can perform touch driving.

As an example of the time division driving method, one frame time may be divided into one display period and one touch sensing period. As another example of the time division driving method, one frame time may be divided into two or more display periods and two or more touch sensing periods.

Referring to FIG. 26, according to the time division driving method, a touch driving signal TDS may be applied to one or more of a plurality of touch electrodes TE during the touch sensing period. A plurality of data lines and a plurality of gate lines may not be driven in this process.

In this case, unnecessary parasitic capacitance due to a potential difference may be generated between the touch electrodes TE to which the touch driving signal TDS has been applied and one or more surrounding data lines. Such unnecessary parasitic capacitance may deteriorates touch sensitivity by increasing RC delay for a corresponding touch electrode TE and a touch line TL connected to the touch electrode TE.

Further, unnecessary parasitic capacitance due to a potential difference may be generated also between the touch electrodes TE to which the touch driving signal TDS has been applied and one or more surrounding gate lines. Such unnecessary parasitic capacitance may deteriorates touch sensitivity by increasing RC delay for a corresponding touch electrode TE and a touch line TL connected to the touch electrode TE.

Further, unnecessary parasitic capacitance due to a potential difference may be generated also between the touch electrodes TE to which the touch driving signal TDS has been applied and one or more other surrounding touch electrodes. Such unnecessary parasitic capacitance may deteriorate touch sensitivity by increasing RC delay for a corresponding touch electrode TE and a touch line TL connected to the touch electrode TE.

The RC delay stated above may be referred to as a time constant or a load.

In order to remove the load, a touch display device according to embodiments of the present disclosure may perform Load Free Driving (LFD) for the touch sensing period.

A touch display device according to embodiments of the present disclosure can apply a load free driving signal LFDS as a data signal Vdata to all data lines or some data lines in which parasitic capacitance may be generated, when a touch driving signal TDS is applied to all or some of a plurality of touch electrodes TE in load free driving.

A touch display device according to embodiments of the present disclosure can apply a load free driving signal LFDS as a gate signal Vgate to all gate lines or some gate lines in which parasitic capacitance may be generated, when a touch driving signal TDS is applied to all or some of a plurality of touch electrodes TE in load free driving.

A touch display device according to embodiments of the present disclosure can apply a load free driving signal LFDS to all other touch electrodes TE or some other touch electrodes TE in which parasitic capacitance may be generated, when a touch driving signal TDS is applied to some of a plurality of touch electrodes TE in load free driving.

The load free driving signal LFDS may be a touch driving signal or may be a signal having signal characteristics that are the same as or similar to those of a touch driving signal.

For example, the frequency and phase of the load free driving signal LFDS and the frequency and phase of a touch driving signal TDS may be the same, or may be the same within a predetermined tolerance range. The amplitude of the load free driving signal LFDS and the amplitude of a touch driving signal TDS may be the same or may the same within a predetermined tolerance range, and depending on cases, there may be an intentionally difference.

Figure 27:
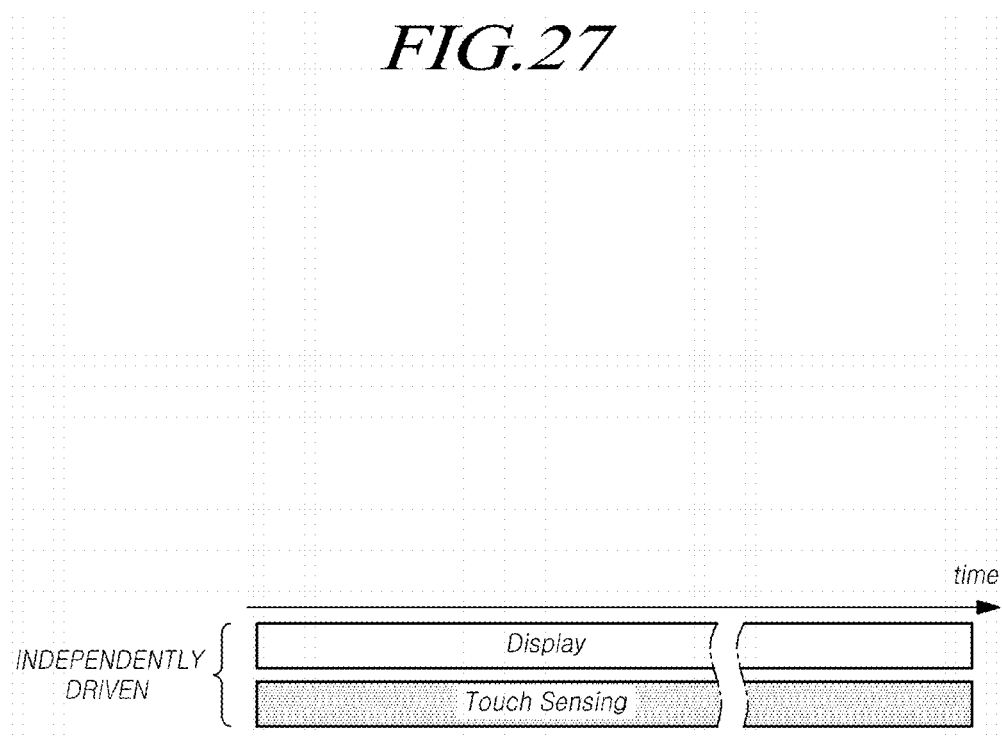
FIG. 27 is a diagram illustrating a time free driving method of a touch display device according to embodiments of the present disclosure.

FIG. 27 is a diagram illustrating a Time Free Driving (TFD) method of a touch display device according to embodiments of the present disclosure.

Referring to FIG. 27, a touch display device according to embodiments of the present disclosure can independently perform displaying and touch sensing. The driving method of independently performing display driving for display and touch driving for touch sensing, as described above, is called time free driving method.

According to the time free driving method, display driving for display and touch driving for touch sensing may be simultaneously progressed. During a certain period, only display driving for display may progress or only touch driving for touch sensing may progress.

Figure 28:
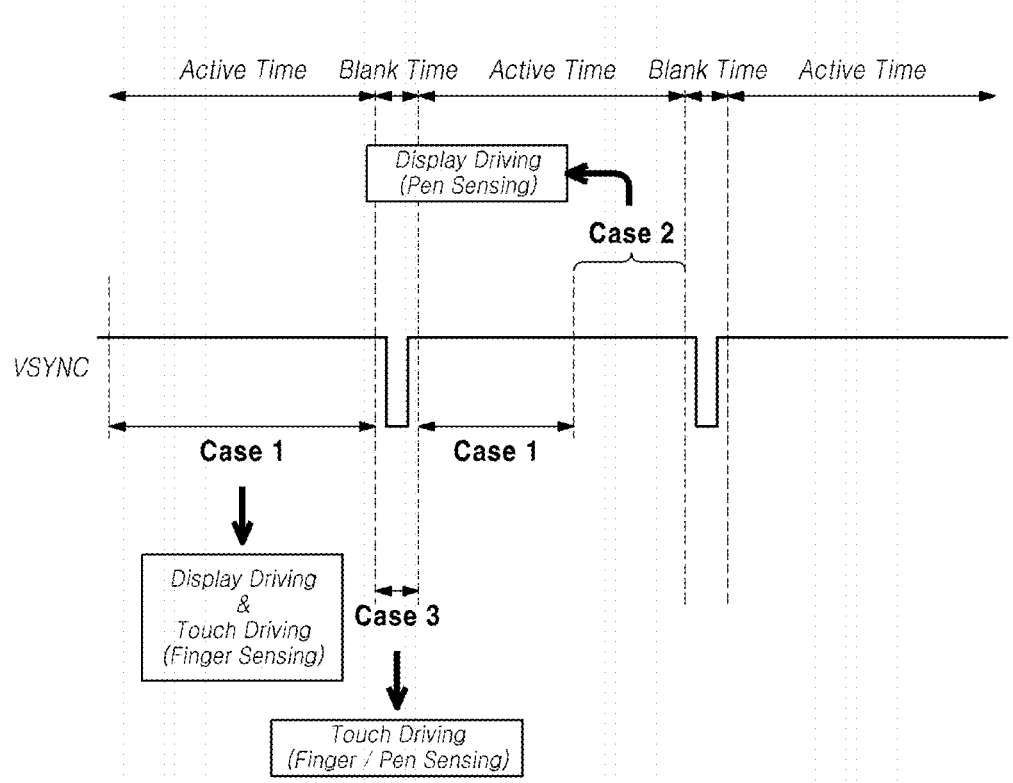
FIG. 28 is a diagram showing three cases of time free driving in a touch display device according to embodiments of the present disclosure.
Figure 29:
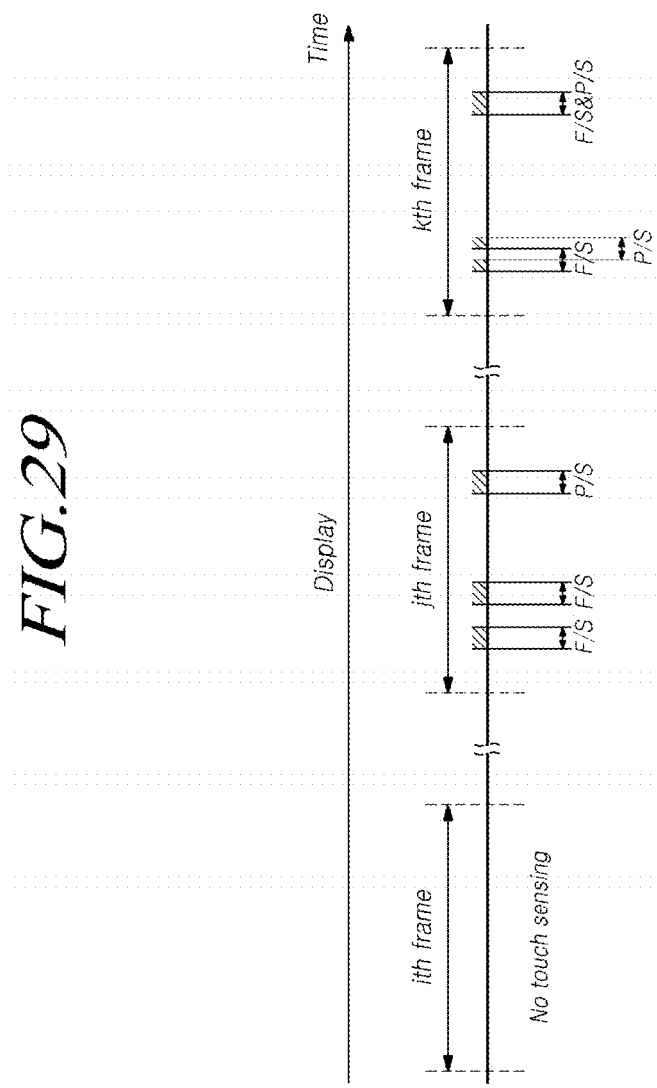
FIG. 29 is a diagram showing various timings of finger sensing and pen sensing according to the time free driving method in a touch display device according to embodiments of the present disclosure.

FIG. 28 is a diagram showing three cases (cases 1, 2, and 3) of time free driving when a touch display device according to embodiments of the present disclosure performs time free driving, FIG. 29 is a diagram showing various timings of finger sensing F/S and pen sensing P/S according to the time free driving method in a touch display device according to embodiments of the present disclosure, and FIG. 30 is a diagram showing a touch driving signal TDS for each of three cases (cases 1, 2, and 3) of time free driving in a touch display device according to embodiments of the present disclosure.

According to the case 1 of time free driving, a touch display device can simultaneously progress display driving and touch driving.

In case 1, the touch display device can supply a touch driving signal TDS having a variable voltage to a touch electrode TE to perform touch driving.

In the following description, the touch driving signal TDS that is applied to a touch electrode TE in the case 1 is referred to as a first touch driving signal TDS1. The first touch driving signal TDS1 has a first amplitude AMP1.

In the case 1, the touch display device can sense a touch by contact of a finger on the touch panel TSP by performing touch driving. This touch sensing is referred to as finger sensing.

Alternatively, in the case 1, the touch display device can sense a touch by a finger or a pen when the finger or the pen approaches the touch panel TSP without coming in contact with the touch panel TSP by performing touch driving. This touch sensing is referred to as hover sensing.

According to the case 2 of time free driving, a touch display device can perform only display driving.

In the case 2, the touch display device does not perform general touch driving because there is no need for sensing a touch by a finger. That is, the touch display device does not supply a touch driving signal TDS having a variable voltage to a plurality of touch electrodes TE disposed in the touch panel TSP.

In the case 2, the touch display device can supply a touch driving signal TDS having a DC voltage. In the following description, the touch driving signal TDS that is applied to a touch electrode TE in the case 2 is referred to as a second touch driving signal TDS2.

In the case 2, the touch display device can sense a pen by receiving a pen signal, which is output from a pen, through a touch electrode TE. The touch display device can find out the location, tilt, pressure (pen pressure) of the pen or various items of additional information as the result of sensing the pen.

According to the case 3 of time free driving, a touch display device can perform only touch driving.

In case 3, the touch display device can supply a touch driving signal TDS having a variable voltage to a touch electrode TE to perform touch driving.

In the following description, the touch driving signal TDS that is applied to a touch electrode TE in the case 3 is referred to as a third touch driving signal TDS3. The third touch driving signal TDS3 has a third amplitude AMP3 different from the first amplitude AMP1.

In the case 3, the touch display device can sense a touch by contact of a finger on the touch panel TSP by performing touch driving.

Referring to FIG. 28, in the touch display device, the case 1 of three cases (cases 1, 2, and 3) of time free driving may progress at an active time and the case 3 may progress at a blank time. The active time may correspond to the time for which an image of one frame is displayed and the blank time may correspond to the time that is taken until an image of the next frame starts to be displayed after the previous image of one frame is displayed.

Referring to FIG. 28, the case 1 may change into the case 2 for the active time.

Referring to FIG. 28, for the active time, the touch display device can stop touch driving for finger sensing while performing both of display driving and touch driving (progresses in the case 1) (i.e., changes from the case 1 to the case 2).

In the cases 1 and 3, in touch driving for finger sensing, touch driving signals TDS1 and TDS3 having amplitudes AMP1 and AMP3 respectively may be applied to a touch electrode TE.

In the case 2, for pen sensing, a touch driving signal TDS2 having a DC voltage may be applied to a touch electrode TE.

Referring to FIG. 30, the first amplitude AMP1 of the first touch driving signal TDS1 that is applied to a touch electrode TE when touch driving is performed with display driving (case 1) may be smaller than the third amplitude AMP3 of the third touch driving signal TDS3 that is applied to a touch electrode TE when only touch driving is performed (case 3).

The first amplitude AMP1 of the first touch driving signal TDS1 that is applied to a touch electrode TE for the active time may be smaller than the third amplitude AMP3 of the third touch driving signal TDS3 that is applied to a touch electrode TE for the blank time.

Referring to FIGS. 28 and 30, for the active time, the touch driving circuit TDC can supply a first touch driving signal TSD1 having a first amplitude AMP1 or a second touch driving signal TDS2 corresponding to a DC voltage to a plurality of touch electrodes TE.

Referring to FIGS. 28 and 30, for the blank time, the touch driving circuit TDC can supply a third touch driving signal TDS3 having a third amplitude AMP3 to one or more of a plurality of touch electrodes TE.

Driving that corresponds to the case 1 may progress for one frame or may progress only in some time period in one frame. Driving that corresponds to the case 2 may progress for all frames or some frames and may progress only in some time period in the frames. In driving that corresponds to the case 3, driving for finger sensing may progress or driving for pen sensing may progress.

Referring to FIG. 29, in a touch display device according to embodiments of the present disclosure, according to the time free driving method, finger sensing F/S and pen sensing P/S may be formed at various timings.

For example, as in the i-th frame, only display driving for display may progress without finger sensing F/S and pen sensing P/S for one frame. This may correspond to the case 2 without pen sensing P/S.

Further, in the j-th frame, for one frame, finger sensing F/S may progress only for some necessary time period in one frame time. This may correspond to the case 1. Further, for one frame, pens sensing P/S may progress only for some necessary time period in one frame time. This may correspond to the case 2. Further, for one frame, finger sensing F/S and pen sensing P/S may progress for some non-overlapping time periods in one frame time.

For example, as in the k-th frame, for one frame, finger sensing F/S and pen sensing P/S may progress for overlapping time periods. In this case, the sensing results of the finger sensing F/S and pen sensing P/S can be discriminated through a predetermined algorithm or signal analysis according to a sensing position by the touch controller TCTR etc.

In addition to these examples, displaying and touch sensing (finger sensing and/or pen sensing) may be independently progressed at various timings.

Figure 31:
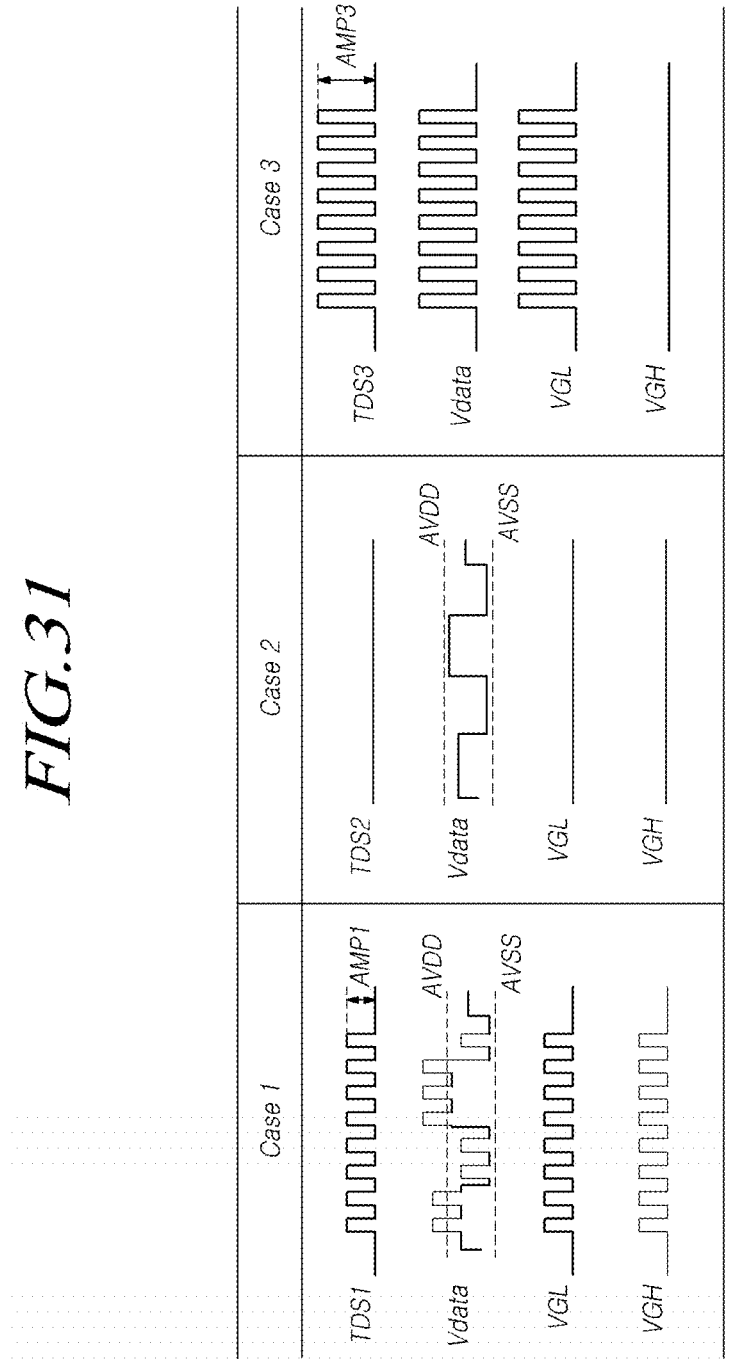
FIG. 31 is a diagram arranging and showing the wavelength of main signals for each of three cases of time free driving in a touch display device according to embodiments of the present disclosure.

FIG. 31 is a diagram arranging and showing the wavelength of main signals TDS1, Vdata, VGL_M, and VGH_M for each of three cases (cases 1, 2, and 3) of time free driving in a touch display device according to embodiments of the present disclosure.

The cases 1 and 2 are driving cases for an active time. The case 3 is a driving case for a blank time.

For each of the three cases, a touch driving signal TDS that is applied to a touch electrode TE, a data signal Vdata that is supplied to a data line, and a off-level gate voltage VGL and an on-level gate voltage VGH that are supplied to a gate driving circuit GDC to generate a scan signal Vgate that is applied to a gate line are described.

In the case 2 in which only display driving progresses for the active time, the touch driving signal TDS that is applied to the touch electrode TE is a second touch driving signal TDS2 having a DC voltage.

The data signal Vdata that is applied to a data line, which is a signal corresponding to an image analog signal obtained by digital-analog converting a digital signal for display, may be a pixel voltage that is applied to a pixel electrode of a corresponding subpixel SP through the data line. However, the data signal Vdata may change in voltage between a driving voltage AVDD and a base voltage AVSS.

The off-level gate voltage VGL and the on-level gate voltage VGH constituting the scan signal Vgate that is applied to the gate line are corresponding DC voltages.

As described above, a touch electrode TE may function as a common electrode for display driving. Accordingly, in the case 2 in which only display driving progresses for the active time, the second touch driving signal TDS2 that is applied to a touch electrode TE corresponds to a common voltage for displaying.

Accordingly, in a corresponding subpixel SP, an electric field is generated between the pixel electrode and the touch electrode TE due to a voltage difference between the data signal Vdata applied to the pixel electrode through the data line and the second touch driving signal TDS2 corresponding to the common voltage applied to the touch electrode TE, whereby desired light can come out of the corresponding sub-pixel.

In the case 3 in which only touch driving progresses for the blank time, the touch driving signal TDS that is applied to the touch electrode TE is a third touch driving signal TDS3 having a third amplitude AMP3.

For the blank time, the data line may receive a data signal Vdata corresponding to a DC voltage or may be in a floating state. For the blank time, the gate line may receive a scan signal Vgate composed of an off-level gate voltage VGL corresponding to a DC voltage, or may be an electrically floating state.

For the blank time for which only touch driving progresses, when load free driving is performed, the data line and the gate line may be shaken to be the same as the touch electrode TE, considering in terms of a voltage characteristic.

According to the load free driving, for the blank time, the data signal Vdata that is applied to the data line may be a third touch driving signal TDS3 or may be a load free driving signal having signal characteristics (e.g., a phase, a frequency, and an amplitude) that are the same as or similar to those of the third touch driving signal TDS3.

Further, according to the load free driving, for the blank time, the off-level gate voltage VGL that is applied to the gate line may be a third touch driving signal TDS3 or a load free driving signal having signal characteristics (e.g., a phase, a frequency, and an amplitude) that are the same as or similar to those of the third touch driving signal TDS3.

In the case 1 in which display driving and touch driving simultaneously progress for the active time, the touch driving signal TDS applied to the touch electrode TE is a first touch driving signal TDS1 having a first amplitude AMP1.

In the case 1, since display driving and touch driving simultaneously progress for the active time, the first touch driving signal TDS1 is a driving signal for touch sensing and is also a common voltage Vcom for displaying.

The first touch driving signal TDS1 that is applied to the touch electrode TE should have a predetermined voltage difference for displaying from the data signal Vdata corresponding to a pixel voltage for displaying.

In the case 1 in which display driving and touch driving simultaneously progress, the first touch driving signal TDS1 performs two functions (a driving signal for touch sensing and a common voltage for displaying).

As described above, the common voltage Vcom corresponding to the first touch driving signal TDS1 is not a constant voltage, but a variable voltage, so there should be an additional voltage change by the first amplitude AMP1 of the first touch driving signal TDS1 other than the original voltage change for displaying in the data signal Vdata that is applied to the data line so that the data line is not influenced by touch driving.

Accordingly, only the original voltage change for displaying exists, without the voltage change portion (i.e., the first amplitude AMP1) of the first touch driving signal TDS1, in the voltage difference between the data signal Vdata corresponding to the pixel voltage and the first touch driving signal TDS1 corresponding to the common voltage Vcom. Accordingly, normal displaying can be possible.

Accordingly, the data signal Vdata in the case 1 in which display driving and touch driving simultaneously progress may be a signal that is a combination of the data signal Vdata in the case (case 2) in which only display driving progresses and the first touch driving signal TDS1.

In other words, the data signal Vdata in the case 1 in which display driving and touch driving simultaneously progress may be a signal in which the original data signal Vdata in the case (case 2), in which only display driving progresses, has been offset by the first touch driving signal TDS1. However, the data signal Vdata may change in voltage between a driving voltage AVDD and a base voltage AVSS.

Accordingly, the voltage difference between the data signal Vdata and the first touch driving signal TDS1 in the case 1 in which touch driving and display driving simultaneously progress is the same as the voltage difference between the data signal Vdata and the second touch driving signal TDS2 in the case 2 in which only display driving progresses.

In the case 1, since touch driving and display driving simultaneously progress, load free driving may be needed.

That is, in the case 1, since touch driving and display driving simultaneously progress, it may be required to prevent parasitic capacitance from being generated between a touch electrode TE and a data line due to touch driving and prevent parasitic capacitance from being generated between a touch electrode TE and a gate line due to touch driving.

According to the above description, in the case 1, since the touch electrode TE and the date line are shaken in accordance with a voltage change of the first touch driving signal TDS1, there is only a voltage difference for display without unnecessary parasitic capacitance due to touch driving between the touch electrode TE and the data line. That is, in the case 1, load free driving for the data line is necessarily progressed.

In the case 1, the off-level gate voltage VGL and the on-level gate voltage VGH that are supplied to the gate driving circuit GDC so that the gate driving circuit GDC generates a scan signal SCAN that is applied to the gate line each may be a load free driving signal having signal characteristics (e.g., a phase, a frequency, and an amplitude) that are the same as or similar to those of the third touch driving signal TDS3.

In time free driving, when display driving and touch driving simultaneously progress and a modulation signal type of touch driving signal TDS having a variable voltage level is applied to touch electrodes TE, the data voltage VDATA that is applied to data lines may be a signal type in which a touch driving signal TDS is added to the original voltage for image display (a type in which two signals are combined).

As an exemplary way, the data voltage VDATA is generated using a gamma voltage that is a modulation signal type modulated to correspond to a touch driving signal TDS. Accordingly, the data voltage VDATA that is applied to the data lines may have a signal type that is further swung by the amplitude of a touch driving signal TDS from the original voltage for image display. In this case, the ground voltage that is applied to the display panel DISP may be a DC voltage.

As another exemplary way, the ground voltage applied to the display panel DISP is modulated to correspond to a touch driving signal TDS. Accordingly, the data voltage VDATA that is applied to the data lines may have a signal type that is further swung by the amplitude of the ground voltage applied to the display panel DISP from the original voltage change for image display. The amplitude of the ground voltage corresponds to the amplitude of the touch driving signal.

In time free driving, when display driving and touch driving simultaneously progress and a modulation signal type of touch driving signal TDS having a variable voltage level is applied to touch electrodes TE, the scan signal that is applied to gate lines may be a signal type in which a touch driving signal TDS is added to the gate voltage for image display (a type in which two signals are combined). The gate voltage may be a turning-off level gate voltage (e.g., VGL) that turns off the gate lines or a turning-on level gate voltage (e.g., VGH) that turns on the gate lines.

As an exemplary way, the scan signal is generated using gate voltages VGH and VGL that are modulation signal types modulated to correspond to a touch driving signal TDS. Accordingly, the scan signal that is applied to the gate lines may have a signal type that is further swung by the amplitude of a touch driving signal TDS from the gate voltages VGH and VGL for image display. In this case, the ground voltage that is applied to the display panel DISP may be a DC voltage.

As another exemplary way, the ground voltage applied to the display panel DISP is modulated to correspond to a touch driving signal TDS. Accordingly, the scan signal that is applied to the gate lines may have a signal type that is further swung by the amplitude of the ground voltage applied to the display panel DISP from the gate voltages VGH and VGL for image display. The amplitude of the ground voltage corresponds to the amplitude of the touch driving signal TDS.

Although some ways for time free driving were described above, the present disclosure is not limited thereto and may be implemented in various ways.

The "woven type" touch panel TSP described above is briefly described again as a "modified matrix type" touch panel TSP.

Figure 32:
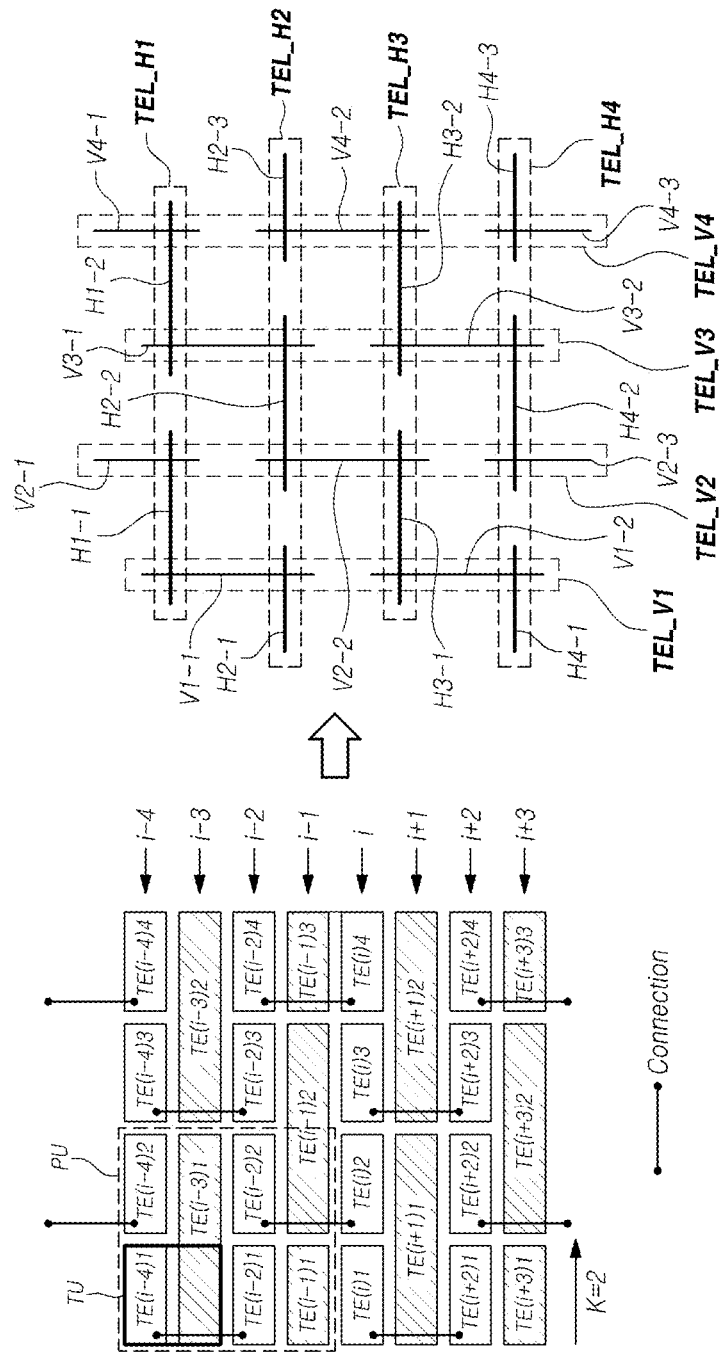
FIG. 32 is a diagram showing a woven type touch panel of a touch display device according to embodiments of the present disclosure.

FIG. 32 is a diagram showing a woven type touch panel TSP of a touch display device according to embodiments of the present disclosure.

Referring to FIG. 32, a touch panel TSP may include four row electrode lines TEL_H1, TEL_H2, TEL_H3, and TEL_H4 arranged in the row direction and four column electrode lines TEL_V1, TEL_V2, TEL_V3, and TEL_V4 arranged in the column direction.

This corresponds to the matrix type touch panel TSP composed of touch electrodes TE_H1~TE_H4 arranged in four rows and touch electrodes TE_V1~TE_V4 arranged in four columns in FIGS. 4 and 5.

However, in the touch panel TSP of FIG. 32, the four row electrode lines TEL_H1, TEL_H2, TEL_H3, and TEL_H4 each have been disconnected at one or more points.

In more detail, the four row electrode lines TEL_H1, TEL_H2, TEL_H3, and TEL_H4 include a first row electrode line (e.g., TEL_H1) and a second row electrode line (e.g., TEL_H2), in which the first row electrode line (e.g., TEL_H1) and a second row electrode line (e.g., TEL_H2) have different row-directional positions of the disconnect points.

The first row electrode line TEL_H1 includes a touch electrode H1-1 (TE(i–3)1) and a touch electrode H1-2 (TE(i–3)2). The second row electrode line TEL_H2 includes a touch electrode H2-1 (TE(i–1)1), a touch electrode H2-2 (TE(i–1)2), and a touch electrode H2-3 (TE(i–1)3).

The separated point (disconnected point) of the touch electrode H1-1 and the touch electrode H1-2 in the first row electrode line TEL_H1 is different in row-directional position from the separated point (disconnected point) of the touch electrode H2-1 and the touch electrode H2-2 in the second row electrode line TEL_H2.

The separated point (disconnected point) of the touch electrode H1-1 and the touch electrode H1-2 in the first row electrode line TEL_H1 is different in row-directional position from the separated point (disconnected point) of the touch electrode H2-2 and the touch electrode H2-3 in the second row electrode line TEL_H2.

Referring to FIG. 32, the four column electrode lines TEL_V1, TEL_V2, TEL_V3, and TEL_V4 each have also been disconnected at one or more points.

In more detail, the four column electrode lines TEL_V1, TEL_V2, TEL_V3, and TEL_V4 include a first column electrode line (e.g., TEL_V1) and a second column electrode line (e.g., TEL_V2), in which the first column electrode line (e.g., TEL_V1) and a second column electrode line (e.g., TEL_V2) have different column-directional positions of the disconnect points.

The first column electrode line (e.g., TEL_V1) includes a touch electrode V1-1 (in which an electrode TE(i–4)1 and an electrode TE(i–2)1 electrically connected with each other by a signal line have been grouped) and a touch electrode V1-2 (in which an electrode TE(i)1 and an electrode TE(i+2)1 electrically connected with each other by a signal line have been grouped).

The second column electrode line (e.g., TEL_V2) includes a touch electrode V2-1 (in which an electrode TE(i–4)2 and another electrode have been grouped by being electrically connected by a signal line disposed inside or outside an active area A/A), a touch electrode V2-2 (in which an electrode TE(i–2)2 and an electrode TE(i)2 electrically connected with each other by a signal line have been grouped), and a touch electrode V2-3 (in which an electrode TE(i+2)2 and another electrode have been grouped by being electrically connected by a signal line disposed inside or outside an active area A/A).

The separated point (disconnected point) of the touch electrode V1-1 and the touch electrode V1-2 in the first column electrode line (e.g., TEL_V1) is different in column-directional position from the separated point (disconnected point) of the touch electrode V2-1 and the touch electrode V2-2 in the second column electrode line (e.g., TEL_V2).

The separated point (disconnected point) of the touch electrode V1-1 and the touch electrode V1-2 in the first column electrode line (e.g., TEL_V1) is different in column-directional position from the separated point (disconnected point) of the touch electrode V2-2 and the touch electrode V2-3 in the second column electrode line (e.g., TEL_V2).

The disconnected points in each of the four row electrode lines TEL_H1, TEL_H2, TEL_H3, and TEL_H4 and each of the four column electrode lines TEL_V1, TEL_V2, TEL_V3, and TEL_V4 prevent charge transmission, thereby being able to prevent a ghost phenomenon in multi-touching.

The four row electrode lines TEL_H1, TEL_H2, TEL_H3, and TEL_H4 arranged in the row direction and the four column electrode lines TEL_V1, TEL_V2, TEL_V3, and TEL_V4 arranged in the column direction may be disposed in the same layer.

According to another description of embodiments of the present disclosure, a touch display device according to embodiments of the present disclosure may include: a touch display panel including a first touch electrode group TEG1, a second touch electrode group TEG2, and a third touch electrode group TEG3; and a sensing circuit.

The first touch electrode group TEG1 includes a 1-1 touch electrode TE1-1, a 1-2 touch electrode TE1-2, and a 1-3 touch electrode TE1-3, and may include a first connection SL1 connecting the 1-1 touch electrode TE1-1 and the 1-2 touch electrode TE1-2; the second touch electrode group TEG2 includes a 2-1 touch electrode TE2-1, a 2-2 touch electrode TE2-2, and a 2-3 touch electrode TE2-3, and may include a second connection SL2 connecting the 2-1 touch electrode TE2-1 and 2-2 touch electrode TE2-2, and the third touch electrode group TEG3 includes a 3-1 touch electrode TE3-1, a 3-2 touch electrode TE3-2, and a 3-3 touch electrode TE3-3, and may include a third connection SL3 connecting the 3-1 touch electrode TE3-1 and the 3-2 touch electrode TE3-2.

The 1-2 touch electrode TE1-2 of the first touch electrode group TEG1 may be electrically connected with a sensing circuit through a first sensing line SL1, the 2-2 touch electrode TE2-2 of the second touch electrode group TEG2 may be electrically connected with the sensing circuit through a second sensing line SL2, and the 3-2 touch electrode TE3-2 of the third touch electrode group TEG3 may be electrically connected with the sensing circuit through the second sensing line SL3.

The 1-3 touch electrode TE1-3 may be disposed between the second touch electrode group TEG2 and the third touch electrode group TEG3.

The second sensing line SL2 may overlap the 1-3 touch electrode TE1-3, the 3-1 touch electrode TE3-1, the 3-2 touch electrode TE3-2, and the 3-3 touch electrode TE3-3.

The second sensing line SL2 is not electrically connected with the 1-3 touch electrode TE1-3, the 3-1 touch electrode TE3-1, the 3-2 touch electrode TE3-2, and the 3-3 touch electrode TE3-3.

According to embodiments of the present disclosure, there is an effect in that there is provided a touch display device that can reduce the number of signal wires and the number of touch channels and can prevent or reduce a ghost phenomenon in multi-touching.

Further, according to embodiments of the present disclosure, there is an effect in that there is provided a touch display device including a new type of touch panel TSP that can reduce the number of signal wires and the number of touch channels and can prevent or reduce a ghost phenomenon in multi-touching.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
a plurality of electrodes; and
a plurality of signal lines electrically connected to the plurality of electrodes,
wherein:
the plurality of electrodes are disposed in a plurality of electrode rows, and the number of the electrodes disposed in one electrode row of any two adjacent electrode rows of the plurality of electrode rows is larger than the number of the electrodes disposed in the other electrode row of the any two adjacent electrode rows of the plurality of electrode rows,
in the plurality of electrode rows, a first electrode in an i-th electrode row and a first electrode in an (i+2)-th electrode row are electrically connected with each other by a first signal line, and a k-th electrode in the i-th electrode row and a k-th electrode in an (i−2)-th electrode row are electrically connected to each other by a second signal line, wherein i is an integer larger than 2 and k is an integer of 2 or more,
the first electrode in the i-th electrode row, the first electrode in the (i+2)-th electrode row, the k-th electrode in the i-th electrode row, and the k-th electrode in the (i−2)-th electrode row have sizes corresponding to one another,
the size of a first electrode in an (i+1)-th electrode row positioned between the first electrode in the i-th electrode row and the first electrode in the (i+2)-th electrode row is the same as or larger than the sum of the size of the first electrode in the i-th electrode row and the size of the first electrode in the (i+2)-th electrode row,
the size of a k-th electrode in an (i−1)-th electrode row positioned between the k-th electrode in the i-th electrode row and the k-th electrode in the (i−2)-th electrode row is the same as or larger than the sum of the size of the k-th electrode in the i-th electrode row and the size of the k-th electrode in the (i−2)-th electrode row,
the first electrode in the i-th electrode row and the first electrode in the (i+2)-th electrode row are aligned with each other in a column direction, and
a second electrode in the (i−1)-th electrode row and a second electrode in the (i+1)-th electrode row are not aligned with each other in the column direction.

2. The touch display device of claim 1, wherein two or more electrodes connected by one signal line are spaced apart from each other by another electrode, are separately disposed in two or more non-adjacent electrode rows, and are operated as one touch electrode in an equivalent potential state in touch driving.

3. The touch display device of claim 1, wherein the size of the first electrode in the (i+1)-th electrode row positioned between the first electrode in the i-th electrode row and the first electrode in the (i+2)-th electrode row is the same as or larger than the sum of the size of the first electrode in the i-th electrode row and the size of the k-th electrode in the i-th electrode row.

4. The touch display device of claim 1, wherein an electrode in an (i−1)-th electrode row positioned between the k-th electrode in the i-th electrode row and the k-th electrode in the (i−2)-th electrode row:
is the same in size as the size of an electrode in the (i+1)-th electrode row positioned between the first electrode in the i-th electrode row and the first electrode in the (i+2)-th electrode row, and
is shifted in a row direction by a shift size from the electrode in the (i+1)-th electrode row positioned between the first electrode in the i-th electrode row and the first electrode in the (i+2)-th electrode row, and
wherein the shift size is greater than or equal to a row direction length of the first electrode in the i-th electrode row.

5. The touch display device of claim 1, wherein:
the plurality of signal lines are arranged in a column direction and each signal line overlaps one or more electrodes,
the plurality of electrodes are all positioned in the same layer, and
the plurality of signal lines are positioned in a different layer from the plurality of electrodes.

6. The touch display device of claim 1, wherein:
the first signal line overlaps the first electrode in the (i+1)-th electrode row positioned between the first electrode in the i-th electrode row and the first electrode in the (i+2)-th electrode row, and
the second signal line overlaps the k-th electrode in the (i−1)-th electrode row positioned between the k-th electrode in the i-th electrode row and the k-th electrode in the (i−2)-th electrode row.

7. The touch display device of claim 1, wherein k is 2 or 3.

8. The touch display device of claim 1, wherein:
the number of electrodes electrically connected by the first signal line is two or more, and
the number of electrodes electrically connected by the second signal line is two or more.

9. The touch display device of claim 1, wherein one or more electrodes of electrodes electrically connected by the first signal line and one or more of electrodes electrically connected by the second signal line are disposed in the same electrode row.

10. The touch display device of claim 1, wherein:

the plurality of electrodes are arranged in n electrode rows and disposed in an active area, and one electrode row of two adjacent electrode rows of the n electrode rows comprises more electrodes than the other electrode row of the two adjacent electrode rows of the n electrode rows, wherein n is an integer larger than 1, some electrodes positioned in a first electrode row or a second electrode row in an upper edge area of the active area and some electrodes positioned in an (n−1)-th electrode row or an n-th electrode row of a lower edge area of the active area, in the plurality of electrodes, are electrically connected by a third signal line in the active area, and the third signal line overlaps electrodes disposed between the some electrodes positioned in the first electrode row or the second electrode row and the some electrodes positioned in the (n−1)-th electrode row or the n-th electrode row.

11. The touch display device of claim 1, wherein:

the plurality of electrodes are arranged in n electrode rows and disposed in an active area, and one electrode row of two adjacent electrode rows of the n electrode rows comprises more electrodes than the other electrode row of the two adjacent electrode rows of the n electrode rows, wherein n is an integer larger than 1, in the plurality of electrodes, two or more electrodes of electrodes positioned in a first electrode row or a second electrode row in an upper edge area of the active area are electrically connected by a fourth signal line detouring through an upper outside area of the active area, and in the plurality of electrodes, two or more electrodes of electrodes positioned in an n-th electrode row or an (n−1)-th electrode row in a lower edge area of the active area are electrically connected by a fifth signal line detouring through a lower outside area of the active area.

12. The touch display device of claim 1, wherein:

the plurality of electrodes are disposed in an active area, two or more left outermost electrodes of electrodes positioned in a left edge area of the active area of the plurality of electrodes are electrically connected by a sixth signal line in the active area, and the sixth signal line overlaps electrodes disposed between the two or more left outermost electrodes, and two or more right outermost electrodes of electrodes positioned in a right edge area of the active area of the plurality of electrodes are electrically connected by a seventh signal line in the active area, and the seventh signal line overlaps electrodes disposed between the two or more right outermost electrodes.

13. The touch display device of claim 1, wherein:

the plurality of electrodes are disposed in an active area, two or more left outermost electrodes of electrodes positioned in a left edge area of the active area of the plurality of electrodes are electrically connected by a sixth signal line detouring through a left outside area of the active area, and two or more right outermost electrodes of electrodes positioned in a right edge area of the active area of the plurality of electrodes are electrically connected by a seventh signal line detouring through a right outside area of the active area.

14. The touch display device of claim 1, further comprising a touch sensing circuit that is configured to sense two or more electrodes grouped in a touch electrode of the plurality of electrodes.

15. The touch display device of claim 14, wherein:

the touch sensing circuit is configured to supply a touch driving signal to the first electrode in the i-th electrode row and the first electrode in the (i+2)-th electrode row, and is configured to supply a touch driving signal to the first electrode in the (i+1)-th electrode row positioned between the first electrode in the i-th electrode row and the first electrode in the (i+2)-th electrode row.

16. The touch display device of claim 1, wherein:

the first electrode in the i-th electrode row and the first electrode in the (i+1)-th electrode row are aligned with each other at one of respective left and right sides along the column direction and are not aligned with each other at the other of the respective left and right sides along the column direction.

17. The touch display device of claim 16, wherein:

the left side of the first electrode in the i-th electrode row is aligned with the left side of the first electrode in the (i+1)-th electrode row along the column direction.

18. The touch electrode of claim 17, wherein:

a right side of a second electrode in the i-th electrode row is aligned with the right side of the first electrode in the (i+1)-th electrode row along the column direction.

\* \* \* \* \*